(12) United States Patent
Sasaki et al.

(10) Patent No.: US 10,265,935 B2
(45) Date of Patent: *Apr. 23, 2019

(54) PRODUCT COMPRISING PACKAGING MATERIAL COMPRISING MULTILAYER STRUCTURE

(71) Applicant: KURARAY CO., LTD., Kurashiki-shi (JP)

(72) Inventors: Ryoichi Sasaki, Kurashiki (JP); Kentaro Yoshida, Houston, TX (US); Mamoru Omoda, Soja (JP); Masakazu Nakaya, Kurashiki (JP); Hiroyuki Ogi, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 347 days.

This patent is subject to a terminal disclaimer.

(21) Appl. No.: 14/765,957

(22) PCT Filed: Feb. 7, 2014

(86) PCT No.: PCT/JP2014/000682
§ 371 (c)(1),
(2) Date: Aug. 5, 2015

(87) PCT Pub. No.: WO2014/122941
PCT Pub. Date: Aug. 14, 2014

(65) Prior Publication Data
US 2015/0367614 A1 Dec. 24, 2015

(30) Foreign Application Priority Data

Feb. 8, 2013 (JP) .................. 2013-023505
Oct. 9, 2013 (JP) .................. 2013-212239
Oct. 9, 2013 (JP) .................. 2013-212240
Oct. 9, 2013 (JP) .................. 2013-212241
Oct. 9, 2013 (JP) .................. 2013-212242
Oct. 9, 2013 (JP) .................. 2013-212243
Oct. 9, 2013 (JP) .................. 2013-212244
Oct. 9, 2013 (JP) .................. 2013-212245
Oct. 9, 2013 (JP) .................. 2013-212246
Oct. 9, 2013 (JP) .................. 2013-212247

(51) Int. Cl.
B32B 27/34 (2006.01)
B32B 27/32 (2006.01)
B32B 15/08 (2006.01)
B32B 15/20 (2006.01)
B32B 27/28 (2006.01)
B32B 27/06 (2006.01)
B32B 27/10 (2006.01)
B32B 27/08 (2006.01)
B32B 27/36 (2006.01)
C09D 143/02 (2006.01)
B32B 27/30 (2006.01)
C08F 230/02 (2006.01)

(52) U.S. Cl.
CPC ............ *B32B 27/308* (2013.01); *B32B 15/08* (2013.01); *B32B 15/20* (2013.01); *B32B 27/06* (2013.01); *B32B 27/08* (2013.01); *B32B 27/10* (2013.01); *B32B 27/28* (2013.01); *B32B 27/32* (2013.01); *B32B 27/34* (2013.01); *B32B 27/36* (2013.01); *C09D 143/02* (2013.01); *B32B 2255/10* (2013.01); *B32B 2255/20* (2013.01); *B32B 2255/205* (2013.01); *B32B 2307/558* (2013.01); *B32B 2307/724* (2013.01); *B32B 2307/7244* (2013.01); *B32B 2307/734* (2013.01); *B32B 2435/00* (2013.01); *B32B 2439/00* (2013.01); *B32B 2439/40* (2013.01); *B32B 2439/46* (2013.01); *C08F 230/02* (2013.01); *Y10T 428/31935* (2015.04)

(58) Field of Classification Search
None
See application file for complete search history.

(56) References Cited

U.S. PATENT DOCUMENTS

| 4,689,272 | A | * | 8/1987 | Simon | .................... | B41N 3/038 |
| | | | | | | 205/139 |
| 5,277,788 | A | | 1/1994 | Nitowski et al. | | |
| 2001/0021741 | A1 | * | 9/2001 | Yukawa | ................ | C08F 230/02 |
| | | | | | | 524/441 |
| 2007/0231592 | A1 | | 10/2007 | Agata | | |
| 2013/0034674 | A1 | * | 2/2013 | Yoshida | ............... | C09D 123/02 |
| | | | | | | 428/35.2 |

FOREIGN PATENT DOCUMENTS

| JP | 2002-145287 | 5/2002 |
| JP | 2002 302150 | 10/2002 |

(Continued)

OTHER PUBLICATIONS

Extended European Search Report dated Jun. 9, 2016 in Patent Application No. 14749153.4.

(Continued)

*Primary Examiner* — Sheeba Ahmed
(74) *Attorney, Agent, or Firm* — Oblon, McClelland, Maier & Neustadt, L.L.P.

(57) ABSTRACT

A product provided includes a packaging material, and the packaging material includes a multilayer structure. The multilayer structure includes at least one base (X), at least one layer (Y), and at least one layer (Z). The layer (Y) contains an aluminum atom. The layer (Z) contains a polymer (E) containing a monomer unit having a phosphorus atom. The multilayer structure includes at least one pair of the layer (Y) and the layer (Z) that are contiguously stacked. This product is excellent in gas barrier properties, and adapted to maintain the gas barrier properties at a high level even when subjected to physical stresses such as deformation and impact.

13 Claims, 10 Drawing Sheets

(56) References Cited

FOREIGN PATENT DOCUMENTS

| | | |
|---|---|---|
| JP | 2005-53109 A | 3/2005 |
| JP | 2007-30387 A | 2/2007 |
| JP | 2012-86387 | 5/2012 |
| WO | 2011 122036 | 10/2011 |
| WO | WO 2012/043823 A1 | 4/2012 |

OTHER PUBLICATIONS

International Search Report dated Mar. 25, 2014 in PCT/JP2014/000682 Filed Feb. 7, 2014.
U.S. Appl. No. 14/765,628, filed Aug. 4, 2015, Sasaki et al.
U.S. Appl. No. 14/765,697, filed Aug. 4, 2015, Sasaki et al.

* cited by examiner

PRODUCT COMPRISING PACKAGING MATERIAL COMPRISING MULTILAYER STRUCTURE

TECHNICAL FIELD

The present invention relates to products including a packaging material including a multilayer structure having gas barrier properties, and more particularly relates to products, such as various containers, container lids, and vacuum insulators, which include the packaging material.

BACKGROUND ART

In an attempt to provide containers having gas barrier properties, various multilayer structures have been developed according to the intended use of the containers. A multilayer structure having gas barrier properties generally includes a base and a gas barrier coating formed on the base. This multilayer structure is used as a packaging material constituting a container. The container is fabricated, for example, by subjecting the multilayer structure in the form of a sheet to a joining process and thus forming it into a given container shape or by forming a gas barrier coating on a base including a formed body formed beforehand in a given container shape. In the present description, a container fabricated by the former method may be referred to as a "joined container", while a container fabricated by the latter method may be referred to as a "formed container".

Examples of products, other than containers, which include a packaging material including a multilayer structure having gas barrier properties are container lids and vacuum insulators.

An example of a known multilayer structure with enhanced gas barrier properties is a multilayer structure including a transparent gas barrier coating containing a reaction product of alumina particles with a phosphorus compound (Patent Literature 1: WO 2011-122036 A1). This transparent gas barrier coating is formed by applying a coating liquid containing alumina particles and a phosphorus compound onto a base.

CITATION LIST

Patent Literature

Patent Literature 1: WO 2011-122036 A1

SUMMARY OF INVENTION

Technical Problem

The above conventional multilayer structure has good initial gas barrier properties; however, it may suffer from defects such as cracks and pinholes in its gas barrier coating when subjected to physical stresses such as deformation and impact, and may lack sufficient gas barrier properties in actual use. For example, multilayer structures for constituting containers are often subjected to physical stresses leading to deterioration in gas barrier properties. In the case of a container holding a food, for example, its multilayer structure is inevitably subjected to physical stresses of varying magnitude at different stages of container fabrication, including printing, lamination, bag making, food filling, transportation, displaying, and consumption. Therefore, a multilayer structure that can maintain its gas barrier properties even when subjected to physical stresses, and a container using the multilayer structure, have been desired. The same is the case with products other than containers, such as container lids and vacuum insulators.

An object of the present invention is to provide a product including a multilayer structure and adapted to maintain the gas barrier properties of the multilayer structure at a high level even when subjected to physical stresses.

Solution to Problem

The product of the present invention is a product including a packaging material. The packaging material includes a multilayer structure. The multilayer structure includes at least one at least one base (X), at least one layer (Y), and at least one layer (Z). The layer (Y) contains an aluminum atom, and the layer (Z) contains a polymer (E) containing a monomer unit having a phosphorus atom. The multilayer structure includes at least one pair of the layer (Y) and the layer (Z) that are contiguously stacked.

The product of the present invention may have a configuration including at least one set of the base (X), the layer (Y), and the layer (Z) that are stacked in order of the base (X)/the layer (Y)/the layer (Z).

In the product of the present invention, the polymer (E) may be a homopolymer or a copolymer of a (meth)acrylic acid ester having a phosphoric acid group at a terminal of a side chain.

In the product of the present invention, the polymer (E) may be a homopolymer of acid phosphoxyethyl (meth)acrylate.

In the product of the present invention, the polymer (E) may have a repeating unit represented by the general formula (I) below.

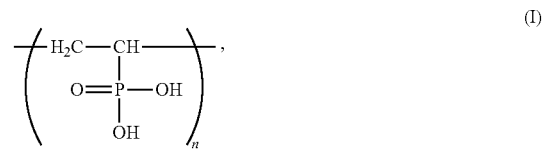

where n is a natural number.

In the product of the present invention, the layer (Y) may be a layer (YA) containing a reaction product (R). The reaction product (R) is a reaction product formed by reaction between a metal oxide (A) containing aluminum and a phosphorus compound (B). In an infrared absorption spectrum of the layer (YA), a wavenumber ($n^1$) at which infrared absorption in the range of 800 to 1400 $cm^{-1}$ reaches a maximum may be 1080 to 1130 $cm^{-1}$.

In the product of the present invention, the layer (Y) may be a deposited layer (YB) of aluminum or a deposited layer (YC) of aluminum oxide.

In the product of the present invention, the base (X) may include at least one layer selected from the group consisting of a thermoplastic resin film layer, a paper layer, and an inorganic deposited layer.

In the product of the present invention, the multilayer structure may have an oxygen transmission rate of 2 ml/($m^2 \cdot day \cdot atm$) or less at 20° C. and 85% RH.

In the product of the present invention, the multilayer structure may have an oxygen transmission rate of 4 ml/($m^2 \cdot day \cdot atm$) or less at 20° C. and 85% RH as measured after the multilayer structure is kept uniaxially stretched by 5% at 23° C. and 50% RH for 5 minutes.

The product of the present invention may be a formed container. In this formed container, the packaging material separates an interior of the formed container from the outside of the formed container. The multilayer structure is obtained by forming the layer (Y) and the layer (Z) on the base (X) including a formed body formed in a shape having a containing portion, the containing portion serving as the interior and being adapted to hold contents.

The product of the present invention may be a joined container obtained by subjecting the packaging material in the form of a sheet to a joining process. In this joined container, the packaging material separates an interior of the joined container from the outside of the joined container.

The joined container may correspond to at least one selected from a vertical form fill seal bag, a vacuum packaging bag, a pouch, a laminated tube container, an infusion bag, and a paper container.

The product of the present invention may be a container lid. In a container formed by combining the container lid with a container body, the packaging material separates an interior of the container from the outside of the container.

The product of the present invention may be a vacuum insulator. This vacuum insulator further includes a core material placed in an interior bounded by the packaging material, and the interior is under reduced pressure.

According to another aspect of the present invention, a multilayer structure can be provided which includes at least one base (X), at least one layer (Y), and at least one layer (Z). The layer (Y) contains an aluminum atom, and the layer (Z) contains a polymer (E) containing a monomer unit having a phosphorus atom. The multilayer structure includes at least one pair of the layer (Y) and the layer (Z) that are contiguously stacked.

Advantageous Effects of Invention

According to the present invention, it is possible to obtain a product including a multilayer structure and adapted to maintain the gas barrier properties of the multilayer structure at a high level even when subjected to physical stresses.

DESCRIPTION OF EMBODIMENTS

Figure 1:
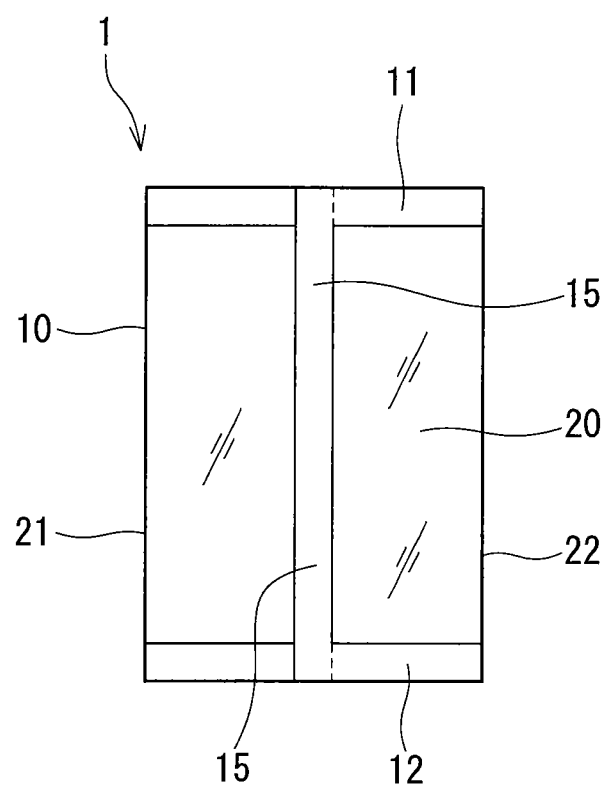
FIG. 1 is a back view showing an embodiment of the vertical form fill seal bag which is an example of the product of the present invention.

Hereinafter, embodiments of the present invention will be described. In the following, specific materials (compounds etc.) may be mentioned as examples of those exerting particular functions; however, the present invention is not limited to embodiments using such materials. Additionally, the materials mentioned as examples may be used alone or two or more thereof may be used in combination, unless otherwise specified.

[Multilayer Structure]

The multilayer structure is a multilayer structure including at least one base (X), at least one layer (Y), and at least one layer (Z). The layer (Y) contains an aluminum atom. The layer (Z) contains a polymer (E) containing a monomer unit having a phosphorus atom. The multilayer structure includes at least one pair of the layer (Y) and the layer (Z) that are contiguously stacked. This multilayer structure has excellent capability to prevent deterioration in the gas barrier properties of the film material caused by physical stresses (such capability may be referred to as "flexibility" hereinafter).

[Layer (Y)]

The layer (Y) included in the multilayer structure may be a layer (YA) containing a reaction product (R) formed by reaction between a metal oxide (A) containing at least aluminum and a phosphorus compound (B). Alternatively, the layer (Y) may be a deposited layer of aluminum (which may be referred to as "layer (YB)" hereinafter) or a deposited layer of aluminum oxide (which may be referred to as "layer (YC)" hereinafter). These layers will now be described in order.

[Layer (YA)]

When the layer (Y) included in the multilayer structure is the layer (YA), a wavenumber ($n^1$) at which, in an infrared absorption spectrum of the layer (YA), infrared absorption in the range of 800 to 1400 $cm^{-1}$ reaches a maximum may be 1080 to 1130 $cm^{-1}$.

The wavenumber ($n^1$) may be referred to as "maximum absorption wavenumber ($n^1$)" hereinafter. The metal oxide (A) is generally in the form of particles of the metal oxide (A) when reacting with the phosphorus compound (B).

Typically, the layer (YA) included in the multilayer structure has a structure in which the particles of the metal oxide (A) are bonded together via phosphorus atoms derived from the phosphorus compound (B). The forms in which the particles are bonded via phosphorus atoms include a form in which the particles are bonded via an atomic group containing a phosphorus atom, and examples thereof include a form in which the particles are bonded via an atomic group containing a phosphorus atom and being devoid of any metal atoms.

In the layer (YA) included in the multilayer structure, the number of moles of metal atoms binding the particles of the metal oxide (A) together and not being derived from the metal oxide (A) is preferably in the range of 0 to 1 times (e.g., 0 to 0.9 times) the number of moles of phosphorus atoms binding the particles of the metal oxide (A) together. The number of moles of such metal atoms may be, for example, 0.3 times or less, 0.05 times or less, 0.01 times or less, or 0 times the number of moles of the phosphorus atoms.

The layer (YA) included in the multilayer structure may partially contain the metal oxide (A) and/or phosphorus compound (B) that has not been involved in the reaction.

Generally, when a metal compound and a phosphorus compound react with each other to produce a bond represented by M-O—P in which a metal atom (M) constituting the metal compound and a phosphorus atom (P) derived from the phosphorus compound are bonded via an oxygen atom (O), a characteristic peak appears in an infrared absorption spectrum. The characteristic peak shows an absorption peak at a particular wavenumber depending on the environment or structure around the bond. As a result of study by the present inventors, it has been found that when the absorption peak due to the M-O—P bond is located in the range of 1080 to 1130 cm$^{-1}$, the resulting multilayer structure exhibits excellent gas barrier properties. Particularly, it has been found that when the absorption peak appears as an absorption peak at the maximum absorption wavenumber in the region of 800 to 1400 cm$^{-1}$ where absorptions attributed to bonds between various atoms and oxygen atoms are generally observed, the resulting multilayer structure exhibits more excellent gas barrier properties.

Although the present invention is not limited in any respect by the following hypothesis, it is inferred that when the particles of the metal oxide (A) are bonded together via phosphorus atoms derived from the phosphorus compound (B) and not via metal atoms not being derived from the metal oxide (A) so as to produce the bond represented by M-O—P in which the metal atom (M) constituting the metal oxide (A) and the phosphorus atom (P) are bonded via the oxygen atom (O), the absorption peak due to the M-O—P bond in the infrared absorption spectrum of the layer (YA) appears in the range of 1080 to 1130 cm$^{-1}$ as an absorption peak at the maximum absorption wavenumber in the region of 800 to 1400 cm$^{-1}$, due to the fact that the bond is produced in a relatively definite environment, that is, on the surfaces of the particles of the metal oxide (A).

By contrast, when a metal compound, such as a metal alkoxide or a metal salt, which does not involve the formation of a metal oxide, is mixed with the phosphorus compound (B) beforehand and then hydrolytic condensation is carried out, a composite material is obtained in which the metal atoms derived from the metal compound and the phosphorus atoms derived from the phosphorus compound (B) have been almost homogeneously mixed and reacted, and, in the infrared absorption spectrum of the composite material, the maximum absorption wavenumber (n$^1$) in the range of 800 to 1400 cm$^{-1}$ falls outside the range of 1080 to 1130 cm$^{-1}$.

In terms of obtaining the multilayer structure that is more excellent in gas barrier properties, the maximum absorption wavenumber (n$^1$) is preferably in the range of 1085 to 1120 cm$^{-1}$ and more preferably in the range of 1090 to 1110 cm$^{-1}$.

In the infrared absorption spectrum of the layer (YA) included in the multilayer structure, absorption due to stretching vibration of hydroxyl groups bonded to various atoms may be observed in the range of 2500 to 4000 cm$^{-1}$. Examples of the hydroxyl groups showing absorption in this range include: a hydroxyl group present in the form of M-OH on the surface of the metal oxide (A)-derived portion; a hydroxyl group bonded to the phosphorus atom (P) derived from the phosphorus compound (B) and present in the form of P—OH; and a hydroxyl group present in the form of C—OH derived from the polymer (C) described later. The amount of hydroxyl groups present in the layer (YA) can be associated with an absorbance ($\alpha^2$) at a wavenumber (n$^2$) at which the maximum absorption due to the stretching vibration of hydroxyl groups in the range of 2500 to 4000 cm$^{-1}$ occurs. The wavenumber (n$^2$) is a wavenumber at which, in the infrared absorption spectrum of the layer (YA), the infrared absorption due to the stretching vibration of hydroxyl groups in the range of 2500 to 4000 cm$^{-1}$ reaches a maximum. Hereinafter, the wavenumber (n$^2$) may be referred to as "maximum absorption wavenumber (n$^2$)".

The greater is the amount of hydroxyl groups present in the layer (YA), the lower is the denseness of the layer (YA), and consequently the poorer are the gas barrier properties. Furthermore, it is thought that the smaller is the ratio [absorbance ($\alpha^2$)/absorbance ($\alpha^1$)] between the absorbance ($\alpha^1$) at the maximum absorption wavenumber (n$^1$) and the absorbance ($\alpha^2$) in the infrared absorption spectrum of the layer (YA) included in the multilayer structure, the more effectively the particles of the metal oxide (A) are bonded together via the phosphorus atoms derived from the phosphorus compound (B). Therefore, in terms of enabling the resulting multilayer structure to exhibit a high level of gas barrier properties, the ratio [absorbance ($\alpha^2$)/absorbance ($\alpha^1$)] is preferably 0.2 or less, and more preferably 0.1 or less. The multilayer structure including the layer (YA) showing such a value of the ratio [absorbance ($\alpha^2$)/absorbance ($\alpha^1$)] can be obtained by adjusting, for example, heat treatment condition or the later-described ratio of the number of moles (N$_M$) of the metal atoms constituting the metal oxide (A) to the number of moles (N$_P$) of the phosphorus atoms derived from the phosphorus compound (B). In the infrared absorption spectrum of the later-described precursor layer of the layer (YA), the maximum absorbance ($\alpha^{1'}$) in the range of 800 to 1400 cm$^{-1}$ and the maximum absorbance ($\alpha^{2'}$) due to stretching vibration of hydroxyl groups in the range of 2500 to 4000 cm$^{-1}$ may satisfy a relationship of absorbance ($\alpha^{2'}$)/absorbance ($\alpha^{1'}$)>0.2, although the present invention is not particularly limited by this relationship.

In the infrared absorption spectrum of the layer (YA) included in the multilayer structure, the half width of the absorption peak with a maximum at the maximum absorption wavenumber (n$^1$) is preferably 200 cm$^{-1}$ or less, more preferably 150 cm$^{-1}$ or less, more preferably 130 cm$^{-1}$ or less, more preferably 110 cm$^{-1}$ or less, even more preferably 100 cm$^{-1}$, and particularly preferably 50 cm$^{-1}$, in terms of the gas barrier properties of the resulting multilayer structure. Although the present invention is not limited in any respect by the following hypothesis, it is inferred that when the particles of the metal oxide (A) are bonded together via phosphorus atoms derived from the phosphorus compound (B) and not via metal atoms not being derived from the metal oxide (A) so as to produce the bond represented by M-O—P in which the metal atom (M) constituting the metal oxide (A) and the phosphorus atom (P) are bonded via the oxygen atom (O), the half width of the absorption peak with a maximum at the maximum absorption wavenumber (n$^1$)

falls within the above range due to the fact that the bond is produced in a relatively definite environment, that is, on the surfaces of the particles of the metal oxide (A). In the present description, the half width of the absorption peak at the maximum absorption wavenumber ($n^1$) can be obtained by determining two wavenumbers at which the absorbance is a half of the absorbance ($\alpha^1$) (absorbance ($\alpha^1$)/2) in the absorption peak and calculating the difference between the two wavenumbers.

The infrared absorption spectrum of the layer (YA) thus far described can be obtained by measurement with ATR (attenuated total reflection) method or by scraping the layer (YA) from the multilayer structure and then measuring the infrared absorption spectrum of the scraped layer (YA) by KBr method.

In the layer (YA) included in the multilayer structure, the shape of each of the particles of the metal oxide (A) is not particularly limited, and examples of the shape include a spherical shape, a flat shape, a polygonal shape, a fibrous shape, and a needle shape. A fibrous or needle shape is preferable in terms of obtaining the multilayer structure that is more excellent in gas barrier properties. The layer (YA) may contain only a single type of particles having the same shape or may contain two or more types of particles having different shapes. The size of the particles of the metal oxide (A) is not particularly limited either, and examples of the particles include those having a size on the order of nanometers to submicrons. In terms of obtaining the multilayer structure that is more excellent in gas barrier properties, the size of the particles of the metal oxide (A) is preferably such that the average particle diameter is in the range of 1 to 100 nm.

Such a fine structure as described above of the layer (YA) included in the multilayer structure can be confirmed by observing a cross-section of the layer (YA) with a transmission electron microscope (TEM). In addition, the particle diameter of each of the particles of the metal oxide (A) in the layer (YA) can be determined as an average value of the maximum length of the particle along the longest axis and the maximum length of the particle along an axis perpendicular to the longest axis, using a cross-sectional image of the layer (YA) taken by a transmission electron microscope (TEM). The above-specified average diameter can be determined by averaging the particle diameters of ten randomly selected particles in the cross-sectional image.

In one example, the layer (YA) included in the multilayer structure has a structure in which the particles of the metal oxide (A) are bonded together via phosphorus atoms derived from the phosphorus compound (B) and not via metal atoms not being derived from the metal oxide (A). That is, in one example, the layer (YA) has a structure in which the particles of the metal oxide (A) may be bonded via metal atoms derived from the metal oxide (A) but are not bonded via other metal atoms. The "structure in which the particles of the metal oxide (A) are bonded together via phosphorus atoms derived from the phosphorus compound (B) and not via metal atoms not being derived from the metal oxide (A)" refers to a structure in which the main chain in the bond between the bonded particles of the metal oxide (A) has a phosphorus atom derived from the phosphorus compound (B) and does not have any metal atoms that are not derived from the metal oxide (A), and embraces a structure in which the side chain in the bond has a metal atom. It should be noted that the layer (YA) included in the multilayer structure may partially have a structure in which the particles of the metal oxide (A) are bonded together via both phosphorus atoms derived from the phosphorus compound (B) and metal atoms (structure in which the main chain in the bond between the bonded particles of the metal oxide (A) has both a phosphorus atom derived from the phosphorus compound (B) and a metal atom).

Examples of the form of bonding between each particle of the metal oxide (A) and a phosphorus atom in the layer (YA) included in the multilayer structure include a form in which the metal atom (M) constituting the metal oxide (A) and the phosphorus atom (P) are bonded via the oxygen atom (O). The particles of the metal oxide (A) may be bonded together via the phosphorus atom (P) derived from one molecule of the phosphorus compound (B), or may be bonded together via the phosphorus atoms (P) derived from two or more molecules of the phosphorus compound (B). Specific examples of the form of bonding between two particles of the metal oxide (A) bonded together include: a bonding form represented by (M$\alpha$)-O—P—O-(M$\beta$); a bonding form represented by (M$\alpha$)-O—P—[O—P]$_n$—O-(M$\beta$); a bonding form represented by (M$\alpha$)-O—P—Z—P—O-(M$\beta$); and a bonding form represented by (M$\alpha$)-O—P—Z—P—[O—P—Z—P]$_n$—O-(M$\beta$), where (M$\alpha$) denotes a metal atom constituting one of the bonded particles of the metal oxide (A), and (M$\beta$) denotes a metal atom constituting the other of the particles of the metal oxide (A). In the above examples of the bonding form, n represents an integer of 1 or more, Z represents a constituent atomic group present between two phosphorus atoms in the case where the phosphorus compound (B) has two or more phosphorus atoms per molecule, and the other substituents bonded to the phosphorus atoms are omitted. In the layer (YA) included in the multilayer structure, it is preferable that one particle of the metal oxide (A) be bonded to a plurality of other particles of the metal oxide (A), in terms of the gas barrier properties of the resulting multilayer structure.

The metal oxide (A) may be a hydrolytic condensate of a compound (L) containing the metal atom (M) to which a hydrolyzable characteristic group is bonded. Examples of the characteristic group include $X^1$ in the formula (I) described later.

The hydrolytic condensate of the compound (L) can be regarded substantially as a metal oxide. In this description, therefore, the hydrolytic condensate of the compound (L) may be referred to as "metal oxide (A)". That is, in this description, "metal oxide (A)" can be interpreted to mean "hydrolytic condensate of the compound (L)", while "hydrolytic condensate of the compound (L)" can be interpreted to mean "metal oxide (A)".

[Metal Oxide (A)]

Examples of the metal atoms constituting the metal oxide (A) (the metal atoms may be collectively referred to as "metal atom (M)") include metal atoms having two or more valences (e.g., two to four valences or three to four valences), and specific examples of the metals include: Group 2 metals in the periodic table such as magnesium and calcium; Group 12 metals in the periodic table such as zinc; Group 13 metals in the periodic table such as aluminum; Group 14 metals in the periodic table such as silicon; and transition metals such as titanium and zirconium. In some cases, silicon is classified as a semimetal. In the present description, however, silicon is considered to fall under the category of metals. The metal atom (M) constituting the metal oxide (A), although it may consist of one type of atoms or may include two or more types of atoms, needs to include at least aluminum. In terms of ease of handling in production of the metal oxide (A) and in terms of more excellent gas barrier properties of the resulting multilayer structure, another metal atom (M) used in combination with aluminum is preferably at least one selected from the group consisting of titanium and zirconium.

The total proportion of aluminum, titanium, and zirconium in the metal atom (M) may be 60 mol % or more, 70 mol % or more, 80 mol % or more, 90 mol % or more, 95 mol % or more, or 100 mol %. The proportion of aluminum in the metal atom (M) may be 60 mol % or more, 70 mol % or more, 80 mol % or more, 90 mol % or more, 95 mol % or more, or 100 mol %.

A metal oxide produced by a method such as liquid-phase synthesis, gas-phase synthesis, or solid grinding, can be used as the metal oxide (A). In view of the controllability of the shape and size, and the production efficiency, of the metal oxide (A) to be obtained, the metal oxide (A) is preferably one produced by liquid-phase synthesis.

In the case of liquid-phase synthesis, the compound (L) in which a hydrolyzable characteristic group is bonded to the metal atom (M) is used as a raw material, and is subjected to hydrolytic condensation. Thus, the metal oxide (A) can be synthesized as a hydrolytic condensate of the compound (L). It should be noted that the metal atom (M) contained in the compound (L) needs to include at least aluminum. In the production of the hydrolytic condensate of the compound (L) by liquid-phase synthesis, the metal oxide (A) can be produced not only by the method using the compound (L) itself as a raw material but also by methods in which any one of the following is used as a raw material and subjected to condensation or hydrolytic condensation: a partial hydrolysate of the compound (L) formed by partial hydrolysis of the compound (L); a complete hydrolysate of the compound (L) formed by complete hydrolysis of the compound (L); a partial hydrolytic condensate of the compound (L) formed by partial hydrolytic condensation of the compound (L); a condensate formed by condensation of a part of a complete hydrolysate of the compound (L); and a mixture of two or more thereof. The metal oxide (A) thus obtained is also considered a "hydrolytic condensate of the compound (L)" in the present description. The type of the above-mentioned hydrolyzable characteristic group (functional group) is not particularly limited. Examples thereof include halogen atoms (such as F, Cl, Br, and I), alkoxy groups, acyloxy groups, diacylmethyl groups, and nitro groups. In terms of better reaction controllability, halogen atoms and alkoxy groups are preferable, and alkoxy groups are more preferable.

In terms of easy reaction control and of more excellent gas barrier properties of the resulting multilayer structure, the compound (L) preferably includes at least one compound ($L^1$) represented by the formula (II) below.

$$AlX^1_m R^1_{(3-m)} \quad (II),$$

where $X^1$ is selected from the group consisting of F, Cl, Br, I, $R^2O$—, $R^3C(=O)O$—, $(R^4C(=O))_2CH$—, and $NO_3$, $R^1$, $R^2$, $R^3$, and $R^4$ are each selected from the group consisting of an alkyl group, an aralkyl group, an aryl group, and an alkenyl group, and m represents an integer of 1 to 3. When a plurality of $X^1$ are present in the formula (II), the plurality of $X^1$ may be the same as or different from each other. When a plurality of $R^1$ are present in the formula (II), the plurality of $R^1$ may be the same as or different from each other. When a plurality of $R^2$ are present in the formula (II), the plurality of $R^2$ may be the same as or different from each other. When a plurality of $R^3$ are present in the formula (II), the plurality of $R^3$ may be the same as or different from each other. When a plurality of $R^4$ are present in the formula (II), the plurality of $R^4$ may be the same as or different from each other.

Examples of the alkyl group represented by $R^1$, $R^2$, $R^3$, and $R^4$ include a methyl group, an ethyl group, a normal-propyl group, an isopropyl group, a normal-butyl group, a s-butyl group, a t-butyl group, and a 2-ethylhexyl group. Examples of the aralkyl group represented by $R^1$, $R^2$, $R^3$, and $R^4$ include a benzyl group, a phenethyl group, and a trityl group. Examples of the aryl group represented by $R^1$, $R^2$, $R^3$, and $R^4$ include a phenyl group, a naphthyl group, a tolyl group, a xylyl group, and a mesityl group. Examples of the alkenyl group represented by $R^1$, $R^2$, $R^3$, and $R^4$ include a vinyl group and an allyl group. For example, $R^1$ is preferably an alkyl group having 1 to 10 carbon atoms, and more preferably an alkyl group having 1 to 4 carbon atoms. $X^1$ is preferably F, Cl, Br, I, or $R^2O$—. In a preferred example of the compound (D), $X^1$ is a halogen atom (F, Cl, Br, or I) or an alkoxy group ($R^2O$—) having 1 to 4 carbon atoms, and m is 3. In one example of the compound ($L^1$), $X^1$ is a halogen atom (F, Cl, Br, or I) or an alkoxy group ($R^2O$—) having 1 to 4 carbon atoms, and m is 3.

The compound (L) may include at least one compound represented by the formula below in addition to the compound ($L^1$).

$$M^1 X^1_m R^1_{(n-m)} \quad (III),$$

where $M^1$ represents Ti or Zr, and $X^1$ and $R^1$ are as described for the formula (II).

In the formula (III), n is equal to the valence of $M^1$, and m represents an integer of 1 to n.

Specific examples of the compound ($L^1$) include aluminum compounds such as aluminum chloride, aluminum triethoxide, aluminum tri-normal-propoxide, aluminum tri-isopropoxide, aluminum tri-normal-butoxide, aluminum tri-s-butoxide, aluminum tri-t-butoxide, aluminum triacetate, aluminum acetylacetonate, and aluminum nitrate. Among these, at least one compound selected from aluminum tri-isopropoxide and aluminum tri-s-butoxide is preferable as the compound ($L^1$). One compound ($L^1$) may be used alone, or two or more compounds ($L^1$) may be used in combination.

The proportion of the compound ($L^1$) in the compound (L) is not particularly limited. The proportion of a compound other than the compound ($L^1$) in the compound (L) is, for example, 20 mol % or less, 10 mol % or less, 5 mol % or less, or 0 mol %. In an example, the compound (L) consists only of the compound ($L^1$).

The compound (L) other than the compound ($L^1$) is not particularly limited as long as the effect of the present invention is obtained. Examples of the other compound include compounds in which the hydrolyzable characteristic group mentioned above is bonded to an atom of metal such as titanium, zirconium, magnesium, calcium, zinc, or silicon. In some cases, silicon is classified as a semimetal. In the present description, however, silicon is considered to fall under the category of metals. Among such compounds, those having titanium or zirconium as the metal atom are preferable as the compound (L) other than the compound ($L^1$) in terms of more excellent gas barrier properties of the resulting multilayer structure. Specific examples of the compound (L) other than the compound ($L^1$) include titanium compounds such as titanium tetraisopropoxide, titanium tetra-normal-butoxide, titanium tetra(2-ethylhexoxide), titanium tetramethoxide, titanium tetraethoxide, and titanium acetylacetonate; and zirconium compounds such as zirconium tetra-normal-propoxide, zirconium tetrabutoxide, and zirconium tetraacetylacetonate.

As a result of hydrolysis of the compound (L), at least some of the hydrolyzable characteristic groups contained in the compound (L) are substituted by hydroxyl groups. Furthermore, the hydrolysate is condensed to form a compound in which the metal atoms (M) are bonded via the oxygen atom (O). By repetitions of the condensation, a compound that can be regarded substantially as a metal oxide is formed. Generally, hydroxyl groups are present on the surface of the thus formed metal oxide (A).

In the present description, a compound is categorized as the metal oxide (A) when the ratio of the number of moles of oxygen atoms bonded only to the metal atoms (M) to the number of moles of the metal atoms (M) ([the number of moles of oxygen atoms bonded only to the metal atoms (M)]/[the number of moles of the metal atoms (M)]) is 0.8 or more in the compound. Here, "oxygen atoms bonded only to the metal atoms (M)" include, for example, the oxygen atom (O) in the structure represented by M-O-M, and do not include, for example, oxygen atoms that are bonded to the metal atoms (M) and to hydrogen atoms (H) as is the case for the oxygen atom (O) in the structure represented by M-O—H. In the metal oxide (A), the above ratio is preferably 0.9 or more, more preferably 1.0 or more, and even more preferably 1.1 or more. The upper limit of the ratio is not particularly specified. When the valence of the metal atom (M) is denoted by n, the upper limit is generally represented by n/2.

In order for the above-described hydrolytic condensation to take place, it is important that the compound (L) have a hydrolyzable characteristic group (functional group). When there is no such a group bonded, hydrolytic condensation reaction does not take place or proceeds very slowly, which makes difficult the preparation of the metal oxide (A) intended.

For example, the hydrolytic condensate can be produced from a particular raw material by a technique employed in commonly-known sol-gel processes. At least one (which may be referred to as a "compound (L)-based substance" hereinafter) selected from the group consisting of the compound (L), a partial hydrolysate of the compound (L), a complete hydrolysate of the compound (L), a partial hydrolytic condensate of the compound (L), and a condensate formed by condensation of a part of a complete hydrolysate of the compound (L), can be used as the raw material. These raw materials may be produced by commonly-known methods or may be commercially-available products. For example, the raw material that can be used is, but not limited to, a condensate obtained by hydrolytic condensation of about 2 to 10 molecules of the compound (L). Specifically, for example, a dimeric to decameric condensate obtained by hydrolytic condensation of aluminum triisopropoxide can be used as a part of the raw material.

The number of condensed molecules in the hydrolytic condensate of the compound (L) can be controlled by the conditions for condensation or hydrolytic condensation of the compound (L)-based substance. For example, the number of condensed molecules can be controlled by the amount of water, the type and concentration of a catalyst, and the temperature and time of the condensation or hydrolytic condensation.

As described above, the layer (YA) included in the multilayer structure contains the reaction product (R), and the reaction product (R) is a reaction product formed by reaction between the metal oxide (A) containing at least aluminum and the phosphorus compound (B). Such a reaction product can be formed by mixing and reacting the metal oxide (A) with the phosphorus compound (B). The metal oxide (A) to be mixed with the phosphorus compound (B) (the metal oxide (A) immediately before mixing) may be the metal oxide (A) itself or may be in the form of a composition including the metal oxide (A). In a preferred example, the metal oxide (A) mixed with the phosphorus compound (B) is in the form of a liquid (a solution or a dispersion) obtained by dissolving or dispersing the metal oxide (A) in a solvent.

A preferred method for producing the solution or dispersion of the metal oxide (A) will now be described. Specifically, a method for producing a dispersion of the metal oxide (A) will be described using an example in which the metal oxide (A) does not contain any metal atoms other than the aluminum atom, that is, an example in which the metal oxide (A) is aluminum oxide (alumina). However, similar production methods can be employed for production of solutions or dispersions containing other metal atoms. A preferred alumina dispersion can be obtained as follows: an alumina slurry is formed by subjecting an aluminum alkoxide to hydrolytic condensation in an aqueous solution having been pH-adjusted with an acid catalyst as necessary, and then the slurry is deflocculated in the presence of a particular amount of an acid.

The temperature of the reaction system for the hydrolytic condensation of the aluminum alkoxide is not particularly limited. The temperature of the reaction system is generally in the range of 2 to 100° C. The liquid temperature is increased by contact between water and the aluminum alkoxide. However, a situation may arise where an alcohol having a lower boiling point than water is formed as a by-product along with the progress of hydrolysis, and the alcohol is volatilized and thereby prevents the temperature of the reaction system from increasing from around the boiling point of the alcohol. In such a situation, the growth of alumina may be slowed. Therefore, it is effective to remove the alcohol by heating up to around 95° C. The reaction time varies depending on the reaction conditions (the presence/absence, amount, and type of an acid catalyst). The reaction time is generally in the range of 0.01 to 60 hours, preferably in the range of 0.1 to 12 hours, and more preferably in the range of 0.5 to 6 hours. The reaction can be carried out in an atmosphere of a gas selected from various gases such as air, carbon dioxide, nitrogen, and argon.

The molar amount of water used in the hydrolytic condensation is preferably 1 to 200 times and more preferably 10 to 100 times the molar amount of the aluminum alkoxide. The molar amount of water less than the molar amount of the aluminum alkoxide does not allow hydrolysis to proceed sufficiently, and thus is not preferable. The molar amount of water more than 200 times the molar amount of the aluminum alkoxide leads to deterioration in production efficiency or increase in viscosity, and thus is not preferable. In the case where a water-containing substance (e.g., hydrochloric acid or nitric acid) is used, the amount of water used is preferably determined in view of the amount of water introduced with the substance.

As the acid catalyst used in the hydrolytic condensation, hydrochloric acid, sulfuric acid, nitric acid, p-toluenesulfonic acid, benzoic acid, acetic acid, lactic acid, butyric acid, carbonic acid, oxalic acid, maleic acid, or the like, can be used. Among these, hydrochloric acid, sulfuric acid, nitric acid, acetic acid, lactic acid, and butyric acid are preferable. More preferred are nitric acid and acetic acid. In the case where an acid catalyst is used in hydrolytic condensation, the acid catalyst is preferably used in an appropriate amount depending on the type of the acid so that the pH is in the range of 2.0 to 4.0 before the hydrolytic condensation.

The alumina slurry obtained by the hydrolytic condensation may as such be used as the alumina dispersion. However, when the obtained alumina slurry is deflocculated by heating in the presence of a particular amount of an acid, a transparent alumina dispersion excellent in viscosity stability can be obtained.

As the acid used in deflocculation, a monovalent inorganic or organic acid such as nitric acid, hydrochloric acid, perchloric acid, formic acid, acetic acid, or propionic acid, can be used. Among these, nitric acid, hydrochloric acid, and acetic acid are preferable. More preferred are nitric acid and acetic acid.

In the case where nitric acid or hydrochloric acid is used as the acid for the deflocculation, the molar amount of the acid is preferably 0.001 to 0.4 times and more preferably 0.005 to 0.3 times the molar amount of aluminum atoms. When the molar amount of the acid is less than 0.001 times the molar amount of aluminum atoms, there may arise unfavorable situations, such as where the deflocculation does not proceed sufficiently or requires a very long time. When the molar amount of the acid is more than 0.4 times the molar amount of aluminum atoms, the temporal stability of the resulting alumina dispersion tends to be reduced.

In the case where acetic acid is used as the acid for the deflocculation, the molar amount of the acid is preferably 0.01 to 1.0 times and more preferably 0.05 to 0.5 times the molar amount of aluminum atoms. When the molar amount of the acid is less than 0.01 times the molar amount of aluminum atoms, there may arise unfavorable situations, such as where the deflocculation does not proceed sufficiently or requires a very long time. When the molar amount of the acid is more than 1.0 time the molar amount of aluminum atoms, the temporal stability of the resulting alumina dispersion tends to be reduced.

The acid to be present at the time of deflocculation may be added at the time of hydrolytic condensation. In the case where the acid has been lost as a result of removal of an alcohol formed as a by-product in the hydrolytic condensation, the acid is preferably added again so that the amount of the acid falls within the above-specified range.

When the deflocculation is carried out at a temperature of 40 to 200° C., the deflocculation can be completed in a short time with a moderate amount of the acid, and an alumina dispersion containing a desired size of particles and being excellent in viscosity stability can be produced. The deflocculation temperature less than 40° C. causes the deflocculation to require a long time, and thus is not preferable. The deflocculation temperature more than 200° C. is not preferable either, since increasing the temperature beyond 200° C. requires a high-pressure resistant container or the like and is economically disadvantageous despite providing only a slight increase in deflocculation rate.

An alumina dispersion having a given concentration can be obtained by performing dilution with a solvent or concentration by heating as necessary after the completion of the deflocculation. In the case where heat concentration is performed, the heat concentration is preferably performed at 60° C. or less under reduced pressure in order to prevent viscosity increase or gelatinization.

Preferably, the metal oxide (A) to be mixed with the phosphorus compound (B) (or a composition including the phosphorus compound (B) when the phosphorus compound (B) is used in the form of a composition) is substantially devoid of phosphorus atoms. However, for example, a situation may arise where a small amount of phosphorus atoms are contained in the metal oxide (A) to be mixed with the phosphorus compound (B) (or a composition including the phosphorus compound (B) when the phosphorus compound (B) is used in the form of a composition) due to, for example, the influence of impurities present at the time of preparation of the metal oxide (A). Therefore, the metal oxide (A) to be mixed with the phosphorus compound (B) (or a composition including the phosphorus compound (B) when the phosphorus compound (B) is used in the form of a composition) may contain a small amount of phosphorus atoms to the extent that the effect of the present invention is not impaired. In terms of obtaining the multilayer structure that is more excellent in gas barrier properties, the content of phosphorus atoms contained in the metal oxide (A) to be mixed with the phosphorus compound (B) (or a composition including the phosphorus compound (B) when the phosphorus compound (B) is used in the form of a composition) is preferably 30 mol % or less, more preferably 10 mol % or less, even more preferably 5 mol % or less, and particularly preferably 1 mol % or less and may be 0 mol %, with respect to the number of moles (defined as 100 mol %) of the total metal atoms (M) contained in the metal oxide (A).

The layer (YA) included in the multilayer structure has a particular structure in which the particles of the metal oxide (A) are bonded together via phosphorus atoms derived from the phosphorus compound (B). The shape and size of the particles of the metal oxide (A) in the layer (YA) may be the same as or different from the shape and size of the particles of the metal oxide (A) to be mixed with the phosphorus compound (B) (or a composition including the phosphorus compound (B) when the phosphorus compound (B) is used in the form of a composition). That is, the particles of the metal oxide (A) used as a raw material of the layer (YA) may change in shape or size during the process of formation of the layer (YA). Particularly, in the case where the layer (YA) is formed using the coating liquid (U) described later, the shape or size may change in the coating liquid (U), in the later-described liquid (S) usable for forming the coating liquid (U), or during the steps subsequent to the application of the coating liquid (U) onto the base (X).

[Phosphorus Compound (B)]

The phosphorus compound (B) contains a site capable of reacting with the metal oxide (A), and typically contains a plurality of such sites. In a preferred example, the phosphorus compound (B) contains 2 to 20 such sites (atomic groups or functional groups). Examples of such a site include a site capable of reacting with a functional group (e.g., hydroxyl group) present on the surface of the metal oxide (A). Examples of such a site include a halogen atom directly bonded to a phosphorus atom and an oxygen atom directly bonded to a phosphorus atom. Such a halogen or oxygen atom can undergo a condensation reaction (hydrolytic condensation reaction) with a hydroxyl group present on the surface of the metal oxide (A). The functional group (e.g., hydroxyl group) present on the surface of the metal oxide (A) is generally bonded to the metal atom (M) constituting the metal oxide (A).

For example, a phosphorous compound having a structure in which a halogen atom or an oxygen atom is directly bonded to a phosphorus atom can be used as the phosphorus compound (B). When such a phosphorus compound (B) is used, bond formation can be induced by (hydrolytic) condensation with hydroxyl groups present on the surface of the metal oxide (A). The phosphorus compound (B) may have one phosphorus atom or may have two or more phosphorus atoms.

The phosphorus compound (B) may be at least one compound selected from the group consisting of phosphoric acid, polyphosphoric acid, phosphorous acid, phosphonic acid, and derivatives thereof. Specific examples of the polyphosphoric acid include pyrophosphoric acid, triphosphoric acid, and polyphosphoric acid resulting from condensation of four or more phosphoric acid molecules. Examples of the derivatives include salts, (partial) esters, halides (chloride etc.), and dehydration products (diphosphorus pentoxide etc.), of phosphoric acid, polyphosphoric acid, phosphorous acid, and phosphonic acid. In addition, examples of the derivatives of phosphonic acid include: compounds (e.g., nitrilotris(methylenephosphonic acid) and N,N,N',N'-ethylenediaminetetrakis(methylenephosphonic acid)) in which a hydrogen atom directly bonded to a phosphorus atom of phosphonic acid (H—P(=O)(OH)$_2$) is substituted by an alkyl group that may have various types of functional groups; and salts, (partial) esters, halides, and dehydration products of such compounds. Furthermore, an organic polymer having a phosphorus atom, such as phosphorylated starch or the later-described polymer (E), can also be used as the phosphorus compound (B). One of these phosphorus compounds (B) may be used alone or two or more thereof may be used in combination. Among these phosphorus compounds (B), phosphoric acid is preferably used alone or in combination with another phosphorus compound, in terms of the stability of the later-described coating liquid (U) used for formation of the layer (YA) and in terms of more excellent gas barrier properties of the resulting multilayer structure.

As described above, the layer (YA) included in the multilayer structure contains the reaction product (R), and the reaction product (R) is a reaction product formed by reaction at least between the metal oxide (A) and the phosphorus compound (B). Such a reaction product can be formed by mixing and reacting the metal oxide (A) with the phosphorus compound (B). The phosphorus compound (B) to be mixed with the metal oxide (A) (the phosphorus compound (B) immediately before mixing) may be the phosphorus compound (B) itself or may be in the form of a composition including the phosphorus compound (B), and is preferably in the form of a composition including the phosphorus compound (B). In a preferred example, the phosphorus compound (B) mixed with the metal oxide (A) is in the form of a solution obtained by dissolving the phosphorus compound (B) in a solvent. The solvent used can be of any type. Examples of a preferred solvent include water and a mixed solvent containing water.

In terms of obtaining the multilayer structure that is more excellent in gas barrier properties, the content of metal atoms in the phosphorus compound (B) or a composition including the phosphorus compound (B) which is to be mixed with the metal oxide (A) is preferably low. The content of metal atoms in the phosphorus compound (B) or a composition including the phosphorus compound (B) which is to be mixed with the metal oxide (A) is preferably 100 mol % or less, more preferably 30 mol % or less, even more preferably 5 mol % or less, and particularly preferably 1 mol % or less and may be 0 mol %, with respect to the number of moles (defined as 100 mol %) of the total phosphorus atoms contained in the phosphorus compound (B) or the composition including the phosphorus compound (B).

[Reaction Product (R)]

Examples of the reaction product (R) include a reaction product formed by reaction only between the metal oxide (A) and the phosphorus compound (B). Examples of the reaction product (R) also include a reaction product formed by reaction among the metal oxide (A), the phosphorus compound (B), and another compound. The reaction product (R) can be formed by a technique explained for the later-described production method.

[Ratio between Metal Oxide (A) and Phosphorus Compound (B)]

In the layer (YA), the number of moles $N_M$ of the metal atoms constituting the metal oxide (A) and the number of moles $N_P$ of the phosphorus atoms derived from the phosphorus compound (B) preferably satisfy a relationship of $1.0 \leq$ (the number of moles $N_M$)/(the number of moles $N_P$)$\leq 3.6$, and more preferably satisfy a relationship of $1.1 \leq$ (the number of moles $N_M$)/(the number of moles $N_P$)$\leq 3.0$. If the value of (the number of moles $N_M$)/(the number of moles $N_P$) is more than 3.6, this means that the metal oxide (A) is excessive relative to the phosphorus compound (B). In this case, the bonding between the particles of the metal oxide (A) is insufficient while the amount of hydroxyl groups present on the surface of the metal oxide (A) is large, with the result that the gas barrier properties and the stability of gas barrier properties tend to be deteriorated. If the value of (the number of moles $N_M$)/(the number of moles $N_P$) is less than 1.0, this means that the phosphorus compound (B) is excessive relative to the metal oxide (A). In this case, the amount of the excess phosphorus compound (B) that is not involved in the bond to the metal oxide (A) is large while the amount of hydroxyl groups derived from the phosphorus compound (B) is likely to be large, with the same result that the gas barrier properties and the stability of gas barrier properties tend to be deteriorated.

The above ratio can be adjusted depending on the ratio between the amount of the metal oxide (A) and the amount of the phosphorus compound (B) in the coating liquid for forming the layer (YA). The ratio between the number of moles $N_M$ and the number of moles $N_P$ in the layer (YA) is generally a ratio in the coating liquid, and equal to the ratio between the number of moles of the metal atoms constituting the metal oxide (A) and the number of moles of the phosphorus atoms constituting the phosphorus compound (B).

[Polymer (C)]

The layer (YA) included in the multilayer structure may further contain a particular polymer (C). The polymer (C) is a polymer having at least one functional group (f) selected from the group consisting of a hydroxyl group, a carboxyl group, a carboxylic acid anhydride group, and a salt of a carboxyl group. In the layer (YA) included in the multilayer structure, the polymer (C) may be directly or indirectly bonded to either or both the particle of the metal oxide (A) and the phosphorus atom derived from the phosphorus compound (B) through the functional group (f) of the polymer (C) itself. In the layer (YA) included in the multilayer structure, the reaction product (R) may have a polymer (C)-derived portion resulting, for example, from reaction of the polymer (C) with the metal oxide (A) or the phosphorus compound (B). In the present description, a polymer meeting the requirements for the phosphorus compound (B) and containing the functional group (f) is not categorized as the polymer (C), but is regarded as the phosphorus compound (B).

A polymer containing a structural unit having the functional group (f) can be used as the polymer (C). Specific examples of such a structural unit include structural units having one or more functional groups (f), such as a vinyl alcohol unit, an acrylic acid unit, a methacrylic acid unit, a maleic acid unit, an itaconic acid unit, a maleic anhydride unit, and a phthalic anhydride unit. The polymer (C) may contain only a single type of structural unit having the functional group (f) or may contain two or more types of structural units having the functional group (f).

In order to obtain the multilayer structure that has more excellent gas barrier properties and stability of gas barrier properties, the proportion of the structural unit having the functional group (f) in the total structural units of the polymer (C) is preferably 10 mol % or more, more preferably 20 mol % or more, even more preferably 40 mol % or more, and particularly preferably 70 mol % or more, and may be 100 mol %.

When the polymer (C) is constituted by the structural unit having the functional group (f) and another structural unit, the type of such another structural unit is not particularly limited. Examples of such another structural unit include: a structural unit derived from a (meth)acrylic acid ester, such as a methyl acrylate unit, a methyl methacrylate unit, an ethyl acrylate unit, an ethyl methacrylate unit, a butyl acrylate unit, and a butyl methacrylate unit; a structural unit derived from a vinyl ester, such as a vinyl formate unit and a vinyl acetate unit; a structural unit derived from an aromatic vinyl, such as a styrene unit and a p-styrenesulfonic acid unit; and a structural unit derived from an olefin, such as an ethylene unit, a propylene unit, and an isobutylene unit. When the polymer (C) contains two or more types of structural units, the polymer (C) may be an alternating copolymer, a random copolymer, a block copolymer, or a tapered copolymer.

Specific examples of the polymer (C) that has a hydroxyl group include polyvinyl alcohol, partially-saponified polyvinyl acetate, polyethylene glycol, polyhydroxyethyl (meth) acrylate, polysaccharides such as starch, and polysaccharide derivatives derived from polysaccharides. Specific examples of the polymer (C) that has a carboxyl group, a carboxylic acid anhydride group, or a salt of a carboxyl group include polyacrylic acid, polymethacrylic acid, poly(acrylic acid/methacrylic acid), and salts thereof. Specific examples of the polymer (C) that contains a structural unit devoid of the functional group (f) include ethylene-vinyl alcohol copolymer, ethylene-maleic anhydride copolymer, styrene-maleic anhydride copolymer, isobutylene-maleic anhydride alternating copolymer, ethylene-acrylic acid copolymer, and saponified ethylene-ethyl acrylate copolymer. In order to obtain the multilayer structure that has more excellent gas barrier properties and stability of gas barrier properties, the polymer (C) is preferably at least one polymer selected from the group consisting of polyvinyl alcohol, ethylene-vinyl alcohol copolymer, a polysaccharide, polyacrylic acid, a salt of polyacrylic acid, polymethacrylic acid, and a salt of polymethacrylic acid.

The molecular weight of the polymer (C) is not particularly limited. In order to obtain the multilayer structure that has more excellent gas barrier properties and mechanical properties (drop impact resistance etc.), the number average molecular weight of the polymer (C) is preferably 5,000 or more, more preferably 8,000 or more, and even more preferably 10,000 or more. The upper limit of the number average molecular weight of the polymer (C) is not particularly specified, and is, for example, 1,500,000 or less.

In order to further improve the gas barrier properties, the content of the polymer (C) in the layer (YA) is preferably 50 mass % or less, more preferably 40 mass % or less, and even more preferably 30 mass % or less and may be 20 mass % or less, with respect to the mass of the layer (YA) (defined as 100 mass %). The polymer (C) may or may not react with another component in the layer (YA). In the present description, the polymer (C) having reacted with another component is also referred to as a polymer (C). For example, in the case where the polymer (C) is bonded to the metal oxide (A) and/or a phosphorus atom derived from the phosphorus compound (B), the reaction product is also referred to as a polymer (C). In this case, the above-described content of the polymer (C) is calculated by dividing the mass of the polymer (C) yet to be bonded to the metal oxide (A) and/or a phosphorus atom by the mass of the layer (YA).

The layer (YA) included in the multilayer structure may consist only of the reaction product (R) (including a reaction product having a polymer (C)-derived portion) formed by reaction between the metal oxide (A) containing at least aluminum and the phosphorus compound (B), may consist only of the reaction product (R) and the unreacted polymer (C), or may further contain another component.

Examples of the other component include: metal salts of inorganic acids, such as a metal carbonate, a metal hydrochloride, a metal nitrate, a metal hydrogen carbonate, a metal sulfate, a metal hydrogen sulfate, a metal borate, and a metal aluminate; metal salts of organic acids, such as a metal oxalate, a metal acetate, a metal tartrate, and a metal stearate; metal complexes such as a metal acetylacetonate complex (aluminum acetylacetonate etc.), a cyclopentadienyl metal complex (titanocene etc.), and a cyano metal complex; layered clay compounds; crosslinking agents; polymer compounds other than the polymer (C); plasticizers; antioxidants; ultraviolet absorbers; and flame retardants.

The content of the other component in the layer (YA) of the multilayer structure is preferably 50 mass % or less, more preferably 20 mass % or less, even more preferably 10 mass % or less, and particularly preferably 5 mass % or less, and may be 0 mass % (which means the other component is not contained).

[Thickness of Layer (YA)]

The thickness of the layer (YA) included in the multilayer structure (or the total thickness of layers (YA) when the multilayer structure includes two or more layers (YA)) is preferably 4.0 µm or less, more preferably 2.0 µm or less, even more preferably 1.0 µm or less, and particularly preferably 0.9 µm or less. Thinning the layer (YA) can provide a reduction in the dimensional change of the multilayer structure during a process such as printing and lamination and also provide an increase in the pliability of the multilayer structure, thereby making it possible to allow the multilayer structure to have mechanical characteristics close to the mechanical characteristics of the base itself.

Even in the case where the total thickness of the layer(s) (YA) is 1.0 µm or less (e.g., 0.5 µm or less), the multilayer structure can exhibit an oxygen transmission rate of 2 ml/(m²·day·atm) or less at 20° C. and 85% RH. The thickness of the layer (YA) (or the total thickness of layers (YA) when the multilayer structure includes two or more layers (YA)) is preferably 0.1 µm or more (e.g., 0.2 µm or more). In terms of further improving the gas barrier properties of the multilayer structure, the thickness of a single layer (YA) is preferably 0.05 µm or more (e.g., 0.15 µm or more). The thickness of the layer (YA) can be controlled by the concentration of the later-described coating liquid (U) used for formation of the layer (YA) or by the method for application of the coating liquid (U).

[Layer (YB) and Layer (YC)]

The layer (Y) included in the multilayer structure may be the layer (YB) which is a deposited layer of aluminum or the layer (YC) which is a deposited layer of aluminum oxide. These deposited layers can be formed by the same method as that for the later-described inorganic deposited layer.

[Layer (Z)]

The layer (Z) included in the multilayer structure contains the polymer (E) containing a monomer unit having a phosphorus atom. Forming the layer (Z) contiguous with the layer (Y) can provide a significant increase in the flexibility of the multilayer structure.

[Polymer (E)]

The polymer (E) has a plurality of phosphorus atoms per molecule. In one example, the phosphorus atoms are contained in acid groups or derivatives thereof. Examples of the acid group containing a phosphorus atom include a phosphoric acid group, a polyphosphoric acid group, a phosphorous acid group, and a phosphonic acid group. At least one of the phosphorus atoms contained in the polymer (E) is involved with a site capable of reacting with the metal oxide (A). In a preferred example, the polymer (E) contains about 10 to 1000 such phosphorus atoms. Examples of the site involving the phosphorus atom and capable of reacting with the metal oxide (A) include the sites having structures described above for the phosphorus compound (B).

The polymer (E) is not particularly limited as long as it satisfies the above requirements. Preferred examples thereof include a homopolymer or a copolymer of a (meth)acrylic acid ester containing a phosphoric acid group at a terminal of a side chain. Such a polymer can be obtained by synthesizing as a monomer a (meth)acrylic acid ester having a phosphoric acid group at a terminal of a side chain and homopolymerizing the (meth)acrylic acid ester or copolymerizing it with another vinyl group-containing monomer.

The (meth)acrylic acid ester containing a phosphoric acid group at a terminal of a side chain, which is used in the present invention, may be at least one compound represented by the general formula (IV) below.

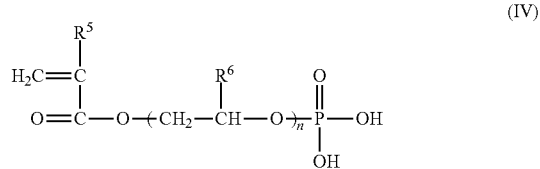

(IV)

In the formula (IV), $R^5$ and $R^6$ are each a hydrogen atom or an alkyl group selected from a methyl group, an ethyl group, a normal-propyl group, and an isopropyl group, and some hydrogen atoms contained in the alkyl group may be substituted by another atom or a functional group. In the formula (IV), n is a natural number, and is typically an integer of 1 to 6.

In a typical example, $R^5$ is a hydrogen atom or a methyl group, and $R^6$ is a hydrogen atom or a methyl group.

Examples of monomers that are represented by the general formula (IV) and can be suitably used in the present invention include acid phosphoxyethyl acrylate, acid phosphoxyethyl methacrylate, acid phosphoxy polyoxyethylene glycol acrylate, acid phosphoxy polyoxyethylene glycol methacrylate, acid phosphoxy polyoxypropylene glycol acrylate, acid phosphoxy polyoxypropylene glycol methacrylate, 3-chloro-2-acid phosphoxypropyl acrylate, and 3-chloro-2-acid phosphoxypropyl methacrylate. Among these, acid phosphoxyethyl methacrylate is more preferable because its homopolymer can contribute to obtaining the multilayer structure excellent in flexibility. The monomers that can be used in the present invention are not limited to the above ones. Some of these monomers are sold by Unichemical Limited under the trade name "Phosmer", and are freely available by purchase.

The polymer (E) may be a homopolymer of a monomer represented by the general formula (IV), may be a copolymer formed by combination of two or more monomers represented by the general formula (IV), or may be a copolymer of at least one monomer represented by the general formula (IV) and another vinyl monomer.

The other vinyl monomer that may be used in copolymerization with a monomer represented by the general formula (IV) is not particularly limited, and any commonly-known vinyl monomer copolymerizable with the monomer represented by the general formula (IV) can be used. Examples of such a vinyl monomer include acrylic acid, acrylic acid esters, methacrylic acid, methacrylic acid esters, acrylonitrile, methacrylonitrile, styrene, nuclear-substituted styrenes, alkylvinyl ethers, alkylvinyl esters, perfluoroalkyl vinyl ethers, perfluoroalkyl vinyl esters, maleic acid, maleic anhydride, fumaric acid, itaconic acid, maleimide, and phenylmaleimide. Among these vinyl monomers, methacrylic acid esters, acrylonitrile, styrenes, maleimide, and phenylmaleimide can be particularly preferably used.

In order to obtain the multilayer structure that has more excellent flexibility, the proportion of the structural unit derived from the monomer represented by the general formula (IV) in the total structural units of the polymer (E) is preferably 10 mol % or more, more preferably 20 mol % or more, even more preferably 40 mol % or more, and particularly preferably 70 mol % or more, and may be 100 mol %.

The polymer (E) is not particularly limited as long as it satisfies the above requirements. Other preferred examples thereof include a homopolymer or a copolymer of a vinylphosphonic acid compound containing a phosphoric acid group. The term "vinylphosphonic acid compound" as used herein refers to that which satisfies the requirements below.

(a) A substituted phosphonic acid, a substituted phosphinic acid, or an ester thereof.

(b) A carbon chain of the substituent is bonded to a phosphorus atom in the molecule (a phosphorus atom in a phosphonic acid group, phosphinic acid group, or ester thereof) via a phosphorus-carbon bond. A carbon-carbon double bond is present in the carbon chain. A part of the carbon chain may constitute a carbocyclic ring.

(c) At least one hydroxyl group is bonded to a phosphorus atom in the molecule (a phosphorus atom in a phosphonic acid group, phosphinic acid group, or ester thereof).

An example of the vinylphosphonic acid compound is a substituted phosphonic acid and/or phosphinic acid that satisfies the requirement (b). An example of the phosphonic acid compound is a substituted phosphonic acid that satisfies the requirement (b).

The number of carbon atoms contained in the carbon chain of the substituent bonded to the phosphorus atom may be in the range of 2 to 30 (e.g., in the range of 2 to 10). Examples of the substituent include hydrocarbon chains having a carbon-carbon double bond (e.g., a vinyl group, an allyl group, a 1-propenyl group, an isopropenyl group, a 2-methyl-1-propenyl group, a 2-methyl-2-propenyl group, a 1-butenyl group, a 2-butenyl group, a 3-butenyl group, a 1-pentenyl group, a 1-hexenyl group, a 1,3-hexadienyl group, and a 1,5-hexadienyl group). The hydrocarbon chain having a carbon-carbon double bond may contain one or more oxycarbonyl groups in the molecular chain. Examples of the carbocyclic ring include a benzene ring, a naphthalene ring, a cyclopropane ring, a cyclobutane ring, a cyclopentane ring, a cyclopropene ring, a cyclobutene ring, and a cyclopentene ring. In addition to the hydrocarbon chain having a carbon-carbon double bond in a carbocyclic ring, one or more saturated hydrocarbon chains (e.g., a methyl group, an ethyl group, and a propyl group) may be bonded. Examples of the substituent bonded to the phosphorus atom include: the above hydrocarbon chains having a carbon-carbon double bond such as a vinyl group; and carbocyclic rings, such as a 4-vinylbenzyl group, which include any of the above carbocyclic rings to which any of the above hydrocarbon chains is bonded.

The ester group constituting the ester has a structure in which the hydrogen atom of the hydroxyl group bonded to the phosphorus atom of phosphinic acid or phosphonic acid is substituted by an alkyl group. Examples of the alkyl group include a methyl group, an ethyl group, a propyl group, a butyl group, a pentyl group, and a hexyl group.

The polymer (E) can be obtained by polymerization of the vinylphosphonic acid compound as a monomer or by copolymerization of the vinylphosphonic acid compound as a monomer with another vinyl group-containing monomer. The polymer (E) can be obtained also by homopolymerization or copolymerization of a vinylphosphonic acid derivative such as a phosphonic acid halide or ester, followed by hydrolysis.

Examples of the vinylphosphonic acid compound that can be suitably used as a monomer include: alkenylphosphonic acids such as vinylphosphonic acid and 2-propene-1-phosphonic acid; alkenyl aromatic phosphonic acids such as 4-vinylbenzyl phosphonic acid and 4-vinylphenyl phosphonic acid; phosphono(meth)acrylic acid esters such as 6-[(2-phosphonoacetyl)oxy]hexyl acrylate, phosphonomethyl methacrylate, 11-phosphonoundecyl methacrylate, and 1,1-diphosphonoethyl methacrylate; and phosphinic acids such as vinylphosphinic acid and 4-vinylbenzyl phosphinic acid. Among these monomers, vinylphosphonic acid is more preferable because poly(vinylphosphonic acid), which is a homopolymer of vinylphosphonic acid, can contribute to obtaining the multilayer structure excellent in flexibility. It should be noted that the monomers that can be used are not limited to those mentioned above.

The polymer (E) may be a homopolymer of the vinylphosphonic acid compound as a monomer, may be a copolymer formed by use of two or more vinylphosphonic acid compounds as monomers, or may be a copolymer of at least one vinylphosphonic acid compound as a monomer and another vinyl monomer.

The other vinyl monomer that may be used in copolymerization with a vinylphosphonic acid compound as a monomer is not particularly limited, and any commonly-known vinyl monomer copolymerizable with the vinylphosphonic acid compound can be used. Examples of such a vinyl monomer include acrylic acid, acrylic acid esters, methacrylic acid, methacrylic acid esters, acrylonitrile, methacrylonitrile, styrene, nuclear-substituted styrenes, alkyl vinyl ethers, alkyl vinyl esters, perfluoroalkyl vinyl ethers, perfluoroalkyl vinyl esters, maleic acid, maleic anhydride, fumaric acid, itaconic acid, maleimide, and phenylmaleimide. Among these vinyl monomers, methacrylic acid esters, acrylonitrile, styrenes, maleimide, and phenylmaleimide can be particularly preferably used.

In order to obtain the multilayer structure that has more excellent flexibility, the proportion of the structural unit derived from the vinylphosphonic acid compound as a monomer in the total structural units of the polymer (E) is preferably 10 mol % or more, more preferably 20 mol % or more, even more preferably 40 mol % or more, and particularly preferably 70 mol % or more, and may be 100 mol %.

The polymer (E) may be a polymer having a repeating unit represented by the general formula (I) below, specifically poly(vinylphosphonic acid).

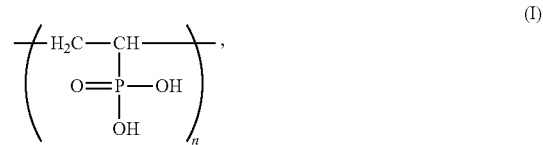

where n is a natural number.

The n is not particularly limited. The n is, for example, a number such that the number average molecular weight falls within the range specified below.

The molecular weight of the polymer (E) is not particularly limited. Typically, the number average molecular weight of the polymer (E) is in the range of 1,000 to 100,000. When the number average molecular weight is within this range, both the improvement effect of stacking of the layer (Z) on the flexibility and the viscosity stability of the later-described coating liquid (V) containing the polymer (E) can be achieved at high levels. When the weight of the polymer (E) per molecular moiety containing one phosphorus atom is in the range of 150 to 500, the improvement effect of stacking of the layer (Z) on the flexibility may be further increased.

The layer (Z) included in the multilayer structure may consist only of the polymer (E) containing a monomer unit having a phosphorus atom or may further contain another component.

Examples of the other component include: metal salts of inorganic acids, such as a metal carbonate, a metal hydrochloride, a metal nitrate, a metal hydrogen carbonate, a metal sulfate, a metal hydrogen sulfate, and a metal borate; metal salts of organic acids, such as a metal oxalate, a metal acetate, a metal tartrate, and a metal stearate; metal complexes such as a metal acetylacetonate complex (magnesium acetylacetonate etc.), a cyclopentadienyl metal complex (titanocene etc.), and a cyano metal complex; layered clay compounds; crosslinking agents; polymer compounds other than the polymer (E); plasticizers; antioxidants; ultraviolet absorbers; and flame retardants.

The content of the other component in the layer (Z) of the multilayer structure is preferably 50 mass % or less, more preferably 20 mass % or less, even more preferably 10 mass % or less, and particularly preferably 5 mass % or less, or may be 0 mass % (which means the other component is not contained).

The polymerization reaction for forming the polymer (E) can be performed using a polymerization initiator in a solvent in which both the monomer component as a raw material and the polymer to be produced are soluble. Examples of the polymerization initiator include: azo initiators such as 2,2-azobisisobutyronitrile, 2,2-azobis(2,4-dimethylvaleronitrile), dimethyl 2,2-azobis(2-methylpropionate), and dimethyl 2,2-azobisisobutyrate; and peroxide initiators such as lauryl peroxide, benzoyl peroxide, and tert-butyl peroctoate. When copolymerization is performed with another vinyl monomer, the solvent is selected as appropriate depending on the combination of the comonomers. Where necessary, a mixture of two or more solvents may be used.

In an example, the polymerization reaction is induced by adding a mixed solution containing a monomer, a polymerization initiator, and a solvent dropwise to a solvent at a polymerization temperature of 50 to 100° C., and is completed by performing stirring continuously for about 1 to 24 hours after the end of dropwise addition while maintaining a temperature that is equal to or higher than the polymerization temperature.

When the weight of the monomer component is defined as 1, the weight ratio of the solvent used is preferably about 1.0 to 3.0, and the weight ratio of the polymerization initiator used is preferably about 0.005 to 0.05. The more preferred weight ratio of the solvent is 1.5 to 2.5, and the more preferred weight ratio of the polymerization initiator is around 0.01. When the amounts of the solvent and the polymerization initiator used fall outside the above ranges, there may arise problematic situations, such as where the polymer gelatinizes and becomes insoluble in various solvents, with the result that coating with a solution becomes impossible.

The layer (Z) included in the multilayer structure can be formed by applying a solution of the polymer (E). Although any solvent may be used in the solution, examples of preferred solvents include water, alcohols, and mixed solvents thereof.

[Thickness of Layer (Z)]

The thickness of a single layer (Z) is 0.005 µm or more, preferably 0.03 or more, and more preferably 0.05 µm or more (e.g., 0.15 µm or more), in terms of further improving the flexibility of the multilayer structure. The upper limit of the thickness of the layer (Z) is not particularly specified; however, it is economically preferable to set the upper limit of the thickness of the layer (Z) at 1.0 µm because the improvement effect on the flexibility reaches a plateau when the thickness of the layer (Z) is increased above 1.0 µm. The thickness of the layer (Z) can be controlled by the concentration of the later-described coating liquid (V) used for forming the layer (Z) or by the method for application of the coating liquid (V).

[Base (X)]

The material of the base (X) included in the multilayer structure is not particularly limited, and a base made of any of various materials can be used. Examples of the material of the base (X) include: resins such as thermoplastic resins and thermosetting resins; fiber assemblies such as fabric and paper; wood; glass; metals; and metal oxides. The base may have a composite configuration made of a plurality of materials or may have a multilayer configuration.

The form of the base (X) is not particularly limited. The base (X) may be a laminar base such as a film or a sheet, or may be any of various formed bodies having a three-dimensional shape such as a spherical shape, a polygonal shape, or a pipe shape. Among these, a laminar base is useful for packaging foods etc.

Examples of the laminar base include a single-layer or multilayer base including at least one layer selected from the group consisting of a thermoplastic resin film layer, a thermosetting resin film layer, a fiber assembly sheet layer (a fabric layer, paper layer, or the like), a wood sheet layer, a glass layer, an inorganic deposited layer, a metal oxide layer, and a metal foil layer. Among these, a base including at least one layer selected from the group consisting of a thermoplastic resin film layer, a paper layer, and an inorganic deposited layer is preferable. Such a base may be a single-layer base or a multilayer base. The multilayer structure (laminated structure) that uses such a base is excellent in processability into a packaging material and various characteristics required for use as a packaging material.

Examples of the thermoplastic resin film for forming the thermoplastic resin film layer include films obtained by subjecting the following thermoplastic resins to forming processes: polyolefin resins such as polyethylene and polypropylene; polyester resins such as polyethylene terephthalate, polyethylene-2,6-naphthalate, polybutylene terephthalate, and copolymers thereof; polyamide resins such as nylon-6, nylon-66, and nylon-12; hydroxyl group-containing polymers such as polyvinyl alcohol and ethylene-vinyl alcohol copolymer; polystyrene; poly(meth)acrylic acid ester; polyacrylonitrile; polyvinyl acetate; polycarbonate; polyarylate; regenerated cellulose; polyimide; polyetherimide; polysulfone; polyethersulfone; polyetheretherketone; and ionomer resins. As the base of the laminated structure used in a packaging material for packaging foods etc., a film made of polyethylene, polypropylene, polyethylene terephthalate, nylon-6, or nylon-66 is preferable.

The thermoplastic resin film may be an oriented film or a non-oriented film. In terms of excellent suitability for processes (such as printing and lamination) of the resulting multilayer structure, an oriented film, particularly a biaxially-oriented film, is preferable. The biaxially-oriented film may be a biaxially-oriented film produced by any one method selected from simultaneous biaxial stretching, sequential biaxial stretching, and tubular stretching.

Examples of paper used in the paper layer include kraft paper, high-quality paper, simili paper, glassine paper, parchment paper, synthetic paper, white paperboard, manila board, milk carton board, cup paper, and ivory paper. A multilayer structure for a paper container can be obtained by use of the base that includes the paper layer.

The inorganic deposited layer is preferably one that has barrier properties against oxygen gas and/or water vapor. A layer having transparency or a layer having light shielding properties, as exemplified by a deposited layer of metal such as aluminum, can be used as the inorganic deposited layer as appropriate. The inorganic deposited layer can be formed by vapor-depositing an inorganic substance onto a deposition substrate, and the entire laminate including the deposition substrate and the inorganic deposited layer formed on the substrate can be used as the base (X) that has a multilayer configuration. Examples of the inorganic deposited layer having transparency include: a layer formed of an inorganic oxide such as aluminum oxide, silicon oxide, silicon oxynitride, magnesium oxide, tin oxide, or a mixture thereof; a layer formed of an inorganic nitride such as silicon nitride or silicon carbonitride; and a layer formed of an inorganic carbide such as silicon carbide. Among these, a layer formed of aluminum oxide, silicon oxide, magnesium oxide, or silicon nitride is preferable in terms of excellent barrier properties against oxygen gas and/or water vapor.

The preferred thickness of the inorganic deposited layer varies depending on the types of the constituents of the inorganic deposited layer, but is generally in the range of 2 to 500 nm. A thickness that provides good barrier properties and mechanical properties to the multilayer structure may be selected within the range. If the thickness of the inorganic deposited layer is less than 2 nm, the repeatability of exhibition of the barrier properties of the inorganic deposited layer against oxygen gas and/or water vapor is likely to be reduced, and a situation may also arise where the inorganic deposited layer does not exhibit sufficient barrier properties. If the thickness of the inorganic deposited layer is more than 500 nm, the barrier properties of the inorganic deposited layer are likely to be deteriorated when the multilayer structure is pulled or bent. The thickness of the inorganic deposited layer is more preferably in the range of 5 to 200 nm, and even more preferably in the range of 10 to 100 nm.

Examples of the method for forming the inorganic deposited layer include vacuum deposition, sputtering, ion plating, and chemical vapor deposition (CVD). Among these, vacuum deposition is preferable in terms of productivity. A heating technique used for vacuum deposition is preferably any one technique selected from electron beam heating, resistive heating, and induction heating. In order to improve the denseness of the inorganic deposited layer and the adhesiveness of the inorganic deposited layer to the deposition substrate on which it is formed, the deposition may be performed by employing plasma-assisted deposition or ion beam-assisted deposition. In order to increase the transparency of the inorganic deposited layer, reactive deposition in which a reaction is induced by blowing oxygen gas or the like may be employed for the deposition.

In the case where the base (X) is in laminar form, the thickness of the base (X) is preferably in the range of 1 to 1000 μm, more preferably in the range of 5 to 500 μm, and even more preferably in the range of 9 to 200 μm, in terms of good mechanical strength and processability of the resulting multilayer structure.

[Adhesive Layer (H)]

In the multilayer structure, the layer (Y) and/or the layer (Z) may be stacked in direct contact with the base (X). Alternatively, the layer (Y) and/or the layer (Z) may be stacked over the base (X) with an adhesive layer (H) interposed between the base (X) and the layer (Y) and/or the layer (Z). With this configuration, the adhesion between the base (X) and the layer (Y) and/or the layer (Z) can be enhanced in some cases. The adhesive layer (H) may be formed of an adhesive resin. The adhesive layer (H) made of an adhesive resin can be formed by treating the surface of the base (X) with a commonly-known anchor coating agent or by applying a commonly-known adhesive onto the surface of the base (X). Preferred as the adhesive is a two-component reactive polyurethane adhesive composed of a polyisocyanate component and a polyol component which are to be mixed and reacted. There may be a case where the adhesion can be further enhanced by adding a small amount of additive such as a commonly-known silane coupling agent into the anchor coating agent or the adhesive. Suitable examples of the silane coupling agent include a silane coupling agent having a reactive group such as an isocyanate group, an epoxy group, an amino group, a ureido group, or a mercapto group. Strong adhesion between the base (X) and the layer (Y) and/or the layer (Z) via the adhesive layer (H) makes it possible to more effectively prevent deterioration in the gas barrier properties and appearance of the multilayer structure when the multilayer structure is subjected to a process such as printing or lamination.

Increasing the thickness of the adhesive layer (H) can enhance the strength of the multilayer structure. However, when the adhesive layer (H) is too thick, the appearance tends to be deteriorated. The thickness of the adhesive layer (H) is preferably in the range of 0.03 to 0.18 μm. With this configuration, deterioration in the gas barrier properties and appearance of the multilayer structure can be prevented more effectively when the multilayer structure is subjected to a process such as printing or lamination. Furthermore, the drop impact resistance of a packaging material using the multilayer structure can be enhanced. The thickness of the adhesive layer (H) is more preferably in the range of 0.04 to 0.14 μm, and even more preferably in the range of 0.05 to 0.10 μm.

[Configuration of Multilayer Structure]

The multilayer structure (laminate) may consist only of the base (X), the layer (Y), and the layer (Z) or may consist only of the base (X), the layer (Y), the layer (Z), and the adhesive layer (H). The multilayer structure may include a plurality of layers (Y) and/or layers (Z). The multilayer structure may further include another member (e.g., another layer such as a thermoplastic resin film layer, a paper layer, or an inorganic deposited layer) other than the base (X), the layer (Y), the layer (Z) and the adhesive layer (H). The multilayer structure that has such another member (another layer or the like) can be produced, for example, by stacking the layer (Y) and the layer (Z) onto the base (X) directly or with the adhesive layer (H) interposed therebetween, and then by forming or adhering the other member (another layer or the like) onto the laminate directly or with an adhesive layer interposed therebetween. By having such another member (another layer or the like) included in the multilayer structure, the multilayer structure can be improved in its characteristics or endowed with additional characteristics. For example, heat-sealing properties can be imparted to the multilayer structure, or its barrier properties or mechanical properties can be further improved.

In particular, by forming a layer of a polyolefin as an outermost layer of the multilayer structure, heat-sealing properties can be imparted to the multilayer structure, or the mechanical characteristics of the multilayer structure can be improved. In terms of heat-sealing properties or improvement in mechanical characteristics, the polyolefin is preferably polypropylene or polyethylene. In addition, in order to improve the mechanical characteristics of the multilayer structure, at least one film selected from the group consisting of a film made of a polyester, a film made of a polyamide, and a film made of a hydroxyl group-containing polymer is preferably provided as another layer. In terms of improvement in mechanical characteristics, polyethylene terephthalate (PET) is preferable as the polyester, nylon-6 is preferable as the polyamide, and ethylene-vinyl alcohol copolymer is preferable as the hydroxyl group-containing polymer. Between the layers, an anchor coat layer or a layer made of an adhesive may be provided as necessary.

The multilayer structure can be formed by stacking together at least one pair of the layer (Y) and the layer (Z) and at least another layer (including the base). Examples of the other layer include a polyester layer, a polyamide layer, a polyolefin layer (which may be a pigment-containing polyolefin layer, a heat-resistant polyolefin layer, or a biaxially-oriented heat-resistant polyolefin layer), a hydroxyl group-containing polymer layer (e.g., an ethylene-vinyl alcohol copolymer layer), a paper layer, an inorganic deposited film layer, a thermoplastic elastomer layer, and an adhesive layer. The number of these other layers, the number of the layers (Y), the number of the layers (Z), and the stacking order are not particularly limited as long as the multilayer structure includes the base, the layer (Y), and the layer (Z), and includes at least one pair of the layer (Y) and the layer (Z) that are contiguously stacked. A preferred example is a multilayer structure having a configuration including at least one set of the base (X), the layer (Y), and the layer (Z) that are stacked in order of base (X)/layer (Y)/layer (Z). The other layers may each be replaced by a formed body (formed body having a three-dimensional shape) that is made of the same material as the layer.

Specific examples of the configuration of the multilayer structure are listed below. In the specific examples listed below, each of the layers may be replaced by a formed body (formed body having a three-dimensional shape) that is made of the same material as the layer. Although the multilayer structure may have an adhesive layer as exemplified by the adhesive layer (H), such an adhesive layer is omitted in the specific examples listed below. In the following description, "layer (YZ)" refers to a structure composed of the layer (Y) and the layer (Z) stacked contiguously, and the order of arrangement may be the order of layer (Y)/layer (Z) or layer (Z)/layer (Y).

(1) Layer (YZ)/polyester layer,
(2) Layer (YZ)/polyester layer/layer (YZ),
(3) Layer (YZ)/polyamide layer,
(4) Layer (YZ)/polyamide layer/layer (YZ),
(5) Layer (YZ)/polyolefin layer,
(6) Layer (YZ)/polyolefin layer/layer (YZ),
(7) Layer (YZ)/hydroxyl group-containing polymer layer,
(8) Layer (YZ)/hydroxyl group-containing polymer layer/layer (YZ),
(9) Layer (YZ)/paper layer,
(10) Layer (YZ)/paper layer/layer (YZ),
(11) Layer (YZ)/inorganic deposited layer/polyester layer,
(12) Inorganic deposited layer/layer (YZ)/polyester layer,
(13) Layer (YZ)/inorganic deposited layer/polyamide layer,
(14) Inorganic deposited layer/layer (YZ)/polyamide layer,
(15) Layer (YZ)/inorganic deposited layer/polyolefin layer,
(16) Inorganic deposited layer/layer (YZ)/polyolefin layer,
(17) Layer (YZ)/inorganic deposited layer/hydroxyl group-containing polymer layer,
(18) Inorganic deposited layer/layer (YZ)/hydroxyl group-containing polymer layer,
(19) Layer (YZ)/polyester layer/polyamide layer/polyolefin layer,
(20) Layer (YZ)/polyester layer/layer (YZ)/polyamide layer/polyolefin layer,
(21) Polyester layer/layer (YZ)/polyamide layer/polyolefin layer,
(22) Layer (YZ)/polyamide layer/polyester layer/polyolefin layer,
(23) Layer (YZ)/polyamide layer/layer (YZ)/polyester layer/polyolefin layer,
(24) Polyamide layer/layer (YZ)/polyester layer/polyolefin layer,
(25) Layer (YZ)/polyolefin layer/polyamide layer/polyolefin layer,
(26) Layer (YZ)/polyolefin layer/layer (YZ)/polyamide layer/polyolefin layer,
(27) Polyolefin layer/layer (YZ)/polyamide layer/polyolefin layer,
(28) Layer (YZ)/polyolefin layer/polyolefin layer,
(29) Layer (YZ)/polyolefin layer/layer (YZ)/polyolefin layer,
(30) Polyolefin layer/layer (YZ)/polyolefin layer,
(31) Layer (YZ)/polyester layer/polyolefin layer,
(32) Layer (YZ)/polyester layer/layer (YZ)/polyolefin layer,
(33) Polyester layer/layer (YZ)/polyolefin layer,
(34) Layer (YZ)/polyamide layer/polyolefin layer,
(35) Layer (YZ)/polyamide layer/layer (YZ)/polyolefin layer,
(36) Polyamide layer/layer (YZ)/polyolefin layer,
(37) Layer (YZ)/polyester layer/paper layer,
(38) Layer (YZ)/polyamide layer/paper layer,
(39) Layer (YZ)/polyolefin layer/paper layer,
(40) Polyolefin layer/paper layer/polyolefin layer/layer (YZ)/polyester layer/polyolefin layer,
(41) Polyolefin layer/paper layer/polyolefin layer/layer (YZ)/polyamide layer/polyolefin layer,
(42) Polyolefin layer/paper layer/polyolefin layer/layer (YZ)/polyolefin layer,
(43) Paper layer/polyolefin layer/layer (YZ)/polyester layer/polyolefin layer,
(44) Polyolefin layer/paper layer/layer (YZ)/polyolefin layer,
(45) Paper layer/layer (YZ)/polyester layer/polyolefin layer,
(46) Paper layer/layer (YZ)/polyolefin layer,
(47) Layer (YZ)/paper layer/polyolefin layer,
(48) Layer (YZ)/polyester layer/paper layer/polyolefin layer,
(49) Polyolefin layer/paper layer/polyolefin layer/layer (YZ)/polyolefin layer/hydroxyl group-containing polymer layer,
(50) Polyolefin layer/paper layer/polyolefin layer/layer (YZ)/polyolefin layer/polyamide layer, and
(51) Polyolefin layer/paper layer/polyolefin layer/layer (YZ)/polyolefin layer/polyester layer.

[Characteristics and Applications of Multilayer Structure]

The multilayer structure can possess one or both of the features listed below. In a preferred example, the multilayer structure in which the thickness of the layer (Y) (or the total thickness of layers (Y) when the multilayer structure includes two or more layers (Y)) is 1.0 μm or less (e.g., 0.5 μm or more and 1.0 μm or less) possesses the features listed below. The details of the conditions for the oxygen transmission rate measurement will be described later in EXAMPLES. As confirmed in EXAMPLES, the (feature 1) can be possessed, for example, by a container itself.

(Feature 1) The oxygen transmission rate of the multilayer structure at 20° C. and 85% RH is 2 ml/(m$^2$·day·atm) or less, and preferably 1.5 ml/(m$^2$·day·atm) or less.

(Feature 2) The oxygen transmission rate at 20° C. and 85% RH is 4 ml/(m$^2$·day·atm) or less, and preferably 2.5 ml/(m$^2$·day·atm) or less, as measured after the multilayer structure is kept uniaxially stretched by 5% at 23° C. and 50% RH for 5 minutes.

The product of the present invention is excellent in gas barrier properties, and can maintain the gas barrier properties at a high level even when subjected to physical stresses such as deformation and impact. According to a preferred embodiment of the present invention, a product including a multilayer structure with excellent appearance as a constituent member can be obtained. The product according to a preferred embodiment of the present invention can be endowed with barrier properties against water vapor as well as the gas barrier properties. In this case, the product can maintain the water vapor barrier properties at a high level even when subjected to physical stresses such as deformation and impact. The product according to a preferred embodiment of the present invention can also be endowed with barrier properties against a functional gas such as gasoline.

The product of the present invention can be used in various applications. For example, the product in the form of a container can be preferably used for applications in which barrier properties against oxygen are required and for applications in which the air inside the container is replaced by any of various functional gases. For example, the container of the present invention is used preferably as a food container. When used as a food container, the container is suitably used particularly in a form having a fold line, such as in the form of a stand-up pouch. The container of the present invention can be used preferably not only as a food packaging material but also as a container for holding: daily commodities; chemicals such as agrochemicals and pharmaceuticals; medical devices; industrial materials such as machinery components and delicate materials; and garments. The container of the present invention can be used also as a gasoline tank. The product of the present invention is useful also as a container lid, a vacuum insulator, or the like.

[Form of Product]

The type of the product of the present invention is not particularly limited as long as the product includes a packaging material. Hereinafter, typical types of products, specifically a container, a container lid, and a vacuum insulator, will be described.

[Container]

The container may be a formed container or a joined container.

[Formed Container]

Generally, the formed container includes at least a barrier portion separating the interior of the container from the outside, and, depending on its type, further includes a grip portion for improving the convenience of transportation. The barrier portion of the formed container only has to include a packaging material including a multilayer structure as described below, and may further include a member other than the multilayer structure, such as a film having a printed indicator showing the contents. The part of the formed container other than the barrier portion may include a multilayer structure as described below, or may be composed only of a member other than the multilayer structure. For a container used in combination with a physically removable lid, the lid may include a multilayer structure as described below, or may be composed only of a member other than the multilayer structure. The formed container may consist entirely of a multilayer structure as described below. The formed container can be produced by, according to a conventionally-known production method, forming a gas barrier coating on a base including a formed body formed beforehand in a given shape and thereby obtaining a multilayer structure as described below.

The term "given shape" as used herein refers to a shape capable of functioning as a container, that is, a shape having a containing portion adapted to hold contents. Examples of the formed container include: thermoformed containers such as a cup and a tray; injection-molded containers such as a bottle, a cup, and a tray; and extrusion blow-molded containers such as a bottle and a tank. Many of such formed containers have a higher rigidity than containers fabricated by using a "film material" having such a pliability as described later, and therefore may be called "rigid container". The formed container may, as in a bottle or a cup, include an opening functioning as an outlet portion used to let out contents, and may include a lid member for closing this opening. The formed container is used for holding a beverage or a seasoning agent in many cases, but may be used also as a gasoline tank.

[Joined Container (Sheet-Joined Container)]

The joined container may be formed in a given shape capable of functioning as a container by subjecting a sheet-shaped packaging material such as a film material including a multilayer structure to a joining process. The joined container may be a container corresponding to at least one selected from a vertical form fill seal bag, a vacuum packaging bag, a pouch, a laminated tube container, an infusion bag, and a paper container. Among such joined containers, a container fabricated by subjecting a pliable film material to a joining process may be called a "flexible container". Some flexible containers have no opening for letting out contents and require cutting of the packaging material to let out contents.

For the joined container (e.g., a vertical form fill seal bag), heat sealing is performed in some cases. In the case where heat sealing is performed, it is generally necessary to dispose a heat-sealable layer on a side corresponding to the inner side of the container or on both sides corresponding to the inner side and outer side of the container. When the heat-sealable layer is provided only on a side corresponding to the inner side of the container (bag), the body portion of the container is generally sealed with a fin seal. When the heat-sealable layer is provided on both sides corresponding to the inner side and outer side of the container, the body portion is generally sealed with a lap seal. A polyolefin layer (which may be referred to as "PO layer" hereinafter) is preferable as the heat-sealable layer. The heat sealing is a technique useful for mass-producing containers through sealing of film materials.

The packaging material used in the fabrication of the joined container may be a film material having pliability. The term "material having pliability" is used herein to refer to a material that is pliable enough not to be damaged even when wound around the outer circumferential surface of a cylindrical core member having an outer diameter of 30 cm or even of 10 cm. This film material may consist only of a multilayer structure, or may further include another member stacked on the multilayer structure.

[Vertical Form Fill Seal Bag]

The joined container may be a vertical form fill seal bag. The vertical form fill seal bag is a bag produced by a vertical form fill seal machine. Various methods can be used for bag making by a vertical form fill seal machine. In any method, the contents are fed through the top opening of the bag into its interior, and then the opening is sealed to produce the vertical form fill seal bag. For example, the vertical form fill seal bag may consist of one film material heat-sealed at three portions, the upper edge, lower edge, and side.

Vertical form fill seal bags are often used for packaging foods, beverages, or the like in the form of a liquid, a viscous body, a powder, solids, or a mixture thereof. The vertical form fill seal bag which is an embodiment of the container of the present invention is excellent in gas barrier properties, and can maintain its gas barrier properties even when subjected to physical stresses such as deformation and impact; therefore, the vertical form fill seal bag can prevent quality degradation of the contents over a long period of time.

Hereinafter, a multilayer film including the base (X) and the layer (YZ) stacked on the base (X) may be referred to as a multilayer barrier film. Layers for imparting various characteristics (e.g., heat sealing properties) may be stacked to the multilayer barrier film. For example, the multilayer structure may have a configuration of multilayer barrier film/adhesive layer/polyolefin layer or a configuration of polyolefin layer/adhesive layer/multilayer barrier film/adhesive layer/polyolefin layer. That is, the multilayer structure may include a polyolefin layer disposed on one of the outermost surfaces. In addition, the multilayer structure may include a first polyolefin layer disposed on one of the outermost surfaces and a second polyolefin layer disposed on the other outermost surface. The first polyolefin layer and the second polyolefin layer may be the same or different.

The vertical form fill seal bag may be formed by stacking together at least one multilayer barrier film and at least another layer. Examples of the other layer include a polyester layer, a polyamide layer, a polyolefin layer, a paper layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the multilayer structure for the vertical form fill seal bag include a configuration of multilayer barrier film/polyamide layer/PO layer, a configuration of multilayer barrier film/PO layer, and a configuration of PO layer/multilayer barrier film/PO layer. In these configurations, for example, a polyamide film can be used as the base of the multilayer barrier film. The vertical form fill seal bag which is an embodiment of the joined container of the present invention can maintain its gas barrier properties even when subjected to physical stresses such as deformation and impact. Adhesive layers may be provided between the layers constituting the vertical form fill seal bag. In the case where the layer (YZ) of the multilayer structure lies on one surface of the base, the layer (YZ) may face either outwardly or inwardly of the vertical form fill seal bag.

An example of the vertical form fill seal bag is shown in FIG. 1. In the vertical form fill seal bag 1 shown as an example in FIG. 1, a film material 10 is sealed at three portions of the bag 1, an upper edge portion 11, a lower edge portion 12, and a longitudinal portion 15. In the seal bag 1 shown, the longitudinal portion 15 is disposed at a back surface 20's central portion extending from the upper edge portion 11 to the lower edge portion 12 so as to divide the back surface 20 into two. The film material 10 is sealed at the upper edge portion 11, the lower edge portion 12, and the longitudinal portion 15 in such a manner that the inner surfaces are in contact with each other. That is, the sealing at the longitudinal portion 15 is of the so-called fin seal type. The front surface (surface located opposite to the back surface and having the same shape as the back surface) of the seal bag 1, which is not shown in FIG. 1, is not divided by a sealed portion unlike the back surface 20, and is generally used as a surface indicating the contents or article. The longitudinal portion 15 may be disposed at either of the side edge portions 21 and 22, and in this case the back surface is not divided by a sealed portion either. The seal bag 1 shown is a bag produced by feeding, to a vertical form fill seal machine, one film material 10 having a width equal to the sum of twice the width of the back surface 20 (the total of the widths of the front and back surfaces) plus a width required for the sealing at the longitudinal portion 15. The upper edge portion 11, the lower edge portion 12, and the longitudinal portion 15 are all formed as straight sealed portions without branches. As thus far described, the vertical form fill seal bag in an embodiment is formed of one film material sealed at three portions, the upper edge portion corresponding to the upper side of the front and back surfaces of the bag, the lower edge portion corresponding to the lower side, and the longitudinal portion extending from the upper edge portion to the lower edge portion perpendicularly to the edge portions.

[Vacuum Packaging Bag]

The joined container may be a vacuum packaging bag. The vacuum packaging bag is a container that includes a film material as a barrier member and the interior of which is under reduced pressure. In the vacuum packaging bag, generally, the film material is deformed and closely adheres to the contents. The vacuum packaging bag can be produced using a nozzle-type or chamber-type vacuum packaging machine. The vacuum packaging bag is suitable for long-term storage of foods.

The vacuum packaging bag which is an embodiment of the joined container of the present invention is excellent in gas barrier properties, and is adapted to maintain the gas barrier properties when subjected to physical stresses such as deformation and impact. Therefore, the vacuum packaging bag undergoes little deterioration in gas barrier properties over a long period of time. The vacuum packaging bag is pliable, and closely adheres to solid-containing foods easily, so that degassing at the time of vacuum packaging is easy. Therefore, the vacuum packaging bag allows reduction in the amount of residual oxygen in the vacuum packaged product, and is thus excellent in long-term food storage performance. In addition, since angulated portions or creased portions are relatively unlikely to be formed after vacuum packaging, defects such as pin holes and cracks are relatively unlikely to occur. Furthermore, with the vacuum packaging bag, the occurrence of pin holes due to friction between the vacuum packaging bags or between the vacuum packaging bag and a cardboard can be prevented. Moreover, since the vacuum packaging bag is excellent in gas barrier properties and can maintain its gas barrier properties even when subjected to physical stresses such as deformation and impact, the vacuum packaging bag can prevent quality degradation of the contents (e.g., a food) over a long period of time.

The vacuum packaging bag may be formed by stacking together at least one multilayer barrier film and at least another layer. Examples of the other layer include a polyester layer, a polyamide layer, a polyolefin layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the multilayer structure for the vacuum packaging bag include a configuration of multilayer barrier film/polyamide layer/PO layer and a configuration of polyamide layer/multilayer barrier film/PO layer. In these configurations, for example, a polyamide film can be used as the base of the multilayer barrier film. The vacuum packaging bag using such a multilayer structure is excellent particularly in the gas barrier properties exhibited after vacuum packaging or after vacuum packaging and heat sterilization. Adhesive layers may be provided between the above layers. In the case where the layer (YZ) is stacked only on one surface of the base, the layer (YZ) may be located outwardly or inwardly of the base in the vacuum packaging bag.

In the vacuum packaging bag, generally, the separation barrier separating the interior of the bag from the outside of the bag is deformed so as to be in contact with the contents held in the bag. The contents typically consist of a food such as corn on the cob, bean, bamboo shoot, potato, chestnut, tea leaf, meet, fish, or confectionery.

Figure 2:
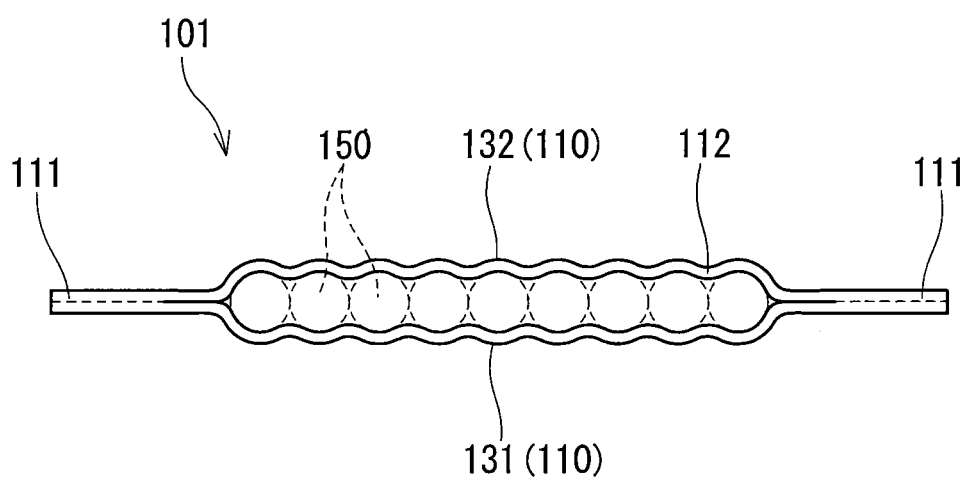
FIG. 2 is a cross-sectional view showing an embodiment of the vacuum packaging bag which is an example of the product of the present invention.

An embodiment of the vacuum packaging bag is shown as an example in FIG. 2. In this example, two film materials 131 and 132 separate the interior of the vacuum packaging bag 101 from the outside. The film materials 131 and 132 are joined (sealed) together at edges 111, and a reduced-pressure space hermetically-closed is formed between the film materials 131 and 132. The central portions 112 of the film materials 131 and 132, which are bounded by the edges 111, are deformed due to the reduced pressure of the interior of the bag, and some parts of the central portions are in contact with the contents 150, while other parts of the central portions are in contact with each other. The central portions 112 of the film materials 131 and 132 function as a separation barrier 110 separating the interior of the bag 101 from the outside.

[Pouch]

The joined container may be a pouch. The term "pouch" has been originally used to refer to a small bag. Nowadays, however, this term is used also to refer to a container including a film material as a barrier member and intended mainly to hold a food, a daily commodity, or a medical product as contents. In the present description, the term "pouch" is used in the latter meaning. The pouch is suitable for holding the contents in liquid or slurry form, and can be used also for holding the contents in solid form. The contents typically consist of a beverage, a seasoning agent, a food such as a liquid food, or a daily commodity such as a detergent or a liquid soap. Depending on its shape and use, the pouch may, for example, be called a spouted pouch, a zippered pouch, a flat pouch, a stand-up pouch, a horizontal form fill seal pouch, or a retort pouch, and correspond to at least one selected from these types of pouches.

A spouted pouch is a pouch including an outlet portion for the contents which is called a spout. The outlet portion is a tubular portion having a through hole in communication with the interior of the container. This tubular portion is generally connected to the main body of the pouch in such a manner as to protrude outwardly. In many cases, a freely openable lid is provided on the outlet portion. The spouted pouch is suitable for holding a fluid such as a liquid. The spouted pouch may also be called a spout pouch.

Spouted pouches can be used as containers for liquid beverages (e.g., soft drinks), jelly drinks, yogurts, fruit sauces, seasoning agents, functional water, liquid foods, etc. Also, such spouted pouches can be preferably used as containers for liquid medical products such as amino acid infusions, electrolyte infusions, carbohydrate infusions, and fat emulsions for infusions. The spouted pouch which is an embodiment of the container of the present invention is excellent in gas barrier properties, and can maintain its gas barrier properties even when subjected to physical stresses such as deformation and impact. Therefore, the use of the spouted pouch makes it possible to prevent the contents from being altered after transportation and after long-term storage. In addition, since the spouted pouch can maintain its good transparency, it is easy to identify the contents or to check for alteration of the contents caused by degradation.

The spouted pouch may be formed by stacking together at least one multilayer barrier film and at least another layer. Examples of the other layer include a polyester layer, a polyamide layer, a polyolefin layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the multilayer structure for the spouted pouch include a configuration of multilayer barrier film/polyamide layer/PO layer and a configuration of polyamide layer/multilayer barrier film/PO layer. Adhesive layers may be provided between the above layers. In the case where the layer (YZ) is stacked only on one surface of the base, the layer (YZ) may be located outwardly or inwardly of the base in the spouted pouch.

A zippered pouch is a pouch including a sealing zipper at its edge. The sealing zipper includes a pair of linear projections formed respectively on two opposing surfaces. The paired linear projections are adapted to keep the airtightness of the pouch when fitted to each other, and can freely be disengaged from each other. The zippered pouch is suitable for holding solids such as a dry preservative food. Examples of the preferred configuration of the multilayer structure for the zippered pouch are the same as those given for the spouted pouch, and are not mentioned again (the same applies to the pouches described below).

A stand-up pouch is a pouch provided with not only a side wall portion but also a bottom wall portion, which endows the pouch with self-standing ability. In a typical stand-up pouch, the side wall portion and the bottom wall portion form surfaces defined by a sealed portion projecting outwardly of the container, and this sealed portion (skirt portion) enhances the stability of the self-standing position. The stand-up pouch makes it possible to achieve both high quality of display in retail stores and high ease of disposal of the container from which the contents have been emptied. The stand-up pouch is also called a standing pouch.

A flat pouch is a planar-shaped pouch having two opposing wall portions sealed at all of their edges or is a planar-shaped pouch in which one edge of the two opposing wall portions is formed by folding and in which the other edges are sealed. The flat pouch is also called a flat-type pouch.

A retort pouch is a pouch used for packaging a retort food (retort pouch food). The retort pouch food enclosed in the pouch is heated as such at a given temperature for a given period of time for sterilization.

Figure 3:
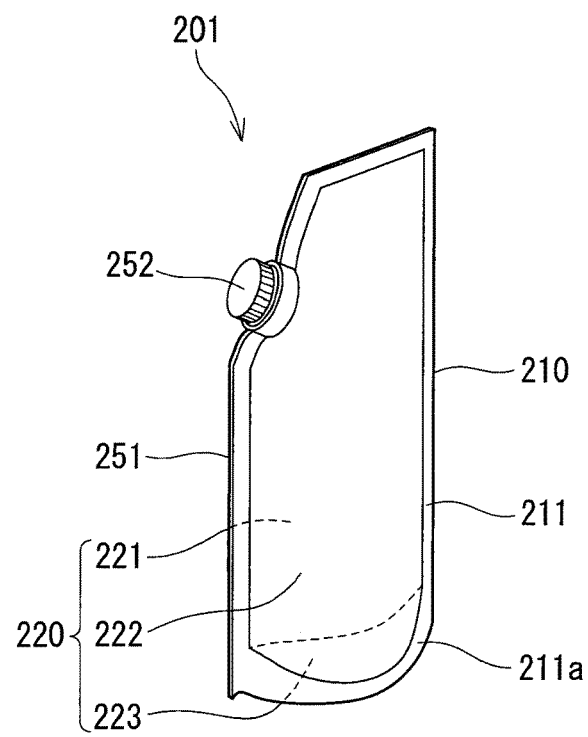
FIG. 3 is a perspective view showing an embodiment of the pouch which is an example of the product of the present invention.

An embodiment of the pouches is shown as an example in FIG. 3. The pouch 201 shown in FIG. 3 is an example of the spouted pouch, and includes a main body portion 251 formed by use of a film material 210 and a lidded spout 252 attached to the top of the main body portion 251. The lidded spout 252 includes: a spout having a through hole for communication between the inside and outside of the pouch 201; and a lid (cap) of the spout. The spout functions as an outlet portion for letting out the contents held in the interior of the pouch 201. The lid is designed to allow closing and opening of the through hole of the spout. The lid is designed, for example, to have a shape freely attachable to and detachable from the spout or to be freely movable between a closing position for closing the through hole of the spout and an opening position for opening the through hole while remaining connected to the spout. The lid may include, on its inner circumferential surface, a female thread corresponding to a male thread formed on the outer circumferential surface of the spout.

The main body portion 251 of the spouted pouch 201 includes a separation barrier 220 separating the interior of the pouch from the outside, and the separation barrier 220 is constituted by two side wall portions 221 and 222 and a bottom wall portion 223. The bottom surface formed by the bottom wall portion 223 endows the pouch 201 with the self-standing ability. This type of pouch is called a standing pouch, a stand-up pouch or the like, and can be made to stand by itself in a position where the wall portion 221 (222), which has the largest area among all of the wall portions 221, 222, and 223 constituting the separation barrier 220, forms a side surface of the pouch. This type of pouch exhibits high performance in terms of display in retail stores. In the pouch 201 shown, the bottom wall portion 223 is constituted by a gusset (bottom gusset) provided between the bottom sides of the side wall portions 221 and 222. The pouch 201 is also an example of the gusseted pouch. In the pouch 1, a skirt portion 211a joining (sealing) the side wall portions 221 and 222 to the bottom wall portion 223 projects downwardly to stabilize the self-standing position of the pouch 201.

The separation barrier 220 is formed of the film materials 210, and the film materials 210 are joined (sealed) together at their edges. The film materials 210 are sealed at a sealing portion 211 lying along the edges of the side wall portions 221 and 222 and the bottom wall portion 223. A part of the sealing portion 211, specifically a sealing portion surrounding the bottom wall portion 223, corresponds to the skirt portion 211a mentioned above.

Figure 4:
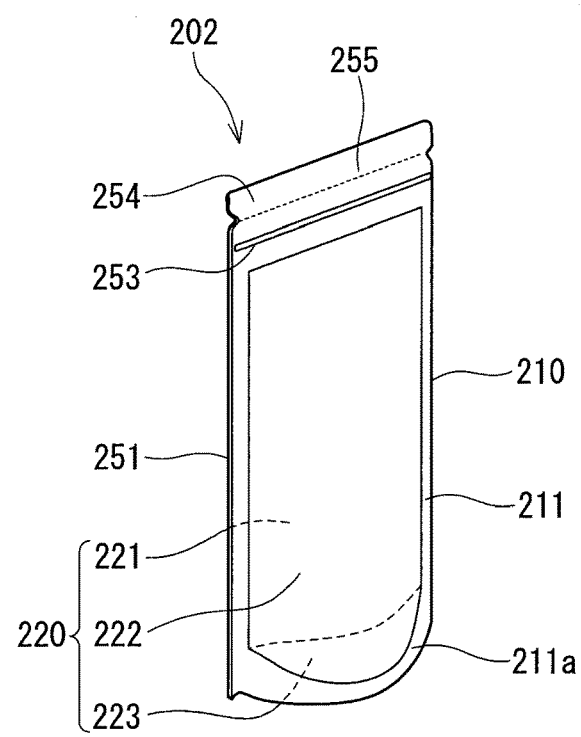
FIG. 4 is a perspective view showing another embodiment of the pouch which is an example of the product of the present invention.

Another embodiment of the pouches is shown as an example in FIG. 4. The pouch 202 shown in FIG. 4 is an example of the zippered pouch, and includes, instead of the lidded spout 252, a sealing zipper 253 at an edge of the main body portion 251. The sealing zipper 253 includes a pair of linear fitting portions formed respectively on two opposing surfaces. The interior of the pouch is shielded from the outside by fitting the linear fitting portions to each other, and the interior of the pouch is made open to the outside by disengaging the linear fitting portions from each other. For example, the linear fitting portions are constituted by a first linear projecting portion and a second projecting portion having a recess adapted to fit to the first projecting portion. In order to prevent the sealing zipper 253 from being opened before use, a sealing portion 254 may be provided further outwardly of the sealing zipper 253 as in the pouch 202. Letting out the contents from the pouch 202 is made possible by cutting off the upper sealing portion 254 along a cutting line 255 and then opening the sealing zipper 253.

Figure 5:
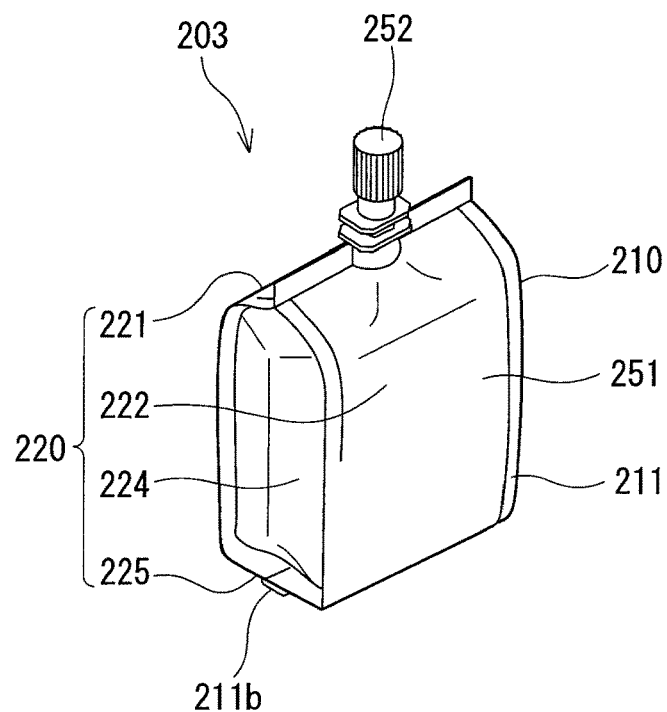
FIG. 5 is a perspective view showing still another embodiment of the pouch which is an example of the product of the present invention.

Still another embodiment of the pouches of the present invention is shown as an example in FIG. 5. The pouch 203 shown in FIG. 5, similarly to the pouch 201, includes the lidded spout 252, and is an example of the spouted pouch. The main body portion 251 of the pouch 203 includes a gusset (side gusset) 224 between the side wall portions 221 and 222. That is, the pouch 203 is also an example of the gusseted pouch. In the pouch 203, a lower sealing portion 211*b* of the sealing portion 211 connecting the side wall portions 221 and 222 to each other is folded and attached to a bottom surface 225 of the pouch 203, and the bottom surface 225 endows the pouch 203 with the self-standing ability. Similarly to the pouches 201 and 202, the pouch 203 is also an example of the standing pouch.

Figure 6:
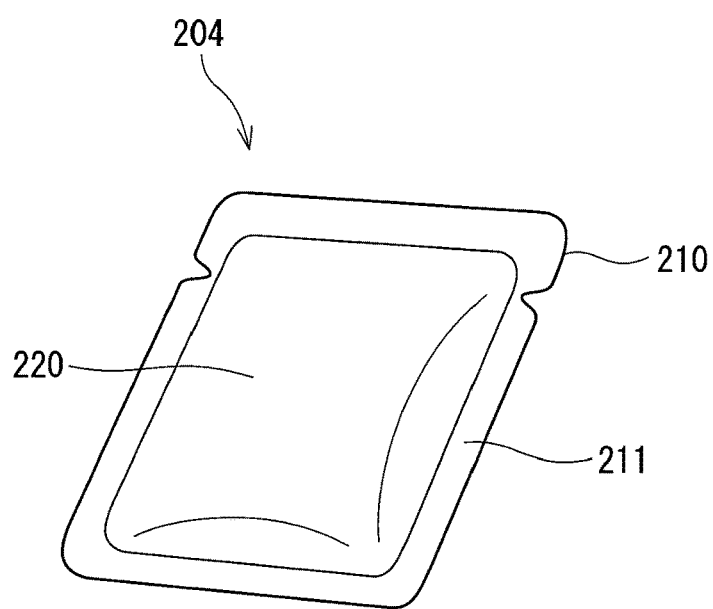
FIG. 6 is a perspective view showing still another embodiment of the pouch which is an example of the product of the present invention.
Figure 7:
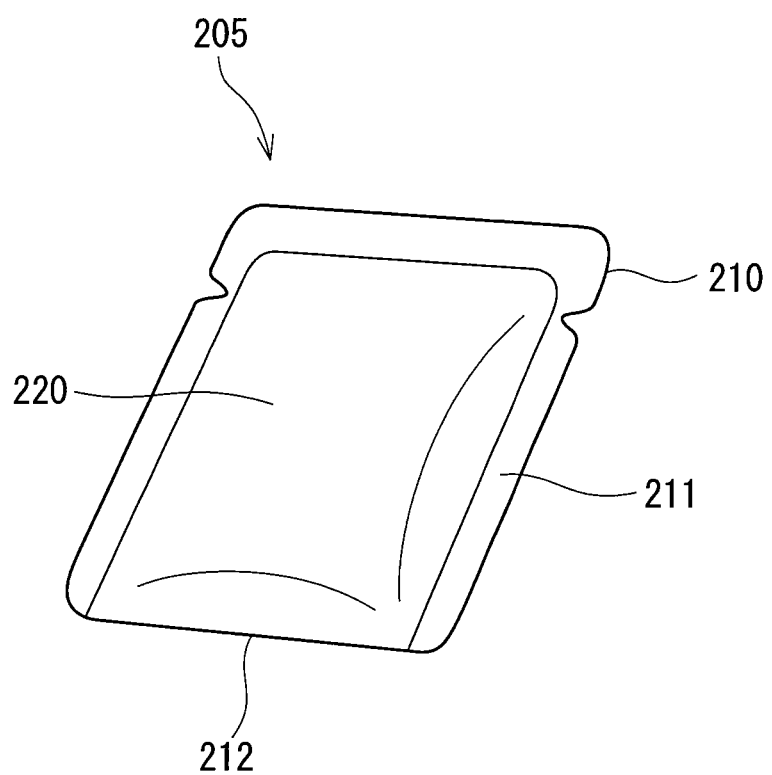
FIG. 7 is a perspective view showing still another embodiment of the pouch which is an example of the product of the present invention.

Still another embodiment of the pouches of the present invention is shown as an example in FIG. 6. The pouch 204 shown in FIG. 6 is an example of the flat pouch, and is in a form composed of two film materials 210 joined together at the sealing portion 211 along their edges. The separation barrier 220 of the pouch 204 is constituted by two surfaces bounded by the sealing portion 211 along their four sides. A three-side-seal pouch is shown as another example of the flat pouch in FIG. 7. The pouch 205 shown in FIG. 7 is formed by folding the film material 210 into two parts at a central folding portion 212 and joining the two parts at the sealing portion 211 along the three sides. The separation barrier 220 of the pouch 205 is constituted by the two surfaces connected to each other at the folding portion.

In the foregoing description of the embodiments of the pouches, the members denoted by the same reference characters have not been redundantly described.

Obviously, embodiments of the pouches are not limited to the embodiments shown in FIG. 3 to FIG. 7, and other examples include: a standing pouch that has no opening-closing mechanism and the contents of which are taken out by tearing the film material; a side-gusseted pouch lacking the self-standing ability (that is, a side-gusseted pouch of the flat type); a pouch (a pouch with an adhesive sheet) having a sheet with an adhesive layer as an opening-closing mechanism, the sheet covering an opening provided in the side wall portion of the main body portion. The pouch may be one that has an opening-closing mechanism, such as a spouted pouch, a zippered pouch, or a pouch with an adhesive sheet, or may have no opening-closing mechanism. The pouch may be a gusseted pouch or a pouch without a gusset. The pouch may be a standing pouch or a flat pouch. Depending on the contents or the treatment performed on the pouch, the pouch may be called a retort pouch regardless of its shape. The present invention can be also applied to such a pouch.

[Laminated Tube]

The joined container may be a laminated tube container. The laminated tube container includes: a barrel portion including a laminated film as a separation barrier separating the interior of the container from the outside; and an outlet portion for discharging the contents held in the interior of the container. More specifically, the laminated tube container has the shape of a tube including: a barrel portion having a tubular shape and having one end closed; and a shoulder portion disposed at the other end of the barrel portion and including the outlet portion. The laminated film forming the barrier member of the barrel portion preferably has pliability as specified above for the film material. The outlet portion generally includes a tubular portion having a through hole or a tubular portion having a bottomed hole having a bottom portion to be broken in use. In many cases where the outlet portion is a tubular portion having a through hole, a lid is detachably attached to the outlet portion. The laminated tube container is suitable as a container for a solid (semisolid) having flowability.

Laminated tube containers are often used to hold daily commodities typified by cosmetics, chemicals, medical products, foods, and dentifrices. The laminated tube container which is an embodiment of the joined container of the present invention is excellent in gas barrier properties and can maintain its gas barrier properties even when subjected to physical stresses such as deformation and impact. When the multilayer structure having excellent transparency is used in the laminated tube container, it is easy to identify the contents of the container or to check for alteration of the contents caused by degradation.

The laminated tube container may be formed by stacking together at least one multilayer barrier film and at least another layer. Examples of the other layer include a polyamide layer, a polyolefin layer (which may be a pigment-containing polyolefin layer), an inorganic deposited film layer, an EVOH layer, and an adhesive layer. The number and stacking order of these layers are not particularly limited. In the case where heat sealing is performed, a configuration adapted for that purpose is employed.

Particularly preferred configurations for the laminated tube container include a configuration of PO layer/multilayer barrier film/PO layer and a configuration of PO layer/pigment-containing PO layer/PO layer/multilayer barrier film/PO layer. Adhesive layers may be disposed between the above layers. In the case where the layer (YZ) is stacked only on one surface of the base, the layer (YZ) may be located outwardly or inwardly of the base in the laminated tube container.

Figure 8:
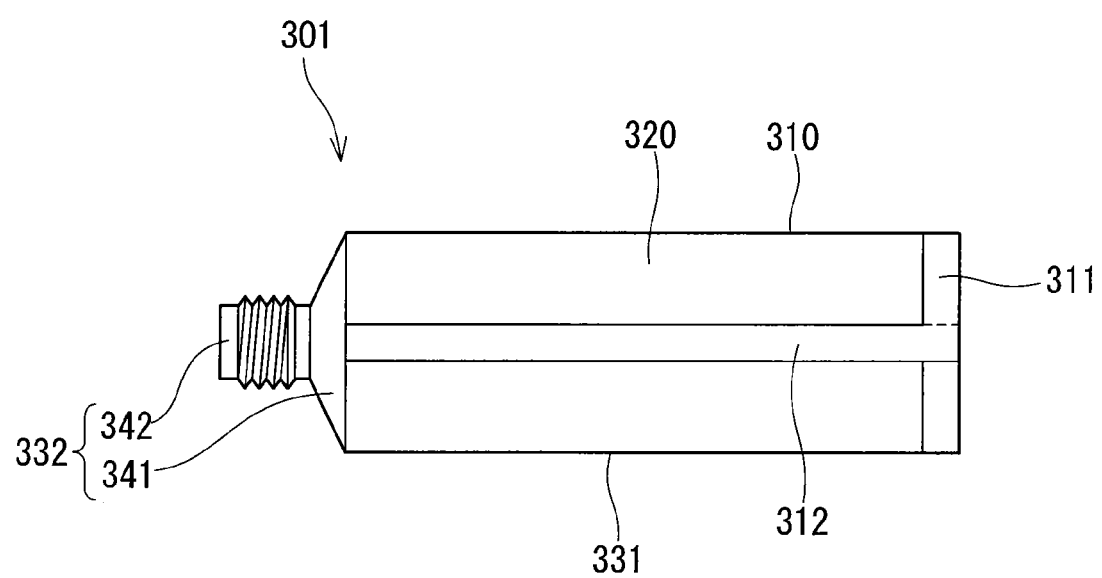
FIG. 8 is a side view showing an embodiment of the laminated tube container which is an example of the product of the present invention.

An embodiment of the laminated tube container is shown as an example in FIG. 8. In this example, the laminated tube container 301 includes a barrel portion 331 and a shoulder portion 332 having an outlet portion 342. The barrel portion 331 is a tubular portion and has one end closed. The shoulder portion 332 includes: the outlet portion 342 having a tubular shape and having a through hole (outlet orifice); and a base portion 341 having the shape of a hollow circular truncated cone. The outlet portion 342 has a male thread on its outer circumferential surface, and is closed by attaching an unillustrated lid having a female thread corresponding to the male thread. A bottomed hole having a bottom portion breakable in use may be provided instead of the through hole in the outlet portion 342. The barrel portion 331 is formed by rolling one laminated film (film material) 310 into a tube, joining (sealing) the opposing side edges, and sealing one of the two open ends along a straight line to close the one end. As a result of the sealing, the barrel portion 331 is provided with a longitudinal sealing portion 312 extending longitudinally over the barrel portion 331 and an end sealing portion 311 at which the end opposite to the shoulder portion 332 is closed. As the shoulder portion 332, a formed body of metal, resin or the like formed beforehand can be used.

The filling of the laminated tube container 301 with contents can be carried out through an opening which is finally closed to form the end sealing portion 311. In this case, the barrel portion 331 formed in a tubular shape by joining at the sealing portion 312 on a side surface and the shoulder portion 332 are joined together beforehand, a lid is disposed on the outlet portion 342 of the shoulder portion 332 where necessary, and then the interior of the container is filled with the contents through the open end of the barrel portion 331 that is located opposite to the shoulder portion 332.

The major potion (e.g., 60% or more, 70% or more, 80% or more, or 90% or more) of a separation barrier 320 separating the interior of the laminated tube container 301 from the outside may lie in the barrel portion 331. The separation barrier 320 in the barrel portion 331 is constituted by the laminated film 310.

[Infusion Bag]

The joined container may be an infusion bag. The infusion bag is a bag holding an infusion drug as contents, and includes a film material as a separation barrier separating the bag's interior for holding an infusion drug from the outside. The infusion bag may include a plug member in addition to a bag body holding the contents. Also, the infusion bag may have a hanging hole for hanging the bag.

Infusion bags can be used as containers for liquid medical products such as amino acid infusions, electrolyte infusions, carbohydrate infusions, and fat emulsions for infusions. The given infusion bag which is an embodiment of the joined container of the present invention is excellent in gas barrier properties and can maintain its gas barrier properties even when subjected to physical stresses such as deformation and impact. Therefore, with the infusion bag, it is possible to prevent the packed liquid medical product from being altered before, during and after heat sterilization, after transportation, and after storage.

The infusion bag may be formed by stacking together at least one multilayer barrier film and at least another layer. Examples of the other layer include a polyamide layer, a polyolefin layer, an inorganic deposited film layer, an EVOH layer, a thermoplastic elastomer layer, and an adhesive layer. The number and stacking order of these layers are not particularly limited. In the case where heat sealing is performed, a configuration adapted for that purpose is employed.

Particularly preferred configurations of the multilayer structure for the infusion bag include a configuration of multilayer barrier film/polyamide layer/PO layer and a configuration of polyamide layer/multilayer barrier film/PO layer. Adhesive layers may be disposed between the above layers. In the case where the layer (YZ) is stacked only on one surface of the base, the layer (YZ) may be located outwardly or inwardly of the base in the infusion bag.

Figure 9:
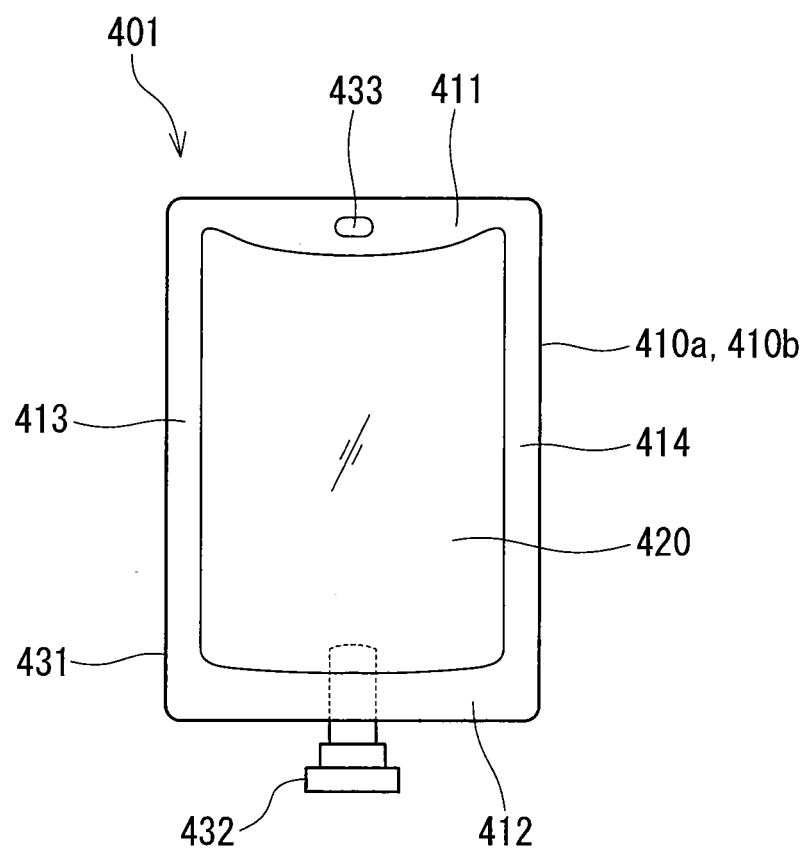
FIG. 9 is a front view showing an embodiment of the infusion bag which is an example of the product of the present invention.

An embodiment of the infusion bag of the present invention is shown as an exampled in FIG. 9. The infusion bag 401 includes a bag body 431 and a plug member 432 attached at an edge 412 of the bag body 431. The plug member 432 functions as a passage for letting out an infusion held in the interior of the bag body 431. The bag body 431 is provided with a hanging hole 433 at an edge 411 opposite to the edge 412 at which the plug member 432 is attached. When the infusion bag 401 is hung by means of the hanging hole 433 in a position where the edge 411 forms an upper end, the infusion in the bag 401 is easily discharged through the plug member 432 disposed at the edge 412 forming a lower end. The bag body 431 is constituted by two film materials 410a and 410b joined together at the edges 411, 412, 413, and 414. More specifically, the film materials 410a and 410b are closely joined together at the upper edge 411 and the side edges 413 and 414 over their entire lengths, and are closely joined at the lower edge 412 excluding the portion in which the plug member 432 is inserted. The central portions of the film materials 410a and 410b, which are bounded by the edges 411, 412, 413, and 414 of the bag body 431, define a space for holding an infusion, and function as a separation barrier 420 separating the interior of the bag from the outside of the bag.

The plug member 432 also functions as a part of the separation barrier; however, the major portion (e.g., 70% or more, 80% or more, or 90% or more) of the separation barrier 420 of the infusion bag 401 may lie in the bag body 431.

[Paper Container]

The joined container may be a paper container. The paper container is a container having a separation barrier separating the container's interior holding contents from the outside, the separation barrier including a paper layer. The separation barrier includes a multilayer structure, and the multilayer structure includes the base (X), the layer (Y), and the layer (Z). The paper layer may be included in the base (X), may be included in a layered portion of the separation barrier exclusive of the base (X), the layer (Y), and the layer (Z), or may be included both in the base (X) and in the layered portion exclusive of the base (X), the layer (Y), and the layer (Z). The paper container may be formed in a given shape having a bottom, such as a shape of the brick type or the gable top type.

The paper container which is an embodiment of the joined container of the present invention undergoes only slight deterioration in gas barrier properties even when subjected to a folding process. The paper container is used preferably as a container with a window. In this case, it is advantageous to use the layer (YZ) having high transparency. In such a paper container with a window, the paper layer is removed from that portion of the base at which the window of the container is located, and the contents are made visible through the window. The paper container is also suitable for heating by a microwave oven.

The paper container may be formed by stacking together at least one multilayer barrier film and at least another layer. Examples of the other layer include a polyester layer, a polyamide layer, a polyolefin layer (which may be a heat-resistant polyolefin layer or a biaxially-oriented heat-resistant polyolefin layer), an inorganic deposited film layer, a hydroxyl group-containing polymer layer, a paper layer, and an adhesive layer. The number and stacking order of these layers are not particularly limited. In the case where heat sealing is performed, a configuration adapted for that purpose is employed.

Particularly preferred configurations of the multilayer structure for the paper container include a configuration of heat-resistant polyolefin layer/paper layer/heat-resistant polyolefin layer/multilayer barrier film/heat-resistant polyolefin layer. Adhesive layers may be disposed between the above layers. In the above example, the heat-resistant polyolefin layers consist of, for example, either biaxially-oriented heat-resistant polyolefin films or non-oriented heat-resistant polyolefin films. In terms of ease of the forming process, the heat-resistant polyolefin layers disposed as the outermost layers of the multilayer structure are preferably non-oriented polypropylene films. Similarly, the heat-resistant polyolefin layer disposed inwardly of the outermost layers of the multilayer structure is preferably a non-oriented polypropylene film. In a preferred example, all the heat-resistant polyolefin layers included in the multilayer structure are non-oriented polypropylene films.

Figure 10:
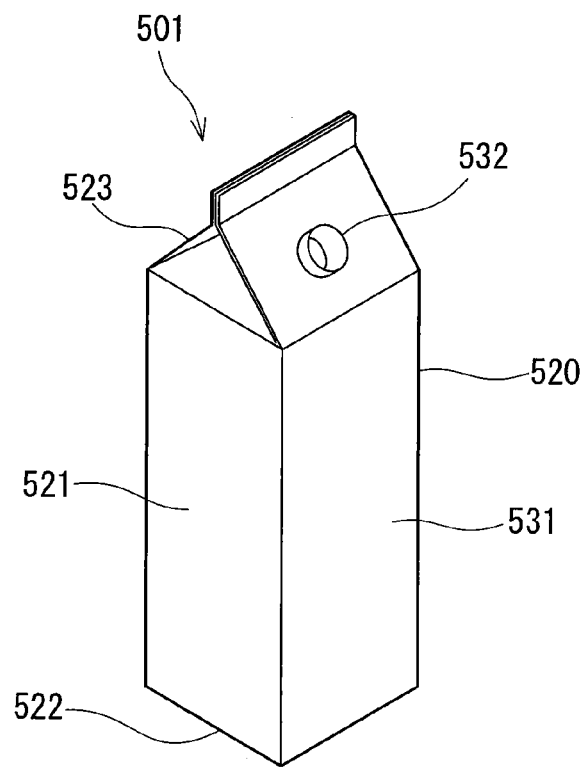
FIG. 10 is a perspective view showing an embodiment of the paper container which is an example of the product of the present invention.

An embodiment of the paper container is shown in FIG. 10. The paper container 501 has a shape called a gable top type. The paper container 501 includes a top portion 523 processed in the shape of a gable roof and a barrel portion having four side surfaces 521 and one bottom surface 522. The side surfaces 521 and the bottom surface 522 are rectangular, and two surfaces positioned contiguously (521, 521) (521, 522) are orthogonal to each other. The paper container 501 may have an outlet portion 532 provided at the top portion 523, in addition to a main body portion 531 including the barrel portion and the top portion 523. In the main body portion 531, a separation barrier 520 separating the interior of the container from the outside includes a multilayer structure with enhanced gas barrier properties.

Figure 11:
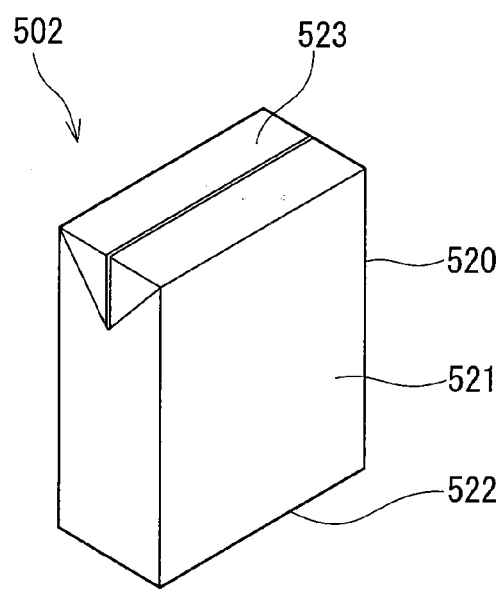
FIG. 11 is a perspective view showing another embodiment of the paper container which is an example of the product of the present invention.

Another embodiment of the paper container is shown in FIG. 11. The paper container 502 has a shape called a brick type. The paper container 502 has a top surface 523, four side surfaces 521, and a bottom surface 522, and two surfaces positioned contiguously (521, 521) (521, 522) (521, 523) are orthogonal to each other. Also in the paper container 502, the separation barrier 520 separating the interior of the container from the outside includes a multilayer structure with enhanced gas barrier properties.

Figure 12:
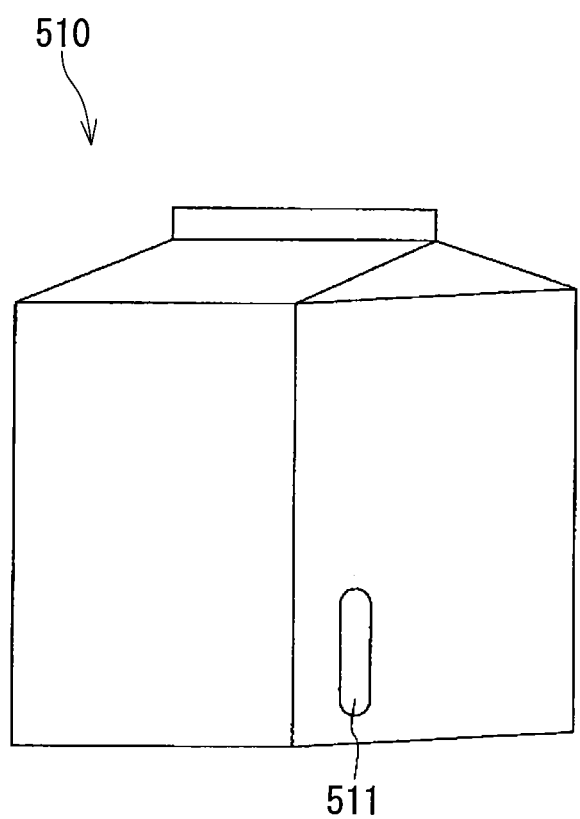
FIG. 12 is a schematic view for illustrating a window portion that may be provided in the paper container which is an example of the product of the present invention.

In the paper container 501 or 502, the entire separation barrier separating the interior of the container from the outside does not need to include a paper layer. For example, a transparent region may be formed by removing the paper layer from a part of the separation barrier. This region functions as a window portion which permits visual check for the amount or condition of the contents held in the paper container. An example of the paper container having a window portion is shown in FIG. 12. The paper container 510 has a window portion 511 on a side surface of the barrel potion. The separation barrier for fabricating the paper container 510 having the window portion 511 is preferably one in which the multilayer structure does not include any paper layer and in which the layered portion exclusive of the multilayer structure includes a paper layer. In this preferred example, the layer configuration of the multilayer structure with enhanced gas barrier properties is maintained also at the window portion 511 from which the paper layer has been removed.

The paper containers 501, 502, and 510 each include, as the separation barrier 520, a laminate including a multilayer structure. The paper container may include a member such as the outlet portion 532 in addition to the laminate including the multilayer structure. The thickness and material of the separation barrier 520 are not particularly limited as long as the separation barrier 520 is a laminate suitable for the paper containers 501, 502, and 510 and includes a multilayer structure as described below. The paper containers 501, 502, and 510 shown can each be obtained by subjecting a planar-shaped laminate to a folding or joining (sealing) process; however, the paper container may include, as a separation barrier, a laminate having a given three-dimensional shape.

When a paper container is fabricated by subjecting a laminate in the form of a sheet to a joining (sealing) process, a strip tape is sometimes used as a sealing portion of the laminate. The strip tape is a strip-shaped member disposed between edges of barrier members (laminates) constituting the separation barrier of the paper container to join the barrier members together. The paper container which is an embodiment of the joined container of the present invention may include a strip tape at a bonding portion at which the laminates are joined together. In this case, the strip tape may include a multilayer structure that has the same layer configuration as the multilayer structure included in the separation barrier of the paper container, and preferably further includes two polyolefin layers disposed as outermost layers for heat sealing. This strip tape can serve to prevent the property deterioration at the bonding portion where the gas barrier properties are prone to deterioration, and is useful for a paper container that does not fall under the category of the joined container of the present invention. That is, in another aspect, the present invention can provide a strip tape including a multilayer structure. This strip tape, similarly to the separation barrier constituting the paper container, includes a multilayer structure including at least one base (X), at least one layer (Y), and at least one layer (Z), the layer (Y) containing an aluminum atom, the layer (Z) containing a polymer (E) containing a monomer unit having a phosphorus atom, the multilayer structure including at least one pair of the layer (Y) and the layer (Z) that are contiguously stacked. The strip tape may include a paper layer. In this case, the paper layer, as in the separation barrier, is included, for example, in the base (X) included in the multilayer structure and/or in a layered portion of the strip tape exclusive of the base (X), the layer (Y), and the layer (Z).

[Container Lid]

The container lid includes a film material that, in a container formed by combining the container lid with a container body, functions as a part of a separation barrier separating the interior of the container from the outside of the container. The container lid is combined with a container body having an opening by heat sealing or by joining (sealing) using an adhesive so as to close the opening, and thus a container (lidded container) having a hermetically-closed internal space is formed. The container lid is generally joined to the container body at its edges. In this case, the central portion of the container lid, which is bounded by the edges, faces the internal space of the container. The container body is a formed body having, for example, a cup shape, a tray shape, or another shape, and includes a flange portion for sealing of the container lid, a wall portion, etc.

[Vacuum Insulator]

A vacuum insulator is a heat insulator including a sheath material and a core material placed in an interior bounded by the sheath material, the interior, in which the core material is placed, being under reduced pressure. Such a vacuum insulator is used in a heat insulating material for a refrigerator, a heat insulating panel for a residential house or the like as an alternative to a heat insulator made of urethane foam (polyurethane foam). A vacuum insulator with a thickness and weight smaller than those of a heat insulator made of urethane foam can provide heat insulating characteristics comparable to those provided by the heat insulator made of urethane foam. Vacuum insulators have increasingly expanded the range of applications and demands as heat insulators for insulation in heat transfer devices such as a heat pump-applied device, heat storage devices, residential spaces, vehicle interior spaces, etc.

Figure 13:
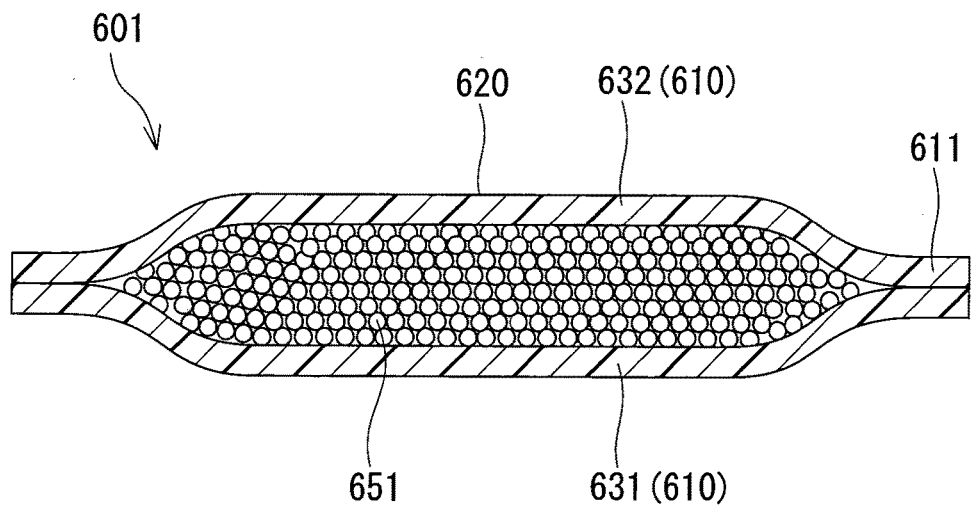
FIG. 13 is a cross-sectional view showing an embodiment of the vacuum insulator which is an example of the product of the present invention.

An embodiment of the vacuum insulator of the present invention is shown as an example in FIG. 13. The vacuum insulator 601 includes a powder as a core material 651. The core material 651 is placed in an interior bounded by a sheath material 610. The sheath material 610 is constituted by two film materials 631 and 632. The film materials 631 and 632 are joined together at their edges 611. The central portion of the sheath material 610, which is bounded by the edges 611, functions as a separation barrier 620 separating the interior holding the core material 651 from the outside, and closely adheres to the core material 651 due to the pressure difference between the inside and outside of the heat insulator.

Figure 14:
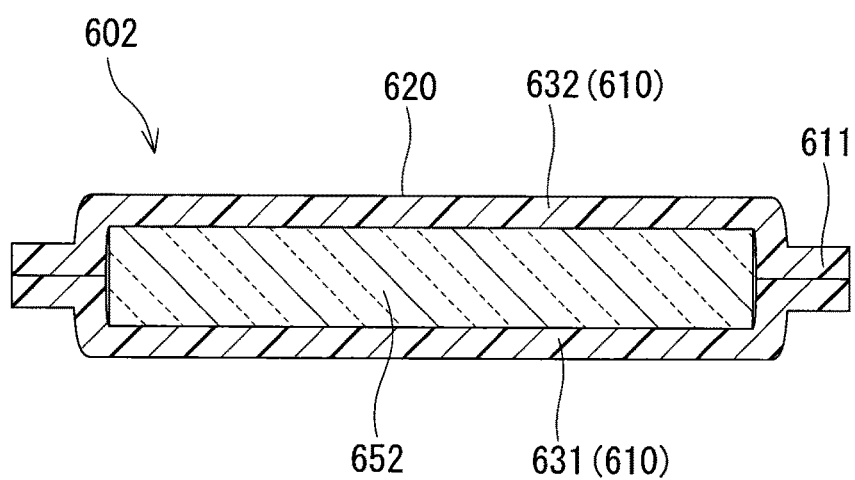
FIG. 14 is a cross-sectional view showing another embodiment of the vacuum insulator which is an example of the product of the present invention.

Another embodiment of the vacuum insulator of the present invention is shown as an example in FIG. 14. The vacuum insulator 602 differs from the vacuum insulator 601 by including a single formed body as a core material 652, but is structurally identical to the vacuum insulator 601 in the other respects. The core material 652 which is a formed body is typically foamed resin.

The ingredient and shape of the core material are not particularly limited as long as they are suitable for heat insulation. For example, perlite powder, silica powder, precipitated silica powder, diatomite, calcium silicate, glass wool, rock wool, artificial (synthetic) wool, or foamed resin (such as styrene foam and urethane foam) can be used as the core material. A hollow container formed in a given shape, a honeycomb structure or the like, can also be used as the core material.

[Method for Producing Multilayer Structure]

Hereinafter, a method for producing a multilayer structure will be described.

The method for producing a multilayer structure preferably includes a step (IV) of forming the layer (Z) by applying a coating liquid (V) containing the polymer (E) containing a monomer unit having a phosphorus atom.

The cases where the layer (Y) included in the multilayer structure is the layer (YB) which is a deposited layer of aluminum or the layer (YC) which is a deposited layer of aluminum oxide will not be described in detail since the layer (YB) and the layer (YC) can be formed by any of the common deposition methods mentioned above. The following will describe in detail particularly the case where the layer (Y) included in the multilayer structure is the layer (YA) containing the reaction product (R) formed by reaction between the metal oxide (A) containing at least aluminum and the phosphorus compound (B). As for the method for forming the layer (Z) (the step (IV) described later), the same method can be employed in any case where the layer (Y) is the layer (YA), the layer (YB), or the layer (YC).

In the case where the layer (Y) included in the multilayer structure is the layer (YA) containing the reaction product (R) formed by reaction between the metal oxide (A) containing at least aluminum and the phosphorus compound (B), the multilayer structure production method preferably includes the steps (I), (II), (III), and (IV). In the step (I), the metal oxide (A) containing at least aluminum, at least one compound containing a site capable of reacting with the metal oxide (A), and a solvent are mixed so as to prepare a coating liquid (U) containing the metal oxide (A), the at least one compound, and the solvent. In the step (II), the coating liquid (U) is applied onto the base (X) to form a precursor layer of the layer (YA) on the base (X). In the step (III), the precursor layer is heat-treated at a temperature of 110° C. or more to form the layer (YA) on the base (X). In the step (IV), the coating liquid (V) containing the polymer (E) containing a monomer unit having a phosphorus atom is applied to form the layer (Z). Typically, the steps (I), (II), (III), and (IV) are carried out in this order; however, when the layer (Z) is formed between the base (X) and the layer (YA), the step (IV) may be carried out before the step (II). Also, the step (III) can be carried out after the step (IV) as described later.

[Step (I)]

The at least one compound containing a site capable of reacting with the metal oxide (A), which is used in the step (I), may be referred to as "at least one compound (Z)" hereinafter. The step (I) includes, at least, mixing the metal oxide (A), the at least one compound (Z), and the solvent. In one aspect, a raw material containing the metal oxide (A) and the at least one compound (Z) is subjected to reaction in the solvent in the step (I). The raw material may contain another compound in addition to the metal oxide (A) and the at least one compound (Z). Typically, the metal oxide (A) is mixed in the form of particles.

In the coating liquid (U), the number of moles $N_M$ of the metal atoms (M) constituting the metal oxide (A) and the number of moles $N_P$ of the phosphorus atoms contained in the phosphorus compound (B) satisfy a relationship of $1.0 \leq$ (the number of moles $N_M$)/(the number of moles $N_P$)$\leq 3.6$. The preferred range of the value of (the number of moles $N_M$)/(the number of moles $N_P$) has previously been indicated, and therefore is not redundantly described.

The at least one compound (Z) includes the phosphorus compound (B). The number of moles of metal atoms contained in the at least one compound (Z) is preferably in the range of 0 to 1 times the number of moles of phosphorus atoms contained in the phosphorus compound (B). Typically, the at least one compound (Z) is a compound containing a plurality of sites capable of reacting with the metal oxide (A), and the number of moles of metal atoms contained in the at least one compound (Z) is in the range of 0 to 1 times the number of moles of phosphorus atoms contained in the phosphorus compound (B).

When the ratio, (the number of moles of metal atoms contained in the at least one compound (Z))/(the number of moles of phosphorus atoms contained in the phosphorus compound (B)), is adjusted in the range of 0 to 1 (e.g., in the range of 0 to 0.9), a multilayer structure that has more excellent gas barrier properties can be obtained. In order to further improve the gas barrier properties of the multilayer structure, the ratio is preferably 0.3 or less, more preferably 0.05 or less, and even more preferably 0.01 or less, and may be 0. Typically, the at least one compound (Z) consists only of the phosphorus compound (B). In the step (I), the ratio can easily be lowered.

The step (I) preferably includes the following steps (a) to (c).

Step (a): Step of preparing a liquid (S) containing the metal oxide (A)

Step (b): Step of preparing a solution (T) containing the phosphorus compound (B)

Step (c): Step of mixing the liquid (S) and the solution (T) obtained in the steps (a) and (b)

The step (b) may be performed prior to, simultaneously with, or subsequent to the step (a). Hereinafter, each of the steps will be described more specifically.

In the step (a), the liquid (S) containing the metal oxide (A) is prepared. The liquid (S) is a solution or a dispersion. The liquid (S) can be prepared, for example, by a technique employed in commonly-known sol-gel processes. For example, the liquid (S) can be prepared by mixing the above-mentioned compound (L)-based substance, water, and, as necessary, an acid catalyst and/or organic solvent, and by subjecting the compound (L)-based substance to condensation or hydrolytic condensation using a technique employed in commonly-known sol-gel processes. A dispersion of the metal oxide (A) obtained by condensation or hydrolytic condensation of the compound (L)-based substance can as such be used as the liquid (S) containing the metal oxide (A). Where necessary, however, the dispersion may be subjected to a particular process (deflocculation as described above, addition or removal of the solvent for concentration control, or the like).

The step (a) may include a step of subjecting, to condensation (e.g., hydrolytic condensation), at least one selected from the group consisting of the compound (L) and a hydrolysate of the compound (L). Specifically, the step (a) may include a step of subjecting, to condensation or hydrolytic condensation, at least one selected from the group consisting of the compound (L), a partial hydrolysate of the compound (L), a complete hydrolysate of the compound (L), a partial hydrolytic condensate of the compound (L), and a condensate formed by condensation of a part of a complete hydrolysate of the compound (L).

Another example of the method for preparing the liquid (S) is a method including the following steps. First, a metal is gasified in the form of metal atoms by thermal energy, and the metal atoms are brought into contact with a reaction gas (oxygen) to generate molecules and clusters of a metal oxide. Thereafter, the molecules and clusters are cooled instantly to produce small-diameter particles of the metal oxide (A). Next, the particles are dispersed in water or an organic solvent to obtain the liquid (S) (a dispersion containing the metal oxide (A)). In order to enhance the dispersibility in water or an organic solvent, the particles of the metal oxide (A) may be subjected to surface treatment, or a stabilizing agent such as a surfactant may be added. The dispersibility of the metal oxide (A) may be improved by pH control.

Still another example of the method for preparing the liquid (S) is a method in which the metal oxide (A) in the form of a bulk is pulverized using a pulverizer such as a ball mill or a jet mill, and the pulverized metal oxide (A) is dispersed in water or an organic solvent to prepare the liquid (S) (a dispersion containing the metal oxide (A)). However, in the case of this method, control of the shape and size distribution of the particles of the metal oxide (A) may be difficult.

The type of the organic solvent usable in the step (a) is not particularly limited. For example, alcohols such as methanol, ethanol, isopropanol, and normal-propanol, are suitably used.

The content of the metal oxide (A) in the liquid (S) is preferably in the range of 0.1 to 40 mass %, more preferably in the range of 1 to 30 mass %, and even more preferably in the range of 2 to 20 mass %.

In the step (b), the solution (T) containing the phosphorus compound (B) is prepared. The solution (T) can be prepared by dissolving the phosphorus compound (B) in a solvent. In the case where the solubility of the phosphorus compound (B) is low, the dissolution may be promoted by heating treatment or ultrasonic treatment.

The solvent used for the preparation of the solution (T) may be selected as appropriate depending on the type of the phosphorus compound (B), and preferably contains water. As long as the dissolution of the phosphorus compound (B) is not hindered, the solvent may contain: an alcohol such as methanol or ethanol; an ether such as tetrahydrofuran, dioxane, trioxane, or dimethoxyethane; a ketone such as acetone or methyl ethyl ketone; a glycol such as ethylene glycol or propylene glycol; a glycol derivative such as methyl cellosolve, ethyl cellosolve, or n-butyl cellosolve; glycerin; acetonitrile; an amide such as dimethylformamide; dimethyl sulfoxide; sulfolane; or the like.

The content of the phosphorus compound (B) in the solution (T) is preferably in the range of 0.1 to 99 mass %, more preferably in the range of 0.1 to 95 mass %, and even more preferably in the range of 0.1 to 90 mass %. The content of the phosphorus compound (B) in the solution (T) may be in the range of 0.1 to 50 mass %, may be in the range of 1 to 40 mass %, or may be in the range of 2 to 30 mass %.

In the step (c), the liquid (S) and the solution (T) are mixed. When mixing the liquid (S) and the solution (T), it is preferable to perform the mixing at a reduced addition rate under vigorous stirring in order to suppress a local reaction. In this case, the solution (T) may be added to the liquid (S) that is being stirred, or the liquid (S) may be added to the solution (T) that is being stirred. When mixed in the step (c), both the liquid (S) and the solution (T) have a temperature of preferably 50° C. or less, more preferably 30° C. or less, even more preferably 20° C. or less. By adjusting their temperatures at the mixing to 50° C. or less, the metal oxide (A) and the phosphorus compound (B) can be homogeneously mixed, and the gas barrier properties of the resulting multilayer structure can be improved. Furthermore, the coating liquid (U) that is excellent in storage stability can be obtained in some cases by continuing the stirring further for about 30 minutes after the completion of the mixing.

The coating liquid (U) may contain the polymer (C). The method for having the polymer (C) contained in the coating liquid (U) is not particularly limited. For example, the polymer (C) in powder or pellet form may be added to and then dissolved in the liquid (S), the solution (T), or a mixture of the liquid (S) and the solution (T). Alternatively, a solution of the polymer (C) may be added to and mixed with the liquid (S), the solution (T), or a mixture of the liquid (S) and the solution (T). Alternatively, the liquid (S), the solution (T), or a mixture of the liquid (S) and the solution (T) may be added to and mixed with a solution of the polymer (C). By having the polymer (C) contained in either the liquid (S) or the solution (T) before the step (c), the rate of reaction between the metal oxide (A) and the phosphorus compound (B) is slowed during the mixing of the liquid (S) and the solution (T) in the step (c), with the result that the coating liquid (U) that is excellent in temporal stability may be obtained.

When the coating liquid (U) contains the polymer (C), a multilayer structure including the layer (YA) containing the polymer (C) can easily be produced.

The coating liquid (U) may contain, as necessary, at least one acid compound (D) selected from acetic acid, hydrochloric acid, nitric acid, trifluoroacetic acid, and trichloroacetic acid. Hereinafter, the at least one acid compound (D) may be simply abbreviated as the "acid compound (D)". The method for having the acid compound (D) contained in the coating liquid (U) is not particularly limited. For example, the acid compound (D) may as such be added to and mixed with the liquid (S), the solution (T), or a mixture of the liquid (S) and the solution (T). Alternatively, a solution of the acid compound (D) may be added to and mixed with the liquid (S), the solution (T), or a mixture of the liquid (S) and the solution (T). Alternatively, the liquid (S), the solution (T), or a mixture of the liquid (S) and the solution (T) may be added to and mixed with a solution of the acid compound (D). When either the liquid (S) or the solution (T) contains the acid compound (D) before the step (c), the rate of reaction between the metal oxide (A) and the phosphorus compound (B) is slowed during the mixing of the liquid (S) and the solution (T) in the step (c), with the result that the coating liquid (U) that is excellent in temporal stability may be obtained.

In the coating liquid (U) containing the acid compound (D), the reaction between the metal oxide (A) and the phosphorus compound (B) is suppressed. Therefore, precipitation or aggregation of the reaction product in the coating liquid (U) can be suppressed. Thus, the use of the coating liquid (U) containing the acid compound (D) may provide an improvement in the appearance of the resulting multilayer structure. In addition, the boiling point of the acid compound (D) is 200° C. or less. Therefore, in the production process of the multilayer structure, the acid compound (D) can easily be removed from the layer (YA), for example, by volatilizing the acid compound (D).

The content of the acid compound (D) in the coating liquid (U) is preferably in the range of 0.1 to 5.0 mass %, and more preferably in the range of 0.5 to 2.0 mass %. When the content is within these ranges, the effect of addition of the acid compound (D) is obtained, and the removal of the acid compound (D) is easy. In the case where an acid substance remains in the liquid (S), the amount of the acid compound (D) to be added may be determined in view of the amount of the residual acid substance.

The liquid obtained by the mixing in the step (c) can as such be used as the coating liquid (U). In this case, the solvent contained in the liquid (S) or the solution (T) generally acts as a solvent of the coating liquid (U). The coating liquid (U) may be prepared by performing a process on the liquid obtained by the mixing in the step (c). For example, a process such as addition of an organic solvent, adjustment of the pH, adjustment of the viscosity, or addition of an additive, may be performed.

An organic solvent may be added to the liquid obtained by the mixing in the step (c), to the extent that the stability of the resulting coating liquid (U) is not impaired. The addition of the organic solvent may make it easy to apply the coating liquid (U) onto the base (X) in the step (II). The organic solvent is preferably one capable of being uniformly mixed in the resulting coating liquid (U). Preferred examples of the organic solvent include: alcohols such as methanol, ethanol, n-propanol, and isopropanol; ethers such as tetrahydrofuran, dioxane, trioxane, and dimethoxyethane; ketones such as acetone, methyl ethyl ketone, methyl vinyl ketone, and methyl isopropyl ketone; glycols such as ethylene glycol and propylene glycol; glycol derivatives such as methyl cellosolve, ethyl cellosolve, and n-butyl cellosolve; glycerin; acetonitrile; amides such as dimethylformamide and dimethylacetamide; dimethyl sulfoxide; and sulfolane.

In terms of both the storage stability of the coating liquid (U) and the performance of the coating liquid (U) in its application onto the base, the solid content concentration in the coating liquid (U) is preferably in the range of 1 to 20 mass %, more preferably in the range of 2 to 15 mass %, and even more preferably in the range of 3 to 10 mass %. The solid content concentration in the coating liquid (U) can be calculated, for example, by adding a predetermined amount of the coating liquid (U) onto a petri dish, exposing the coating liquid (U) to a temperature of 100° C. together with the petri dish to remove volatile components such as the solvent, and dividing the mass of the remaining solid contents by the mass of the initially-added coating liquid (U). In that case, it is preferable that the mass of the remaining solid contents be measured each time drying is performed for a given period of time, and the solid content concentration be determined using the last-measured mass of the remaining solid contents when the difference between the values of the mass obtained by the two successive measurements has reduced to a negligible level.

In terms of the storage stability of the coating liquid (U) and the gas barrier properties of the multilayer structure, the pH of the coating liquid (U) is preferably in the range of 0.1 to 6.0, more preferably in the range of 0.2 to 5.0, and even more preferably in the range of 0.5 to 4.0.

The pH of the coating liquid (U) can be adjusted by a commonly-known method, and can be adjusted, for example, by addition of an acidic compound or a basic compound. Examples of the acidic compound include hydrochloric acid, nitric acid, sulfuric acid, acetic acid, butyric acid, and ammonium sulfate. Examples of the basic compound include sodium hydroxide, potassium hydroxide, ammonia, trimethylamine, pyridine, sodium carbonate, and sodium acetate.

The coating liquid (U) changes its state over time, and tends finally to be converted to a gel composition or to undergo precipitation. The time to occurrence of such a state change depends on the composition of the coating liquid (U). In order to stably apply the coating liquid (U) onto the base (X), the viscosity of the coating liquid (U) is preferably stable over a long period of time. When the viscosity at the completion of the step (I) is defined as a reference viscosity, it is preferable to prepare the solution (U) so that the viscosity measured with a Brookfield viscometer (B-type viscometer: 60 rpm) be five times or less the reference viscosity even after the coating liquid (U) is allowed to stand at 25° C. for two days. In many cases where the coating liquid (U) has a viscosity within such a range, the multilayer structure that is excellent in preservation stability and has more excellent gas barrier properties is obtained.

For example, adjustment of the solid content concentration, adjustment of the pH, or addition of a viscosity modifier can be employed as the method for adjusting the viscosity of the coating liquid (U) to the above range. Examples of the viscosity modifier include carboxymethyl cellulose, starch, bentonite, tragacanth gum, stearic acid salts, alginic acid salts, methanol, ethanol, n-propanol, and isopropanol.

The coating liquid (U) may contain another substance other than the above-described substances, as long as the effect of the present invention is obtained. For example, the coating liquid (U) may contain: a metal salt of an inorganic acid such as a metal carbonate, a metal hydrochloride, a metal nitrate, a metal hydrogen carbonate, a metal sulfate, a metal hydrogen sulfate, a metal borate, or a metal aluminate; a metal salt of an organic acid such as a metal oxalate, a metal acetate, a metal tartrate, or a metal stearate; a metal complex such as a metal acetylacetonate complex (aluminum acetylacetonate or the like), a cyclopentadienyl metal complex (titanocene or the like), or a cyano metal complex; a layered clay compound; a crosslinking agent; a polymer compound other than the polymer (C); a plasticizer; an antioxidant; an ultraviolet absorber; or a flame retardant.

[Step (II)]

In the step (II), a precursor layer of the layer (YA) is formed on the base (X) by applying the coating liquid (U) onto the base (X). The coating liquid (U) may be applied directly onto at least one surface of the base (X). Alternatively, before application of the coating liquid (U), the adhesive layer (H) may be formed on the surface of the base (X), for example, by treating the surface of the base (X) with a commonly-known anchor coating agent or by applying a commonly-known adhesive onto the surface of the base (X). Alternatively, the layer (Z) may be formed on the base (X) beforehand in the later-described step (IV), and the precursor layer of the layer (YA) may be formed on the layer (Z) by applying the coating liquid (U) onto the layer (Z).

The coating liquid (U) may be subjected to degassing and/or defoaming as necessary. Examples of the method for degassing and/or defoaming are those using vacuum drawing, heating, centrifugation, ultrasonic waves, etc. A method including vacuum drawing can be preferably used.

A viscosity of the coating liquid (U) to be applied in the step (II), as measured with a Brookfield rotational viscometer (SB-type viscometer: Rotor No. 3, Rotational speed=60 rpm), is preferably 3000 mPa·s or less and more preferably 2000 mPa·s or less at a temperature at which the coating liquid (U) is applied. When the viscosity is 3000 mPa·s or less, the leveling of the coating liquid (U) is improved, and the multilayer structure that is more excellent in appearance can be obtained. The viscosity of the coating liquid (U) to be applied in the step (II) can be adjusted depending on the concentration, the temperature, and the length of time or intensity of stirring performed after the mixing in the step (c). For example, the viscosity can be lowered in some cases by performing stirring for a long period of time after the mixing in the step (c).

The method for applying the coating liquid (U) onto the base (X) is not particularly limited, and a commonly-known method can be employed. Examples of preferred methods include casting, dipping, roll coating, gravure coating, screen printing, reverse coating, spray coating, kiss coating, die coating, metering bar coating, chamber doctor-using coating, and curtain coating.

In the step (II), generally, the precursor layer of the layer (YA) is formed as a result of removing the solvent in the coating liquid (U). The method for removing the solvent is not particularly limited, and a commonly-known drying method can be used. Specifically, drying methods such as hot-air drying, heat roll contact drying, infrared heating, and microwave heating can be used alone or in combination. The drying temperature is preferably 0 to 15° C. or more lower than the onset temperature of fluidization of the base (X). In the case where the coating liquid (U) contains the polymer (C), the drying temperature is preferably 15 to 20° C. or more lower than the onset temperature of pyrolysis of the polymer (C). The drying temperature is preferably in the range of 70 to 200° C., more preferably in the range of 80 to 180° C., and even more preferably in the range of 90 to 160° C. The removal of the solvent may be carried out under ordinary pressure or reduced pressure. Alternatively, the solvent may be removed by heat treatment in the step (III) described later.

In the case where the layers (YA) are stacked on both surfaces of the base (X) that is in laminar form, a first layer (a precursor layer of a first layer (YA)) may be formed by applying the coating liquid (U) onto one surface of the base (X) and then removing the solvent, after which a second layer (a precursor layer of a second layer (YA)) may be formed by applying the coating liquid (U) onto the other surface of the base (X) and then removing the solvent. The composition of the coating liquid (U) applied may be the same for both of the surfaces or may be different for each surface.

In the case where the layers (YA) are stacked on a plurality of surfaces of the base (X) that has a three-dimensional shape, a layer (a precursor layer of the layer (YA)) may be formed for each of the surfaces by the above method. Alternatively, a plurality of layers (precursor layers of the layers (YA)) may be simultaneously formed by applying the coating liquid (U) simultaneously onto the plurality of surfaces of the base (X) and then performing drying.

[Step (III)]

In the step (III), the layer (YA) is formed by subjecting the precursor layer (the precursor layer of the layer (YA)) formed in the step (II) to heat treatment at a temperature of 110° C. or more.

In the step (III), a reaction proceeds in which the particles of the metal oxide (A) are bonded together via phosphorus atoms (phosphorus atoms derived from the phosphorus compound (B)). From another standpoint, a reaction in which the reaction product (R) is produced proceeds in the step (III). In order for the reaction to proceed sufficiently, the temperature of the heat treatment is 110° C. or more, preferably 140° C. or more, more preferably 170° C. or more, and even more preferably 190° C. or more. A lowered heat treatment temperature increases the time required to achieve sufficiently-progressed reaction, and causes a reduction in productivity. The preferred upper limit of the heat treatment temperature varies depending on the type of the base (X), etc. For example, in the case where a thermoplastic resin film made of polyamide resin is used as the base (X), the heat treatment temperature is preferably 190° C. or less. In the case where a thermoplastic resin film made of polyester resin is used as the base (X), the heat treatment temperature is preferably 220° C. or less. In some cases where the base (X) has a three-dimensional shape, heat treatment at a high temperature should be avoided in order to maintain the shape and appearance of the base (X) even if the time of the heat treatment will be lengthened. The preferred heat treatment temperature in this case is, for example, 110 to 145° C. The heat treatment can be carried out in air, a nitrogen atmosphere, an argon atmosphere, or the like.

The length of time of the heat treatment is preferably in the range of 0.1 seconds to 1 hour, more preferably in the range of 1 second to 15 minutes, and even more preferably in the range of 5 to 300 seconds. In an example, the heat treatment is performed at 110 to 220° C. for 0.1 seconds to 1 hour. In another example, the heat treatment is performed at 170 to 200° C. for 5 to 300 seconds (e.g., 10 to 300 seconds).

The method of the present invention for producing the multilayer structure may include a step of irradiating the layer (YA) or the precursor layer of the layer (YA) with an ultraviolet ray. The ultraviolet irradiation may be performed at any time after the step (II) (e.g., after the removal of the solvent of the applied coating liquid (U) is almost completed). The method of the irradiation is not particularly limited, and a commonly-known method can be employed. The wavelength of the ultraviolet ray for irradiation is preferably in the range of 170 to 250 nm, and more preferably in the range of 170 to 190 nm and/or 230 to 250 nm. Alternatively, irradiation with a radioactive ray such as an electron ray or a γ ray may be performed instead of the ultraviolet irradiation. Performing the ultraviolet irradiation may allow the multilayer structure to exhibit a higher level of gas barrier performance.

In the case of treating the surface of the base (X) with a commonly-known anchor coating agent or applying a commonly-known adhesive onto the surface of the base (X) before application of the coating liquid (U) in order to dispose the adhesive layer (H) between the base (X) and the layer (YA), aging treatment is preferably performed. Specifically, the base (X) having the coating liquid (U) applied thereto is preferably left at a relatively low temperature for a long period of time after the application of the coating liquid (U) but before the heat treatment of the step (III). The temperature of the aging treatment is preferably less than 110° C., more preferably 100° C. or less, and even more preferably 90° C. or less. The temperature of the aging treatment is preferably 10° C. or more, more preferably 20° C. or more, and even more preferably 30° C. or more. The length of time of the aging treatment is preferably in the range of 0.5 to 10 days, more preferably in the range of 1 to 7 days, and even more preferably in the range of 1 to 5 days. Performing such aging treatment further enhances the bonding strength between the base (X) and the layer (YA).

[Step (IV)]

In the step (IV), the layer (Z) is formed on the base (X) (or on the layer (Y)) by applying the coating liquid (V) containing the polymer (E) containing a monomer unit having a phosphorus atom. Generally, the coating liquid (V) is a solution of the polymer (E) dissolved in a solvent.

The coating liquid (V) may be prepared by dissolving the polymer (E) in a solvent or a solution obtained at the time of production of the polymer (E) may as such be used. When the solubility of the polymer (E) is low, the dissolution may be promoted by heating treatment or ultrasonic treatment.

The solvent used in the coating liquid (V) may be selected as appropriate depending on the type of the polymer (E), and is preferably water, an alcohol, or a mixed solvent thereof. As long as the dissolution of the polymer (E) is not hindered, the solvent may contain: an ether such as tetrahydrofuran, dioxane, trioxane, or dimethoxyethane; a ketone such as acetone or methyl ethyl ketone; a glycol such as ethylene glycol or propylene glycol; a glycol derivative such as methyl cellosolve, ethyl cellosolve, or n-butyl cellosolve; glycerin; acetonitrile; an amide such as dimethylformamide; dimethyl sulfoxide; sulfolane, or the like.

The solid content concentration of the polymer (E) in the coating liquid (V) is preferably in the range of 0.1 to 60 mass %, more preferably in the range of 0.5 to 50 mass %, and even more preferably in the range of 1.0 to 40 mass %, in terms of the storage stability and coating performance of the solution. The solid content concentration can be determined in the same manner as that described for the coating liquid (U).

The pH of the solution of the polymer (E) is preferably in the range of 0.1 to 6.0, more preferably in the range of 0.2 to 5.0, and even more preferably in the range of 0.5 to 4.0, in terms of the storage stability of the coating liquid (V) and the gas barrier properties of the multilayer structure.

The pH of the coating liquid (V) can be adjusted by a commonly-known method, and can be adjusted, for example, by addition of an acidic compound or a basic compound. Examples of the acidic compound include hydrochloric acid, nitric acid, sulfuric acid, acetic acid, butyric acid, and ammonium sulfate. Examples of the basic compound include sodium hydroxide, potassium hydroxide, ammonia, trimethylamine, pyridine, sodium carbonate, and sodium acetate.

When the viscosity of the coating liquid (V) needs to be controlled, a method such as adjustment of the solid content concentration, adjustment of the pH, or addition of a viscosity modifier, can be used. Examples of the viscosity modifier include carboxymethyl cellulose, starch, bentonite, tragacanth gum, stearic acid salts, alginic acid salts, methanol, ethanol, n-propanol, and isopropanol.

The coating liquid (V) may be subjected to degassing and/or defoaming as necessary. Examples of the method for degassing and/or defoaming are those using vacuum drawing, heating, centrifugation, ultrasonic waves, etc. A method including vacuum drawing can be preferably used.

A viscosity of the coating liquid (V) to be applied in the step (IV), as measured with a Brookfield rotational viscometer (SB-type viscometer: Rotor No. 3, Rotational speed=60 rpm), is preferably 1000 mPa·s or less and more preferably 500 mPa·s or less at a temperature at which the coating liquid (V) is applied. When the viscosity is 1000 mPa·s or less, the leveling of the coating liquid (V) is improved, and the multilayer structure that is more excellent in appearance can be obtained. The viscosity of the coating liquid (V) to be applied in the step (IV) can be adjusted depending on the concentration, the temperature, etc.

The method for applying the coating liquid (V) onto the base (X) or the layer (Y) is not particularly limited, and a commonly-known method can be employed. Examples of preferred methods include casting, dipping, roll coating, gravure coating, screen printing, reverse coating, spray coating, kiss coating, die coating, metering bar coating, chamber doctor-using coating, and curtain coating.

In the step (IV), generally, the layer (Z) is formed as a result of removing the solvent in the coating liquid (V). The method for removing the solvent is not particularly limited, and a commonly-known drying method can be used.

Specifically, drying methods such as hot-air drying, heat roll contact drying, infrared heating, and microwave heating can be used alone or in combination. The drying temperature is preferably 0 to 15° C. or more lower than the onset temperature of fluidization of the base (X). The drying temperature is preferably in the range of 70 to 200° C., more preferably in the range of 80 to 180° C., and even more preferably in the range of 90 to 160° C. The removal of the solvent may be carried out under ordinary pressure or reduced pressure. When the step (IV) is carried out following the step (II), the solvent may be removed by the heat treatment in the step (III) previously described.

In the case where the layers (Z) are stacked over both surfaces of the base (X) that is in laminar form with or without the layer (Y) interposed therebetween, a first layer (Z) may be formed by applying the coating liquid (V) over one surface and then removing the solvent, after which a second layer (Z) may be formed by applying the coating liquid (V) over the other surface and then removing the solvent. The composition of the coating liquid (V) applied may be the same for both of the surfaces or may be different for each surface.

In the case where the layers (Z) are stacked over a plurality of surfaces of the base (X) that has a three-dimensional shape with or without the layers (Y) interposed therebetween, the layer (Z) may be formed for each of the surfaces by the above method. Alternatively, a plurality of layers (Z) may be simultaneously formed by applying the coating liquid (V) simultaneously over the plurality of surfaces and then performing drying.

As mentioned above, the steps (I), (II), (III), and (IV) are typically carried out in this order; however, when the layer (Z) is formed between the base (X) and the layer (Y), the step (IV) may be carried out before the step (II). Also, the step (III) can be carried out after the step (IV). In terms of obtaining the multilayer structure that is excellent in appearance, the step (IV) is preferably carried out after the step (III).

The thus obtained multilayer structure can as such be used as the multilayer structure for constituting a barrier member of a container. As described above, however, another member (another layer or the like) may further be bonded to or formed on the thus obtained multilayer structure, and the resulting structure may be used as a multilayer structure for a container. The bonding of the member can be done by a commonly-known method.

In one aspect, the production method of the multilayer structure may include a step (W) of forming the layer (Y)

containing an aluminum atom and the step (IV) of forming the layer (Z) by applying the coating liquid (V) containing the polymer (E) containing a monomer unit having a phosphorus atom. As described above, when the layer (Y) is the layer (YA), the step (W) may include the steps (I), (II), and (III). When the layer (Y) is the layer (YB) or the layer (YC), the step (W) may include a step of forming such a layer by vapor deposition.

EXAMPLES

Hereinafter, the present invention will be described more specifically by using examples. However, the present invention is not limited in any respect by the examples given below.

[Formed Container] (Example Set A)

Measurements and evaluations in examples and comparative examples of formed containers (hereinafter simply referred to as "container(s)") were carried out by the methods described below.

(1) Infrared Absorption Spectrum of Layer (Y)

The infrared absorption spectra of the layers (YA) were measured by the following procedures.

First, the layer (YA) stacked on the base (X) was measured for its infrared absorption spectrum using a Fourier transform infrared spectrophotometer ("Spectrum One" manufactured by PerkinElmer Inc.). The infrared absorption spectrum was measured in the range of 700 to 4000 cm$^{-1}$ in ATR (attenuated total reflection) mode to determine the absorbances. In some cases where the thickness of the layer (YA) is 1 μm or less, an absorption peak attributed to the base (X) is detected in an infrared absorption spectrum obtained by the ATR method, and the absorption intensity attributed solely to the layer (YA) cannot be determined accurately. In such a case, the infrared absorption spectrum of the base (X) alone was measured separately, and was subtracted to extract only the peak attributed to the layer (X). Also when the layer (YA) is stacked on the layer (Z), the same method can be employed. In the case where the layer (YA) is formed as an inner layer of the multilayer structure (e.g., in the case of the stacking order of base (X)/layer (YA)/layer (Z)), the infrared absorption spectrum of the layer (YA) can be obtained by performing the measurement before formation of the layer (Z) or by, after formation of the layer (Z), delaminating the layer (Z) at the interface with the layer (YA) and then measuring the infrared absorption spectrum of the exposed layer (YA).

Based on the thus obtained infrared absorption spectrum of the layer (YA), a maximum absorption wavenumber ($n^1$) in the range of 800 to 1400 cm$^{-1}$ and an absorbance ($\alpha^1$) at the maximum absorption wavenumber ($n^1$) were determined.

Also determined were a maximum absorption wavenumber ($n^2$) at which the absorption due to stretching vibration of a hydroxyl group in the range of 2500 to 4000 cm$^{-1}$ reaches a maximum, and an absorbance ($\alpha^2$) at the maximum absorption wavenumber ($n^2$). In addition, a half width of the absorption peak at the maximum absorption wavenumber ($n^1$) was obtained by determining two wavenumbers at which the absorbance is a half of the absorbance ($\alpha^1$) (absorbance ($\alpha^1$)/2) in the absorption peak and calculating the difference between the two wavenumbers. In the case where the absorption peak at the maximum absorption wavenumber ($n^1$) overlapped an absorption peak attributed to another component, the absorption peaks attributed to the different components were separated by least-squares method using a Gaussian function, and then the half width of the absorption peak at the maximum absorption wavenumber ($n^1$) was obtained in the same manner as described above.

(2) Appearance of Container

The appearances of the containers obtained were evaluated by visual inspection according to the following ratings.

A: Very good appearance that was colorless, transparent, and uniform.

B: Good appearance, albeit slightly opaque or uneven.

C: The container was deformed and of no practical use.

(3) Measurement of Oxygen Transmission Rate of Container

Each of the obtained containers or bottles was subjected to humidity conditioning by leaving the container open in an atmosphere having a temperature of 20° C. and a relative humidity of 65% RH for 1 month. After that, the oxygen transmission rate was measured by the following procedures.

First, a metal jig to which were connected two metal pipes for a carrier gas was set to the orifice of the bottle, and fixed to the orifice of the bottle by means of an epoxy adhesive so as to prevent gas leakage through a gap between the metal jig and the bottle. Next, that end of one of the metal pipes which was opposite to the end connected to the bottle was connected to an oxygen transmission testing system ("MOCON OX-TRAN 2/20" manufactured by ModernControls, Inc.). That is, setting was made so as to allow the carrier gas to be emitted into the PET bottle through one of the metal pipes, then pass through the interior of the bottle, and then flow into the oxygen gas sensor of the oxygen transmission testing system through the other of the metal pipes.

Subsequently, the bottle to which the metal pipes were attached was enclosed by a bag, and the bag was fixed to the two metal pipes with a string. The bag was one fabricated through heat sealing of a laminated film having a multilayer configuration of polyester layer/adhesive layer/EVOH layer/adhesive layer/PO layer. Next, the gap between the bag and the metal pipes was filled with an epoxy resin to increase the airtightness. Next, a hole was made at a portion of the bag, a pipe for feeding a gas was inserted into the hole, and the bag and the pipe were fixed together by means of an adhesive tape so as to prevent entry of outside air through a gap between the bag and the pipe.

Subsequently, nitrogen gas containing 2 vol % of hydrogen gas was fed as the carrier gas into the bag through the gas feeding pipe and into the bottle through the metal pipe. A part of the gas having flowed into the bag permeated through the bottle to flow into the interior of the bottle, another part permeated through the bag to flow out of the bag, and another part flowed out of the bag through the two connection portions. Oxygen gas contained in the carrier gas was entrained by the carrier gas to the sensor section, by which the oxygen concentration was measured. The carrier gas was continuously fed into the bag and PET bottle until the oxygen concentration reached a constant value. The constant value of the oxygen concentration was set as a zero point for the oxygen transmission rate.

Thereafter, the carrier gas fed into the bag was changed to humidity-conditioned oxygen gas. That is, nitrogen gas was allowed to flow inside the PET bottle, while oxygen gas was allowed to flow outside the PET bottle. The oxygen gas having permeated to the inside of the PET bottle from the outside of the PET bottle was entrained by the carrier gas flowing inside the pouch to the oxygen gas sensor, by which the oxygen concentration was measured. From the thus measured oxygen concentration, the oxygen transmission rate (in units of cm$^3$/(bottle·day·atm) was calculated.

The measurement was performed under conditions where the temperature was 20° C., the humidity was 85% RH, the oxygen pressure was 1 atm, and the carrier gas pressure was 1 atm. Nitrogen gas containing 2 vol % of hydrogen gas was used as the carrier gas.

(4) Oxygen Transmission Rate (Of) of Container before and after Keeping 5% Stretched State A 10-cm-wide sample was cut out from the barrel portion of each container obtained, and left at 23° C. and 50% RH for over 24 hours. Under these same conditions, the sample was circumferentially stretched by 5%, and allowed to keep the stretched state for 5 minutes. Thus, a multilayer structure subjected to stretching was obtained. The oxygen transmission rate of the multilayer structure was measured using an oxygen transmission testing system ("MOCON OX-TRAN 2/20" manufactured by ModernControls, Inc.) before and after the stretching of the multilayer structure. Specifically, the multilayer structure was set in such a manner that the layer (YZ) faced the oxygen feed-side and the base (X) faced the carrier gas-side, and the oxygen transmission rate (in units of ml/(m$^2$·day·atm)) was measured under conditions where the temperature was 20° C., the humidity on the oxygen feed-side was 85% RH, the humidity on the carrier gas-side was 85% RH, the oxygen pressure was 1 atm, and the carrier gas pressure was 1 atm. Nitrogen gas containing 2 vol % of hydrogen gas was used as the carrier gas.

(5) Gasoline Barrier Properties

A bottom portion of each container obtained was cut off, and the bottom potion was attached to the orifice of an aluminum cup (with a diameter of 6 cm and a depth of 2.5 cm) containing 20 mL of model gasoline. Thus, a sample for measurement was obtained. A mixed liquid of toluene (45 weight %), isooctane (45 weight %), and ethanol (10 weight %) was used as the model gasoline.

The initial weight of the sample was measured, and then the sample was stored in an explosion-proof thermo-hygrostat (set at 40° C. and 65% RH) for 14 days, after which the weight of the sample was measured again. For each of Examples and Comparative Examples, six samples were subjected to the measurement, and the average of the amounts of weight reduction was determined. The obtained weight reduction average was defined as the amount of permeate gasoline.

(6) Gasoline Barrier Properties after Bending Test

Each container obtained was subjected to a bending test in which the container was bent by dropping it from a height of 1.5 m five times. For the multilayer container thus subjected to bending, the amount of permeate gasoline was determined using the same procedures and conditions as those for the measurement described above.

[Production Examples of Coating Liquid (U)]

Production examples of the coating liquid (U) used for producing the layer (YA) will be described.

Distilled water in an amount of 230 parts by mass was heated to 70° C. under stirring. Aluminum isopropoxide in an amount of 88 parts by mass was added dropwise to the distilled water over 1 hour, the liquid temperature was gradually increased to 95° C., and isopropanol generated was distilled off. In this manner, hydrolytic condensation was performed. To the obtained liquid was added 4.0 parts by mass of a 60 mass % aqueous solution of nitric acid, followed by stirring at 95° C. for 3 hours to deflocculate the agglomerates of the particles of the hydrolytic condensate. Thereafter, the resulting liquid was concentrated so that the solid content concentration was 10 mass % in terms of alumina content. To 18.66 parts by mass of the thus obtained dispersion were added 58.19 parts by mass of distilled water, 19.00 parts by mass of methanol, and 0.50 parts by mass of a 5 mass % aqueous solution of polyvinyl alcohol, followed by stirring to make the mixture homogeneous. Thus, a dispersion (S1) was obtained. Additionally, 3.66 parts by mass of a 85 mass % aqueous solution of phosphoric acid was used as a solution (T1). Subsequently, the temperatures of both the dispersion (S1) and the solution (T1) were adjusted to 15° C. Next, with the liquid temperatures maintained at 15° C., the solution (T1) was added dropwise to the dispersion (S1) that was being stirred. Thus, a coating liquid (U1) was obtained. With the temperature of the obtained coating liquid (U1) held at 15° C., the coating liquid (U1) was continuously stirred until its viscosity reached 1500 mPa·s. In the coating liquid (U1), the ratio of the number of moles ($N_M$) of metal atoms constituting the metal oxide (A) (alumina) to the number of moles ($N_P$) of phosphorus atoms constituting the phosphorus compound (B) (phosphoric acid) (the number of moles ($N_M$)/the number of moles ($N_P$)) was 1.15.

A coating liquid (U2), a coating liquid (U3), and a coating liquid (U4) were obtained in the same manner as above, except that the ratio $N_M/N_P$ was changed to 4.48, 1.92, and 0.82.

[Production Examples of Coating Liquids (V1 to 4)]

First, a round-bottom flask (with an inner volume of 50 ml) fitted with a stirrer, a reflux condenser, a dropping funnel, and a thermometer was subjected to nitrogen replacement. Into the flask was introduced 12 g of methyl ethyl ketone (which may be abbreviated as "MEK" hereinafter) as a solvent, after which the flask was immersed in an oil bath, followed by heating up to 80° C. to initiate reflux. From this point through the entire processes for polymerization, a slight amount of nitrogen gas was continuously fed. Next, a mixed solution of 8.5 g of acid phosphoxyethyl methacrylate (which may be abbreviated as "PHM" hereinafter), 5 g of MEK, and 100 mg of azobisisobutyronitrile was prepared, and was added dropwise through the dropping funnel at a constant rate over 10 minutes. The temperature of 80° C. was maintained after the end of the dropwise addition, and stirring was continued for about 12 hours, giving a polymer solution in the form of a yellowish, viscous liquid.

The polymer solution was injected into 1,2-dichloroethane whose amount was about 10 times that of the injected solution, the resulting supernatant was removed by decantation to collect the precipitate, and thus the polymer was isolated. The collected polymer was purified by three repetitions of a process in which the polymer was dissolved in tetrahydrofuran (which may be abbreviated as "THF" hereinafter) which was a good solvent for the polymer, and then was precipitated again in 1,2-dichloroethane whose amount was about 10 times that of the polymer solution. The molecular weight of the purified polymer was measured by a gel permeation chromatograph using THF as a solvent with the polymer concentration set at 1 wt %. The number average molecular weight was about 10,000 as determined in terms of polystyrene molecular weight.

The purified polymer was dissolved in a mixed solvent of water and isopropanol at a concentration of 10 wt %, so that a coating liquid (V1) was obtained.

A coating liquid (V2) including a homopolymer of acid phosphoxy polyoxypropylene glycol methacrylate (which may be abbreviated as "PHP" hereinafter) was obtained in the same manner as for the preparation of the coating liquid (V1). Similarly, a coating liquid (V3) including a copolymer of PHM and acrylonitrile (which may be abbreviated as "AN" hereinafter) copolymerized at a molar ratio of 2/1 and a coating liquid (V4) including a copolymer of PHM and acrylonitrile copolymerized at a molar ratio of 1/1 were further obtained.

[Production Examples of Coating Liquids (V5 to 8)]

A round-bottom flask (with an inner volume of 50 ml) fitted with a stirrer and a thermometer was subjected to nitrogen replacement. Into the flask was introduced 2.5 g of water as a solvent, and then a mixed solution of 10 g of vinylphosphonic acid (which may be abbreviated as "VPA" hereinafter), 2.5 g of water, and 25 mg of 2,2'-azobis(2-amidinopropane)dihydrochloride (which may be abbreviated as "AIBA" hereinafter) was added dropwise into the round-bottom flask under stirring. From this point through the entire processes for polymerization, a slight amount of nitrogen gas was continuously fed. The round-bottom flask was immersed in an oil bath, and the reaction was allowed to proceed at 80° C. for 3 hours, after which the reaction mixture was diluted with 15 g of water, and filtered through a cellulose membrane ("Spectra/Por" (trade name) manufactured by Spectrum Laboratories, Inc). Next, the solvent in the filtrate was distilled off with an evaporator, followed by vacuum drying at 50° C. for 24 hours to yield a white polymer. The molecular weight of this polymer was measured by a gel permeation chromatograph using a 1.2 wt % aqueous NaCl solution as a solvent with the polymer concentration set at 0.1 wt %. The number average molecular weight was about 10,000 as determined in terms of polyethylene glycol molecular weight.

The polymer purified was dissolved in a mixed solvent of water and methanol at a concentration of 10 wt %, so that a coating liquid (V5) was obtained.

A coating liquid (V6) including a homopolymer of 4-vinylbenzyl phosphonic acid (which may be abbreviated as "VBPA" hereinafter) was obtained in the same manner as for the preparation of the coating liquid (V5). Similarly, a coating liquid (V7) including a copolymer of VPA and methacrylic acid (which may be abbreviated as "MA" hereinafter) copolymerized at a molar ratio of 2/1 and a coating liquid (V8) including a copolymer of VPA and methacrylic acid copolymerized at a molar ratio of 1/1 were further obtained.

[Method for Fabricating Formed Body]

Methods for fabricating containers (I) of Examples and Comparative Examples will now be described.

Example A1

A PET bottle (with a volume of 500 mL, a surface area of 0.041 m$^2$, and a weight of 35 g) was prepared as a formed body (I). The surface of the PET bottle was plasma-treated. Next, the mixed liquid (U1) was applied to the surface of the PET bottle by dipping, followed by drying at 110° C. for 5 minutes. Next, heat treatment was performed at 120° C. for 5 minutes to obtain a structure (A) having a configuration of layer (Y1) (0.5 μm)/PET bottle. Next, the coating liquid (V1) was applied onto the layer (Y1) of the structure (A) by dipping so that the dry thickness was 0.3 μm. Drying was performed at 110° C. for 5 minutes to obtain a container (I) having a multilayer structure (A1) as a barrier portion, the multilayer structure (A1) having a configuration of layer (Z1) (0.3 μm)/layer (Y1) (0.5 μm)/PET bottle.

The moisture permeability (water vapor transmission rate: WVTR) of the multilayer structure (A1) was measured by gravimetry. Specifically, 10 g of calcium chloride (reagent for moisture content measurement) was put into the container (I), and the orifice of the container (I) was hermetically closed with a cap having an aluminum liner. This container was left at 23° C. and 50% RH for 1 hour, and then weighed. After the weight measurement, the container was placed in a thermo-hygrostat set at 40° C. and 90% RH, and left for 24 hours. The container was then taken out of the thermo-hygrostat, left at 23° C. and 50% RH for 1 hour, and then weighed. The moisture permeability was calculated based on the formula below.

Moisture permeability(in units of g/(m$^2$·day))= Amount of weight increase of container per day(g/(bottle·day))÷Surface area of bottle(m$^2$)

This was followed by nine repetitions of the cycle consisting of the process in which the container was placed in the thermo-hygrostat set at 40° C. and 90% RH and left for 24 hours and the process in which the container was taken out of the thermo-hygrostat, left at 23° C. and 50% RH for 1 hour, and then weighed to calculate the moisture permeability. The average of the measured values obtained by the eighth through tenth cycles was defined as the moisture permeability of the container (I).

The moisture permeability of the container (I) was 0.7 g/(m$^2$·day).

From the barrel portion of the obtained container (I) was cut out a measurement sample having a size of 15 cm (circumferential direction)×10 cm (longitudinal direction). The sample was left at 23° C. and 50% RH for over 24 hours, then, under these same conditions, was circumferentially stretched by 5%, and allowed to keep the stretched state for 5 minutes. Thus, a multilayer structure (A1) subjected to stretching was obtained. The moisture permeability of the obtained multilayer structure (A1) subjected to stretching was measured using a water vapor transmission testing system ("MOCON PERMATRAN 3/33" manufactured by ModernControls, Inc.). Specifically, the multilayer structure was set in such a manner that the layer (Z1) faced the water vapor feed-side and the layer of PET faced the carrier gas-side, and the moisture permeability (in units of g/(m$^2$·day)) was measured under conditions where the temperature was 40° C., the humidity on the water vapor feed-side was 90% RH, and the humidity on the carrier gas-side was 0% RH. The moisture permeability of the multilayer structure (A1) subjected to stretching, as measured by the above method, was 0.8 g/(m$^2$·day).

For the obtained container (I), evaluations listed in Table A2 were performed.

Example A2

A multilayer structure and a container (I) were obtained in the same manner as in Example A1, except that the coating liquid (V) was changed to V5.

The moisture permeability of the multilayer structure (A1) obtained in Example A2 was measured by the same gravimetry as that in Example A1. The result was that the moisture permeability of the multilayer structure (A1) was 0.7 g/(m$^2$·day). Similarly to Example A1, the moisture permeability of the multilayer structure (A1) subjected to 5% stretching was measured for a sample cut out from the container (I) and subjected to 5% stretching. The result was that the moisture permeability of the multilayer structure (A1) subjected to stretching was 0.8 g/(m$^2$·day).

Examples A3 to A14

Containers (I) were obtained in the same manner as in Example A1, except that the thickness of the layer (Z) and the coating liquid (V) were changed according to Table A1.

Examples A15 and A16

Containers (I) were obtained in the same manner as in Example A1, except that the conditions of the heat treatment and the coating liquid (V) were changed according to Table A1.

Examples A17 to A22

Containers (I) were obtained in the same manner as in Example A1, except that the coating liquid (U) and the coating liquid (V) used were changed according to Table A1.

Examples A23 and A24

Containers (I) were obtained in the same manner as in Example A1, except that the heat treatment step was carried out after formation of the layer (Z).

Example A25

A container (I) was obtained in the same manner as in Example A1, except that the base was a layer of silicon oxide deposited on the outer surface of the PET bottle.

Example A26

A container (I) was obtained in the same manner as in Example A25, except that the coating liquid (V) was changed to V5.

Example A27

A container (I) was obtained in the same manner as in Example A1, except that the base was a layer of aluminum oxide deposited on the outer surface of the PET bottle.

Example A28

A container (I) was obtained in the same manner as in Example A27, except that the coating liquid (V) was changed to V5.

Example A29

A deposited layer of aluminum having a thickness of 0.03 μm was formed by vapor deposition of aluminum on the PET bottle's outer surface used as a base. Next, the coating liquid (V1) was applied onto the deposited layer of aluminum by dipping so that the dry thickness was 0.3 μm. Drying was performed at 110° C. for 5 minutes to obtain a container (I) having a configuration of layer (Z1) (0.3 μm)/deposited layer of aluminum/PET bottle.

Example A30

A container (I) was obtained in the same manner as in Example A29, except that the coating liquid (V) was changed to V5.

Examples A31 and A32

Containers (I) were obtained in the same manner as in Example A1, except that the layer (Y) was formed after formation of the layer (Z), and that the coating liquid (V) was changed according to Table A1.

Comparative Examples A1 and A2

Containers (I) were obtained in the same manner as in Example A1, except that the conditions of the heat treatment were changed according to Table A1, and that the layer (Z) was not formed. The containers obtained had significant deformation, and were not those which are applicable for practical use.

Comparative Example A3

A container prepared according to Example A1 but without formation of the layer (Z) was used as a container of Comparative Example A1.

The moisture permeability of the multilayer structure obtained in Comparative Example A3 was measured by the same gravimetry as that in Example A1. The result was that the moisture permeability of the multilayer structure was 0.8 g/(m$^2$·day). Additionally, the moisture permeability of the multilayer structure of Comparative Example A3 subjected to 5% stretching was measured in the same manner as in Example A1. The result was that the moisture permeability of the multilayer structure subjected to stretching was 9.2 g/(m$^2$·day).

Comparative Example A4

A container prepared according to Example A15 but without formation of the layer (Z) was used as a container of Comparative Example A4.

Comparative Example A5

A container prepared according to Example A17 without formation of the layer (Z) was used as a container of Comparative Example A5.

Comparative Example A6

A container prepared according to Example A19 but without formation of the layer (Z) was used as a container of Comparative Example A6.

Comparative Example A7

A container prepared according to Example A21 but without formation of the layer (Z) was used as a container of Comparative Example A7.

Comparative Example A8

A container prepared according to Example A25 but without formation of the layer (Z) was used as a container of Comparative Example A8.

Comparative Example A9

A container prepared according to Example A27 but without formation of the layer (Z) was used as a container of Comparative Example A9.

Comparative Example A10

A container prepared according to Example A29 but without formation of the layer (Z) was used as a container of Comparative Example A10.

Comparative Example A11

A container prepared according to Example A1 but without formation of the layer (Y) was used as a container of Comparative Example A11.

Comparative Example A12

A container prepared according to Example A2 but without formation of the layer (Y) was used as a container of Comparative Example A12.

Comparative Example A13

The coating liquid (V1) was applied to the inner surface of the container of Comparative Example A3 by spray coating so that the dry thickness was 0.3 μm. Drying was performed at 110° C. for 5 minutes, and the resulting container having a configuration of layer (Z1) (0.3 μm)/PET bottle/layer (Y1) (0.5 μm) was used as a container of Comparative Example A13.

Comparative Example A14

The coating liquid (V5) was applied to the inner surface of the container of Comparative Example A3 by spray coating so that the dry thickness was 0.3 μm. Drying was performed at 110° C. for 5 minutes, and the resulting container having a configuration of layer (Z1) (0.3 μm)/PET bottle/layer (Y1) (0.5 μm) was used as a container of Comparative Example A14.

Comparative Example A15

A container prepared according to Example A1 but without formation of the layer (Y) and the layer (Z), that is, the PET bottle having no layer formed was used as a container of Comparative Example A15.

Example A33

First, a multilayer container (II) was fabricated. Specifically, a multilayer container (inner volume=50 cm$^3$) having a five-layer configuration of inner HDPE layer (thickness=435 μm)/AD layer (thickness=50 μm)/EVOH layer (thickness=50 μm)/AD layer (thickness=50 μm)/outer HDPE layer (thickness=1890 μm) was fabricated by co-extrusion blow molding. The ethylene-vinyl alcohol copolymer (EVOH) used was one which had an ethylene content of 32 mol %, a saponification degree of 99.6%, and a MI (Melt Index) of 3.0 g/10 min (at 190° C. with a load of 2169 g). The high-density polyethylene (HDPE) used was "HZ 8200B" manufactured by Mitsui Petrochemicals (MI=0.01 g/10 min (at 190° C. with a load of 2160 g), density=0.96 g/cm$^3$). The resin used in the adhesive resin layer (AD layer) was "ADMER GT4" manufactured by Mitsui Petrochemicals (maleic anhydride-modified polyethylene, MI=0.2 g/10 min (at 190° C. with a load of 2160 g)).

Next, the surface of the multilayer container was plasma-treated. Subsequently, a two-component anchor coating agent (AC) (manufactured by Mitsui Takeda Chemicals, Inc.; an ethyl acetate solution of 1 part by weight of TAKELAC A-626 (trade name) and 2 parts by weight of TAKENATE A-50 (trade name)) was applied to the plasma-treated surface by dipping. Next, the mixed solution (U1) was applied to the surface of the multilayer container by dipping, followed by drying at 110° C. for 5 minutes. Subsequently, heat treatment was performed at 120° C. for 5 minutes to obtain a structure (A) having a configuration of layer (Y1) (0.5 μm)/multilayer container. Subsequently, the coating liquid (V1) was applied onto the layer (Y1) of the structure (A) by dipping so that the dry thickness was 0.3 μm. Drying was performed at 110° C. for 5 minutes to obtain a container (II) having a multilayer structure (A1) as a barrier portion, the multilayer structure (A1) having a configuration of layer (Z1) (0.3 μm)/layer (Y1) (0.5 μm)/multilayer container.

Example A34

A container (II) was obtained in the same manner as in Example A25, except that the coating liquid (V) was changed to V5.

Comparative Example A16

A container prepared according to Example A33 but without formation of the layer (Z) was used as a container of Comparative Example A16.

Comparative Example A17

A multilayer container prepared without forming both the layer (Y) and the layer (Z) was used as a container of Comparative Example A17.

The production conditions and evaluation results for Examples and Comparative Examples are shown in Tables A1 to A4 below. In the tables, "-" means "not used", "not calculable", "not carried out", "not measurable", or the like.

As is apparent from the tables, the containers of Examples were able to maintain their barrier properties and gasoline barrier properties at a high level even when subjected to a high stress.

As is apparent from the tables, the containers of Examples maintained the good gas barrier properties of the multilayer structures even when subjected to a high physical stress (5% stretching). By contrast, all of the containers of Comparative Examples showed marked deterioration in gas barrier properties after subjected to a physical stress (5% stretching).

TABLE A1

| | | Layer (Y) | | | | | | Layer (Z) | | |
| | | | | | Heat treatment step | | | | |
| | Base (X) | Type | Thickness (μm) | Coating liquid | $N_M/N_P$ | Temperature (° C.) | Time (min) | Thickness (μm) | Coating liquid | Polymer (E) |
|---|---|---|---|---|---|---|---|---|---|---|
| Example A1 | PET | YA | 0.5 | U1 | 1.15 | 120 | 5 | 0.3 | V1 | PHM |
| Example A2 | | | | | | | | | V5 | VPA |
| Example A3 | PET | YA | 0.5 | U1 | 1.15 | 120 | 5 | 0.5 | V1 | PHM |
| Example A4 | | | | | | | | | V5 | VPA |

TABLE A1-continued

|  | Base (X) | Layer (Y) Type | Thickness (μm) | Coating liquid | $N_M/N_P$ | Heat treatment step Temperature (°C.) | Time (min) | Layer (Z) Thickness (μm) | Coating liquid | Polymer (E) |
|---|---|---|---|---|---|---|---|---|---|---|
| Example A5 | PET | YA | 0.5 | U1 | 1.15 | 120 | 5 | 0.1 | V1 | PHM |
| Example A6 |  |  |  |  |  |  |  |  | V5 | VPA |
| Example A7 | PET | YA | 0.5 | U1 | 1.15 | 120 | 5 | 0.05 | V1 | PHM |
| Example A8 |  |  |  |  |  |  |  |  | V5 | VPA |
| Example A9 | PET | YA | 0.5 | U1 | 1.15 | 120 | 5 | 0.3 | V2 | PHP |
| Example A10 |  |  |  |  |  |  |  |  | V6 | VBPA |
| Example A11 | PET | YA | 0.5 | U1 | 1.15 | 120 | 5 | 0.3 | V3 | PHM/AN (2/1) |
| Example A12 |  |  |  |  |  |  |  |  | V4 | PHM/AN (1/1) |
| Example A13 |  |  |  |  |  |  |  |  | V7 | VPA/MA (2/1) |
| Example A14 |  |  |  |  |  |  |  |  | V8 | VPA/MA (1/1) |
| Example A15 | PET | YA | 0.5 | U1 | 1.15 | 120 | 10 | 0.3 | V1 | PHM |
| Example A16 |  |  |  |  |  |  |  |  | V5 | VPA |
| Example A17 | PET | YA | 0.5 | U2 | 4.48 | 120 | 5 | 0.3 | V1 | PHM |
| Example A18 |  |  |  |  |  |  |  |  | V5 | VPA |
| Example A19 | PET | YA | 0.5 | U3 | 1.92 | 120 | 5 | 0.3 | V1 | PHM |
| Example A20 |  |  |  |  |  |  |  |  | V5 | VPA |
| Example A21 | PET | YA | 0.5 | U4 | 0.82 | 120 | 5 | 0.3 | V1 | PHM |
| Example A22 |  |  |  |  |  |  |  |  | V5 | VPA |
| Example A23 | PET | YA | 0.5 | U1 | 1.15 | 120 | 5[*1] | 0.3 | V1 | PHM |
| Example A24 |  |  |  |  |  |  |  |  | V5 | VPA |
| Example A25 | $SiO_x$ | YA | 0.5 | U1 | 1.15 | 120 | 5 | 0.3 | V1 | PHM |
| Example A26 |  |  |  |  |  |  |  |  | V5 | VPA |
| Example A27 | $AlO_x$ | YA | 0.5 | U1 | 1.15 | 120 | 5 | 0.3 | V1 | PHM |
| Example A28 |  |  |  |  |  |  |  |  | V5 | VPA |
| Example A29 | PET | YB | Deposited layer of aluminum |  |  |  |  | 0.3 | V1 | PHM |
| Example A30 |  |  |  |  |  |  |  | 0.3 | V5 | VPA |
| Example A31 | PET | YA | 0.5 | U1 | 1.15 | 120 | 5 | 0.5 | V1 | PHM |
| Example A32 |  |  |  |  |  |  |  |  | V5 | VPA |
| Comp. Example A1 | PET | YA | 0.5 | U1 | 1.15 | 180 | 1 | — | — | — |
| Comp. Example A2 | PET | YA | 0.5 | U1 | 1.15 | 150 | 3 | — | — | — |
| Comp. Example A3 | PET | YA | 0.5 | U1 | 1.15 | 120 | 5 | — | — | — |
| Comp. Example A4 | PET | YA | 0.5 | U1 | 1.15 | 120 | 10 | — | — | — |
| Comp. Example A5 | PET | YA | 0.5 | U2 | 4.48 | 120 | 5 | — | — | — |
| Comp. Example A6 | PET | YA | 0.5 | U3 | 1.92 | 120 | 5 | — | — | — |
| Comp. Example A7 | PET | YA | 0.5 | U4 | 0.82 | 150 | 5 | — | — | — |
| Comp. Example A8 | $SiO_x$ | YA | 0.5 | U1 | 1.15 | 120 | 5 | — | — | — |
| Comp. Example A9 | $AlO_x$ | YA | 0.5 | U1 | 1.15 | 120 | 5 | — | — | — |
| Comp. Example A10 | PET | YB | Deposited layer of aluminum |  |  |  |  | — | — | — |
| Comp. Example A11 | PET | — |  |  |  |  |  | 0.3 | V1 | PHM |
| Comp. Example A12 |  |  |  |  |  |  |  | 0.3 | V5 | VPA |
| Comp. Example A13 | PET | YA | 0.5 | U1 | 1.15 | 120 | 5 | 0.3 | V1 | PHM |
| Comp. Example A14 |  |  |  |  |  |  |  |  | V5 | VPA |
| Comp. Example A15 | PET | — |  |  |  |  |  | — | — | — |

[*1]The heat treatment was carried out not after formation of the layer (Y) but after formation of the layer (Z).

TABLE A2

|  | Layer configuration | Appearance | Infrared absorption spectrum of layer (Y) $n^1$ (cm$^{-1}$) | Half width (cm$^{-1}$) | $\alpha^2/\alpha^1$ | Oxygen transmission rate of container (ml/bottle · day · atm) | Oxygen transmission rate (ml/m² · day · atm) Before stretching | After stretching |
|---|---|---|---|---|---|---|---|---|
| Example A1 | (Z)/(Y)/PET | A | 1111 | 60 | <0.1 | 0.012 | 0.57 | 0.60 |
| Example A2 | (Z)/(Y)/PET | A | 1111 | 61 | <0.1 | 0.011 | 0.56 | 0.63 |
| Example A3 | (Z)/(Y)/PET | A | 1111 | 60 | <0.1 | 0.010 | 0.56 | 0.67 |
| Example A4 | (Z)/(Y)/PET | A | 1111 | 60 | <0.1 | 0.011 | 0.58 | 0.71 |
| Example A5 | (Z)/(Y)/PET | A | 1111 | 61 | <0.1 | 0.010 | 0.55 | 0.93 |
| Example A6 | (Z)/(Y)/PET | A | 1111 | 60 | <0.1 | 0.012 | 0.60 | 0.89 |
| Example A7 | (Z)/(Y)/PET | A | 1111 | 61 | <0.1 | 0.010 | 0.56 | 1.1 |
| Example A8 | (Z)/(Y)/PET | A | 1111 | 61 | <0.1 | 0.010 | 0.56 | 1.0 |
| Example A9 | (Z)/(Y)/PET | A | 1111 | 60 | <0.1 | 0.011 | 0.58 | 1.4 |
| Example A10 | (Z)/(Y)/PET | A | 1111 | 61 | <0.1 | 0.011 | 0.59 | 1.6 |
| Example A11 | (Z)/(Y)/PET | A | 1111 | 60 | <0.1 | 0.013 | 0.62 | 2.1 |
| Example A12 | (Z)/(Y)/PET | A | 1111 | 61 | <0.1 | 0.012 | 0.58 | 2.8 |
| Example A13 | (Z)/(Y)/PET | A | 1111 | 43 | <0.1 | 0.010 | 0.56 | 2.1 |
| Example A14 | (Z)/(Y)/PET | A | 1111 | 45 | <0.1 | 0.012 | 0.59 | 2.6 |
| Example A15 | (Z)/(Y)/PET | A | 1109 | 60 | <0.1 | 0.008 | 0.32 | 0.56 |

TABLE A2-continued

| | Layer configuration | Appearance | Infrared absorption spectrum of layer (Y) $n^1$ (cm$^{-1}$) | Half width (cm$^{-1}$) | $\alpha^2/\alpha^1$ | Oxygen transmission rate of container (ml/bottle · day · atm) | Oxygen transmission rate (ml/m$^2$ · day · atm) Before stretching | After stretching |
|---|---|---|---|---|---|---|---|---|
| Example A16 | (Z)/(Y)/PET | A | 1109 | 61 | <0.1 | 0.008 | 0.35 | 0.60 |
| Example A17 | (Z)/(Y)/PET | A | 1130 | 148 | 0.30 | 0.021 | 1.4 | 1.9 |
| Example A18 | (Z)/(Y)/PET | A | 1128 | 149 | 0.31 | 0.023 | 1.5 | 2.0 |
| Example A19 | (Z)/(Y)/PET | A | 1109 | 66 | <0.1 | 0.012 | 0.61 | 0.79 |
| Example A20 | (Z)/(Y)/PET | A | 1110 | 66 | <0.1 | 0.011 | 0.59 | 0.81 |
| Example A21 | (Z)/(Y)/PET | A | 1116 | 62 | <0.1 | 0.015 | 0.89 | 1.6 |
| Example A22 | (Z)/(Y)/PET | A | 1116 | 62 | <0.1 | 0.015 | 0.91 | 1.6 |
| Example A23 | (Z)/(Y)/PET | B | 1116 | 67 | <0.1 | 0.012 | 0.60 | 0.77 |
| Example A24 | (Z)/(Y)/PET | B | 1116 | 67 | <0.1 | 0.012 | 0.61 | 0.79 |
| Example A25 | (Z)/(Y)/SiO$_x$/PET | A | 1111 | 61 | <0.1 | 0.002 | 0.09 | 0.20 |
| Example A26 | (Z)/(Y)/SiO$_x$/PET | A | 1111 | 60 | <0.1 | 0.003 | 0.08 | 0.14 |
| Example A27 | (Z)/(Y)/AlO$_x$/PET | A | 1111 | 61 | <0.1 | 0.003 | 0.10 | 0.21 |
| Example A28 | (Z)/(Y)/AlO$_x$/PET | A | 1111 | 61 | <0.1 | 0.003 | 0.08 | 0.16 |
| Example A29 | (Z)/(Y)/PET | A | — | | | 0.028 | 0.85 | 1.5 |
| Example A30 | (Z)/(Y)/PET | A | — | | | 0.030 | 0.88 | 1.6 |
| Example A31 | (Y)/(Z)/PET | A | 1118 | 71 | <0.1 | 0.015 | 0.65 | 1.4 |
| Example A32 | (Y)/(Z)/PET | A | 1117 | 72 | <0.1 | 0.016 | 0.68 | 1.5 |
| Comp. Example A1 | (Y)/PET | C | — | | | — | — | — |
| Comp. Example A2 | (Y)/PET | C | — | | | — | — | — |
| Comp. Example A3 | (Y)/PET | A | 1111 | 62 | <0.1 | — | 0.61 | 6.4 |
| Comp. Example A4 | (Y)/PET | A | 1111 | 49 | <0.1 | — | 0.41 | 7.8 |
| Comp. Example A5 | (Y)/PET | A | 1128 | 148 | 0.30 | — | 1.5 | 9.3 |
| Comp. Example A6 | (Y)/PET | A | 1110 | 66 | <0.1 | — | 0.64 | 6.7 |
| Comp. Example A7 | (Y)/PET | A | 1116 | 60 | <0.1 | — | 1.0 | 8.5 |
| Comp. Example A8 | (Y)/SiO$_x$/PET | A | 1111 | 61 | <0.1 | — | 0.15 | 5.0 |
| Comp. Example A9 | (Y)/AlO$_x$/PET | A | 1111 | 61 | <0.1 | — | 0.17 | 5.2 |
| Comp. Example A10 | (Y)/PET | A | — | | | — | 1.1 | 13.8 |
| Comp. Example A11 | (Z)/PET | A | — | | | — | >50 | >50 |
| Comp. Example A12 | (Z)/PET | A | — | | | — | >50 | >50 |
| Comp. Example A13 | (Y)/PET/(Z) | A | 1111 | 61 | <0.1 | — | 0.62 | 6.3 |
| Comp. Example A14 | (Y)/PET/(Z) | A | 1111 | 62 | <0.1 | — | 0.59 | 6.6 |
| Comp. Example A15 | PET | A | — | | | — | >50 | >50 |

TABLE A3

| | Base (X) | Layer (Y) Type | Thickness (μm) | Coating liquid | $N_M/N_P$ | Heat treatment step Temperature (° C.) | Time (min) | Layer (Z) Thickness (μm) | Coating liquid | Polymer (E) |
|---|---|---|---|---|---|---|---|---|---|---|
| Example A33 | Multilayer container (II) | YA | 0.5 | U1 | 1.15 | 120 | 5 | 0.3 | V1 | PHM |
| Example A34 | | | | | | | | | V5 | VPA |
| Comp. Example A16 | | | | | — | | | | — | — |
| Comp. Example A17 | | — | | | | | | | — | — |

TABLE A4

| | Layer configuration | Gasoline transmission rate Before bending test | After bending test |
|---|---|---|---|
| Example A33 | (Z)/(Y)/container (II) | 6.7 | 7.1 |
| Example A34 | (Z)/(Y)/container (II) | 6.8 | 7.3 |
| Comp. Example A16 | (Y)/container (II) | 7.0 | 8.8 |
| Comp. Example A17 | Container (II) | 10.2 | 10.2 |

[Joined Container] (Example Set B)

Measurements and evaluations in examples and comparative examples of joined containers were carried out by the methods described below. The joined containers fabricated were vertical form fill seal bags, vacuum packaging bags, pouches, laminated tube containers, infusion bags, and paper containers.

(1) Infrared Absorption Spectrum of Layer (Y)

The measurement was performed in the same manner as in Example Set A.

(2) Appearance of Multilayer Structure and Joined Container

The appearances of the obtained multilayer structures, and the appearances after retort treatment of joined containers fabricated using film materials including these multilayer structures, were evaluated by visual inspection according to the following ratings.

A: Very good appearance that was colorless, transparent, and uniform.

B: Good appearance, albeit slightly opaque or uneven.

C: The container suffered from delamination between the layers of the multilayer structure and was of no practical use, in addition to which the subsequent measurements were impossible.

(3) Method for Fabricating Joined Container (3-1) Method for Fabricating Vertical Form Fill Seal Bag A two-component adhesive (including A-520 (trade name) and A-50 (trade name) manufactured by Mitsui Chemicals, Inc.) was applied and dried on an obtained multilayer structure. The multilayer structure and an oriented polyamide film (EMBLEM ON-BC manufactured by UNITIKA LTD. and having a thickness of 15 µm; this film may be abbreviated as "OPA" hereinafter) were laminated together to obtain a laminated body. Onto the OPA of the laminated body was subsequently applied the two-component adhesive, which was dried. The laminated body and a non-oriented polypropylene film (RXC-21 (trade name) manufactured by Mitsui Chemicals Tohcello, Inc. and having a thickness of 70 µm; this film may be abbreviated as "CPP" hereinafter) were laminated together. Thus, a laminated body (film material) having a configuration of multilayer structure/adhesive layer/OPA layer/adhesive layer/CPP layer was obtained. The lamination of the multilayer structure was done in such a manner that the layer (Y) (the layer (Z) or layer (Y) for a multilayer structure having no layer (Y)) was located closer to the OPA than the base (X) was. The laminated body was cut into a 400-mm-wide piece, which was supplied to a vertical form fill seal packaging machine (manufactured by ORIHIRO Co., Ltd.) so that the CPP layer portions were heat-sealed in contact with each other. Thus, a vertical form fill seal bag (with a width of 160 mm and a length of 470 mm) of the fin seal type as shown in FIG. 1 was fabricated. The vertical form fill seal bag was filled with contents, specifically 2 kg of water.

(3-2) Method for Fabricating Vacuum Packaging Bag

A two-component adhesive (including A-520 (trade name) and A-50 (trade name) manufactured by Mitsui Chemicals, Inc.) was applied and dried on an oriented polyamide film (EMBLEM ON-BC manufactured by UNITIKA LTD. and having a thickness of 15 µm (OPA)). This film and an obtained multilayer structure were laminated together to obtain a laminated body. Onto the multilayer structure of the laminated body was subsequently applied the two-component adhesive, which was dried. Then, the laminated body and a non-oriented polypropylene film (RXC-21 (trade name) manufactured by Mitsui Chemicals Tohcello, Inc. and having a thickness of 70 µm (CPP)) were laminated together. Thus, a laminated body (film material) having a configuration of OPA/adhesive layer/multilayer structure/adhesive layer/CPP was obtained. The lamination of the multilayer structure was done in such a manner that the layer (Y) (the layer (Z) or layer (Y') for a multilayer structure having no layer (Y)) was located closer to the OPA than the base (X) was. Next, two laminated pieces having the shape of 22 cm×30 cm rectangle were cut out from the laminated body. The two laminated pieces were then stacked together in such a manner that the CPP layers were located interiorly, and the three sides of the rectangle were heat-sealed to form a bag. Wood spheres (having a diameter of 30 mm) were used as a model of a solid food, and the bag was filled with the spheres closely arranged in a single layer so that the spheres were in contact with each other. Thereafter, the air inside the bag was removed by degassing, and the remaining one side was heat-sealed. Thus, a vacuum packaging bag was obtained in which the packaging bag closely adhered to the vacuum-packaged spheres along the irregularities of the surfaces of the spheres. It should be noted that, in fabrication of vacuum packaging bags (including the vacuum packaging bag used in (4-4)) which were not subjected to retort test, the air inside the bag was removed by degassing without putting the wood spheres into the bag.

(3-3) Method for Fabricating Pouch (Method for Fabricating Laminated Body (Film Material)

A laminated body was fabricated using an obtained multilayer structure. First, a two-component adhesive (including A-385 (trade name) and A-50 (trade name) manufactured by Mitsui Chemicals, Inc.) was applied and dried on an oriented polyamide film (EMBLEM ON-BC manufactured by UNITIKA LTD. and having a thickness of 15 µm (OPA)) and on a non-oriented polypropylene film (RXC-21 (trade name) manufactured by Mitsui Chemicals Tohcello, Inc. and having a thickness of 70 µm (CPP)). Then, these films and the multilayer structure were laminated together. Thus, a laminated body (film material) having a configuration of multilayer structure/adhesive/OPA/adhesive/CPP was obtained. The lamination of the multilayer structure was done in such a manner that the layer (Y) (the layer (Z) or layer (Y') for a multilayer structure having no layer (Y)) was located closer to the OPA than the base (X) was.

(Fabrication of Spouted Pouch)

Two laminated pieces having a size of 20 cm×13 cm were cut out from the laminated body. Subsequently, the two laminated pieces cut out were stacked together in such a manner that the CPP were located interiorly, and the outer periphery of the stack was heat-sealed in such a manner that the seal width was 0.5 cm, and a spout made of polypropylene was further attached by heat sealing. Thus, a spouted pouch of the flat type was fabricated.

(Fabrication of Flat Pouch)

Two laminated pieces having a size of 20 cm×13 cm were cut out from the laminated body. Subsequently, the two laminated pieces cut out were stacked together in such a manner that the CPP were located interiorly, and the three sides of the outer periphery of the stack were heat-sealed in such a manner that the seal width was 0.5 cm. Furthermore, a pouch opening having a length of 30 mm was formed at an edge of the one side remaining open. The formation of the pouch opening was done as follows: a 30-mm-wide Teflon sheet was inserted into the edge of the open side, and then heat sealing was performed, after which the Teflon sheet was drawn out from the open edge.

(Fabrication of Gusseted Pouch)

The laminated body was cut to fabricate 200 m rolls having a width of 450 mm and a width of 60 mm, respectively. These rolls were supplied to a bag making machine (NISHIBE KIKAI CO., LTD.) for both standing bags and three-side-seal bags, so that a bottom-gusseted pouch (its width was 130 mm, its length was 200 mm, and the width of the folded portion of the bottom gusset was 25 mm) was fabricated whose two side wall portions were obtained by cutting from the 450-mm-wide roll and whose bottom wall portion (gusset portion) was obtained by cutting from the 60-mm-wide roll. Furthermore, a pouch opening having a length of 30 mm was formed at an edge of the one side remaining open. The formation of the pouch opening was done as follows: a 30-mm-wide Teflon sheet was inserted into the edge of the open side, and then heat sealing was performed, after which the Teflon sheet was drawn out from the open edge.

(3-4) Fabrication of Laminated Tube Container

A two-component adhesive (including A-385 (trade name) and A-50 (trade name) manufactured by Mitsui Takeda Chemicals, Inc.) was applied and dried on two non-oriented polypropylene films (RXC-21 (trade name) manufactured by Mitsui Chemicals Tohcello, Inc. and having a thickness of 100 μm; these films may be abbreviated as "CPP" hereinafter). These films were laminated to an obtained multilayer structure. Thus, a laminated film (film material) having a configuration of CPP/adhesive/multilayer structure/adhesive/CPP was obtained. This laminated film was cut into a predetermined shape, and formed into a tubular roll having an overlapping portion, which was heat-sealed to form a tubular barrel portion. This heat sealing was performed between the inner CPP layer and the outer CPP layer. The formation of the tubular barrel portion was done by rolling the laminated body in such a manner that the layer (Y) (the layer (Z) or layer (Y') for a multilayer structure having no layer (Y)) was located outwardly of the base (X) in the tubular portion. Next, to a mandrel for tube container formation was mounted the barrel portion, to one end of which was joined a shoulder portion including a base portion in the shape of a circular truncated cone and an outlet portion having a through hole. The shoulder portion was formed by compression molding of a polypropylene resin. Next, a lid (cap) made of polypropylene resin was attached to the outlet portion. Subsequently, a green horseradish paste as contents of the container was injected through the other end of the barrel portion which was open, and then this end was heat sealed. This heat sealing was performed in such a manner that the inner circumferential surfaces formed by the inner CPP layer were in contact with each other. In this manner, a laminated tube container was produced.

(3-5) Method for Fabricating Infusion Bag

A laminated body was fabricated using an obtained multilayer structure. First, a two-component adhesive (including A-385 (trade name) and A-50 (trade name) manufactured by Mitsui Chemicals, Inc.) was applied and dried on an oriented polyamide film (EMBLEM ON-BC manufactured by UNITIKA LTD. and having a thickness of 15 μm (OPA)) and on a non-oriented polypropylene film (RXC-21 (trade name) manufactured by Mitsui Chemicals Tohcello, Inc. and having a thickness of 70 μm (CPP)). Then, these films and the multilayer structure were laminated together. Thus, a laminated body (film material) having a configuration of multilayer structure/adhesive/OPA/adhesive/CPP was obtained. The lamination of the multilayer structure was done in such a manner that the layer (Y) (the layer (Z) or layer (Y') for a multilayer structure having no layer (Y)) was located closer to the OPA than the base (X) was. Next, two laminated pieces having a size of 12 cm×10 cm were cut out from the laminated body. Subsequently, the two laminated pieces cut out were stacked together in such a manner that the CPP were located interiorly. This was followed by heat sealing the edges of the stack, to which a spout (plug member) made of polypropylene was attached by heat sealing. In this manner, an infusion bag having a configuration which is the same as that shown in FIG. 9 was fabricated.

(3-6) Method for Fabricating Paper Container (Method for Fabricating Brick-Type Paper Container 1)

A polypropylene resin (PP) was extrusion-laminated to both surfaces of a 400 g/m² paper board so as to form non-oriented PP layers (each having a thickness of 20 μm) on the two surfaces of the paper board. Thereafter, an adhesive (a two-component adhesive (including A-520 (trade name) and A-50 (trade name) manufactured by Mitsui Chemicals, Inc)) was applied to the surface of one of the PP layers, onto which an obtained multilayer structure was laminated. Next, the adhesive was applied to the surface of the multilayer structure, after which the multilayer structure and a non-oriented polypropylene film (Tohcello CP RXC-18 manufactured by Mitsui Chemicals Tohcello, Inc. and having a thickness of 50 μm (CPP)) were attached together. In this manner, a laminated body (L1) having a configuration of PP (outer side)/paper board/PP/multilayer structure/CPP (inner side) was fabricated. In the fabrication of the laminated body, an anchor coating agent was used as necessary. A brick-type paper container 1 (with an inner volume of 500 ml) was fabricated using the laminated body (L1). The lamination of the multilayer structure was done in such a manner that the layer (Y) (the layer (Z) or layer (Y') for a multilayer structure having no layer (Y)) was located closer to the paper board than the base (X) was. The formation of the paper container 1 was done in such a manner that the CPP layer faced inwardly in the container.

(Method for Fabricating Brick-Type Paper Container 2)

A two-component adhesive (including A-520 (trade name) and A-50 (trade name) manufactured by Mitsui Chemicals, Inc)) was applied and dried on an obtained multilayer structure, and the multilayer structure and a non-oriented polypropylene film (RXC-21 (trade name) manufactured by Mitsui Chemicals Tohcello, Inc. and having a thickness of 50 μm (CPP 50)) were laminated together to obtain a laminated body. Onto the multilayer structure of the laminated body was subsequently applied the two-component adhesive, which was dried. The laminated body and CPP 50 were laminated together. In this manner, a laminated body (L2) having a configuration of CPP 50 layer/adhesive layer/multilayer structure/adhesive layer/CPP 50 layer was obtained. A brick-type paper container was fabricated using the laminated body (L2). A strip piece cut out from the laminated body (L2) was used as a strip tape to form this paper container. Heat sealing was carried out along the strip tape disposed at a bonding portion of the laminated body (L2) by applying heat from the inside of the container. Thus, a brick-type paper container 2 (with an inner volume of 500 ml) was fabricated. The fabrication of the paper container 2 was done in such a manner that the layer (Y) of the multilayer structure (the layer (Z) or layer (Y') for a multilayer structure having no layer (Y)) was located inwardly of the base (X) in the container.

(Method for Fabricating Gable Top-Type Paper Container 3)

A polypropylene resin (PP) was extrusion-laminated to both surfaces of a 400 g/m² paper board so as to form non-oriented PP layers (each having a thickness of 25 μm) on the two surfaces of the paper board. Next, a portion of the paper board, at the position of which a window portion was to be formed, was removed. Next, a two-component adhesive (including A-520 (trade name) and A-50 (trade name) manufactured by Mitsui Chemicals, Inc)) was applied to the surface of one of the PP layers, onto which an obtained multilayer structure was laminated. Next, a polypropylene resin (PP) was applied to the surface of the multilayer structure by extrusion coating to form a non-oriented PP layer (with a thickness of 40 µm). In this manner, a laminated body (L3) having a configuration of PP/paper board/PP/multilayer structure/PP was fabricated. In the fabrication of the laminated body (L3), an anchor coating agent was used as necessary. A gable top-type paper container 3 with a window (having an inner volume of 500 ml) was fabricated using the laminated body (L3). The fabrication of the paper container 3 was done in such a manner that the window portion was located in a lower portion of a side surface as shown in FIG. 12. The lamination of the multilayer structure was done in such a manner that the layer (Y) (the layer (Z) or layer (V) for a multilayer structure having no layer (Y)) was located closer to the paper board than the base (X) was. The formation of the paper container 3 was done in such a manner that the multilayer structure was located inwardly of the paper board in the container.

(4) Evaluation on Vertical Form Fill Seal Bag, Vacuum Packaging Bag, and Laminated Tube Container (4-1) Retort Test Each joined container obtained (a vertical form fill seal bag, vacuum packaging bag, or laminated tube container) was placed on a platform of a retort sterilizer (RCS-60-10 RSTXG-FAM manufactured by HISAKA WORKS, LTD.). Then, hot-water retort sterilization treatment including full immersion of the joined container in hot water was carried out under the conditions below.

(a) Retort treatment temperature, time, and pressure: 120° C., 30 minutes, and 015 MPa (4-2) Transportation Test and Squeeze Test Some of the joined containers (10 vertical form fill seal bags and 50 vacuum packaging bags) subjected to retort sterilization treatment under the above conditions (a) were respectively put into corrugated fiberboard boxes (15×35×45 cm). A gap between the joined container and the corrugated fiberboard box was filled with a buffer material. The corrugated fiberboard boxes holding the joined containers were loaded onto a cargo truck, and a transportation test was carried out in which the truck was allowed to run back and forth ten times between Okayama and Tokyo.

For the laminated tube containers, a squeeze test was carried out instead of the transportation test. In the squeeze test, the barrel portion of each of the obtained laminated tube containers subjected to the retort sterilization treatment was held between fingers, and the fingers were moved back and forth along the barrel portion longitudinally while applying a certain force to the barrel portion. After the fingers were moved back and forth 5,000 times, the green horseradish paste as the contents was let out.

(4-3) Oxygen Transmission Rate (Om)

Samples for oxygen transmission rate measurement were cut out from each joined container obtained (a vertical form fill seal bag, vacuum packaging bag, or laminated tube container) before and after the retort sterilization treatment and after the transportation test or squeeze test. For the joined containers subjected to the retort treatment, cutting of the samples for oxygen transmission rate measurement was done after the joined containers were left in a room-temperature atmosphere (20° C. and 65% RH) for over 24 hours. The oxygen transmission rate was measured using an oxygen transmission testing system ("MOCON OX-TRAN 2/20" manufactured by ModernControls, Inc.). Specifically, the laminate sample was set to the system in such a manner that the outer layer (multilayer structure) of the film material constituting the joined container faced the oxygen feed-side and the inner layer (CPP layer) of the film material faced the carrier gas-side. The oxygen transmission rate (in units of ml/($m^2 \cdot day \cdot atm$)) was measured under conditions where the temperature was 20° C., the humidity on the oxygen feed-side was 85% RH, the humidity on the carrier gas-side was 85% RH, the oxygen pressure was 1 atm, and the carrier gas pressure was 1 atm. Nitrogen gas containing 2 vol % of hydrogen gas was used as the carrier gas.

(4-4) Oxygen Transmission Rate (Of) of Film Material Kept Stretched by 5%

Each joined container obtained (a vertical form fill seal bag, vacuum packaging bag, or laminated tube container) was left at 23° C. and 50% RH for over 24 hours. Thereafter, a measurement sample was cut out from the joined container. The obtained sample was stretched by 5% in a direction corresponding to the longitudinal direction of the bag under the above conditions, and allowed to keep the stretched state for 5 minutes. Thus, a film material subjected to stretching was obtained. The oxygen transmission rate was measured using an oxygen transmission testing system ("MOCON OX-TRAN 2/20" manufactured by ModernControls, Inc.). Specifically, the film material subjected to stretching was set in such a manner that the layer (YZ) faced the oxygen feed-side and the base (X) faced the carrier gas-side, and the oxygen transmission rate (in units of ml/($m^2 \cdot day \cdot atm$)) was measured under conditions where the temperature was 20° C., the humidity on the oxygen feed-side was 85% RH, the humidity on the carrier gas-side was 85% RH, the oxygen pressure was 1 atm, and the carrier gas pressure was 1 atm. Nitrogen gas containing 2 vol % of hydrogen gas was used as the carrier gas.

(5) Evaluation on Pouch (5-1) Oxygen Transmission Rate (Os) of Pouch

The oxygen transmission rate of each pouch obtained was measured before the retort treatment using an oxygen transmission testing system ("MOCON OX-TRAN 2/20" manufactured by ModernControls, Inc.). Specifically, a sample for oxygen transmission rate measurement having a size of 10 cm×10 cm was cut out from the body portion (side wall portion) of the pouch, and the multilayer structure sample was set in such a manner that the multilayer structure faced the oxygen feed-side and the CPP faced the carrier gas-side, and the oxygen transmission rate (in units of ml/($m^2 \cdot day \cdot atm$)) was measured under conditions where the temperature was 20° C., the humidity on the oxygen feed-side was 85% RH, the humidity on the carrier gas-side was 85% RH, the oxygen pressure was 1 atm, and the carrier gas pressure was 1 atm. Nitrogen gas containing 2 vol % of hydrogen gas was used as the carrier gas.

(5-2) Oxygen Transmission Rate (Of) of Film Material Subjected to 5% Stretching

A measurement sample having a size of 15 cm×10 cm was cut out from each obtained spouted pouch that had yet to be subjected to retort treatment. The sample was left at 23° C. and 50% RH for over 24 hours, then, under these same conditions, was longitudinally stretched by 5%, and allowed to keep the stretched state for 5 minutes. Thus, a laminated body (film material) subjected to stretching was obtained. The oxygen transmission rate was measured using the same procedures and conditions as those for the oxygen transmission rate of the pouch that had yet to be stretched.

(5-3) Oxygen Transmission Rate after Retort Treatment (Oxygen Transmission Rate of Spouted Pouch)

Oxygen Transmission Rate of Entire Spouted Pouch

Each obtained spouted pouch of the flat type was filled with 400 mL of distilled water, then placed in a retort treatment system (Flavor Ace RCS-60 manufactured by HISAKA WORKS, LTD.), and was subjected to retort treatment at 120° C. and 0.15 MPa for 30 minutes. After the retort treatment, heating was stopped, and at the point when the internal temperature of the retort treatment system decreased to 60° C., the spouted pouch was taken out from the retort treatment system. Then, the spouted pouch was left in a room at 20° C. and 65% RH for 1 hour. After that, water was discharged through the spout of the spouted pouch. The oxygen transmission rate of the spouted pouch thus subjected to retort treatment was measured using the procedures and conditions described below.

First, a metal jig to which were connected two metal pipes for a carrier gas was set to the spout opening of the pouch, and fixed to the spout opening by means of an epoxy adhesive so as to prevent gas leakage through a gap between the metal jig and the spout. Next, that end of one of the metal pipes which was opposite to the end connected to the pouch was connected to an oxygen transmission testing system ("MOCON OX-TRAN 2/20" manufactured by ModernControls, Inc.). That is, setting was made so as to allow the carrier gas to be emitted into the spouted pouch through one of the metal pipes, then circulate through the interior of the spouted pouch, and then flow into the oxygen gas sensor of the oxygen transmission testing system through the other of the metal pipes.

Subsequently, the pouch to which the metal pipes were attached was enclosed by a bag, with the two metal pipes extending out of the bag, and the bag was fixed to the metal pipes with a string. The bag was one fabricated through heat sealing of a laminated film having a multilayer configuration of polyester/adhesive layer/EVOH layer/adhesive layer/PO layer. Next, the gap between the bag and the metal pipes was filled with an epoxy resin to increase the airtightness of the bag. Next, a hole was made at a portion of the bag, a pipe for feeding a gas was inserted into the hole, and the bag and the gas feeding pipe were fixed together by means of an adhesive tape so as to prevent entry of outside air through a gap between the bag and the pipe.

Subsequently, nitrogen gas containing 2 vol % of hydrogen gas was supplied both as the gas fed into the bag through the gas feeding pipe and as the carrier gas fed into the pouch through the metal pipe. A part of the gas having flowed into the bag permeated through the pouch to flow into the interior of the pouch, another part permeated through the bag to flow out of the bag, and another part flowed out of the bag through the two connection portions (the connection portion between the metal pipes and the bag and the connection portion between the gas feeding pipe and the bag). The concentration of oxygen gas contained in the carrier gas having passed through the metal pipes was measured by the oxygen gas sensor of the oxygen transmission testing system. The gas and the carrier gas were continuously fed into the bag and pouch until the oxygen concentration reached a constant value. The constant value of the oxygen concentration was set as a zero point for the oxygen transmission rate.

Thereafter, the gas fed into the bag was changed to humidity-conditioned oxygen gas. That is, nitrogen gas was allowed to flow inside the pouch, while oxygen gas was allowed to flow outside the pouch. The oxygen gas having permeated to the inside of the pouch from the outside of the pouch was entrained by the carrier gas flowing inside the pouch and passed through the metal pipe to the oxygen gas sensor, by which the oxygen concentration was measured. From the thus measured oxygen concentration, the oxygen transmission rate (in units of ml/(m²·day·atm)) of the spouted pouch subjected to retort treatment was calculated. The measurement was performed under conditions where the temperature was 20° C., the humidity was 85% RH, the oxygen pressure was 1 atm, and the carrier gas pressure was 1 atm.

Oxygen Transmission Rate of Spout Alone

The oxygen transmission rate of the spout alone was measured by the following procedures. First, the spout portion on the exterior of the spouted pouch subjected to retort treatment was cut off from the pouch. Subsequently, one of the openings of the spout cut off was sealed with an aluminum foil. Thereafter, a metal jig to which were connected two metal pipes for a carrier gas was set to the other opening of the spout which was not sealed with an aluminum foil, and the metal jig was fixed to the spout by means of an epoxy adhesive so as to prevent gas leakage through a gap between the metal jig and the spout. Next, that end of one of the metal pipes which was opposite to the end connected to the spout was connected to an oxygen transmission testing system ("MOCON OX-TRAN 2/20" manufactured by ModernControls, Inc.) so as to allow the carrier gas to flow into the spout through one of the metal pipes, then pass through the interior of the spout, and then flow into the oxygen gas sensor of the oxygen transmission testing system through the other of the metal pipes.

Subsequently, the spout to which the metal pipes were attached was enclosed by a bag, with the two metal pipes extending out of the bag, and the bag was fixed to the metal pipes with a string. The bag was one fabricated through heat sealing of a laminated film having a multilayer configuration of polyester/adhesive layer/EVOH layer/adhesive layer/PO layer. Next, the gap between the bag and the metal pipes was filled with an epoxy resin to increase the airtightness of the bag. Next, a hole was made at a portion of the bag, a pipe for feeding a gas was inserted into the hole, and the bag and the gas feeding pipe were fixed together by means of an adhesive tape so as to prevent entry of outside air through a gap between the bag and the pipe.

Subsequently, nitrogen gas containing 2 vol % of hydrogen gas was supplied both as the gas fed into the bag through the gas feeding pipe and as the carrier gas fed into the spout through the metal pipe. A part of the carrier gas fed into the bag permeated through the spout to flow into the interior of the spout, another part permeated through the bag to flow out of the bag, and another part flowed out of the bag through the two connection portions (the connection portion between the metal pipes and the bag and the connection portion between the gas feeding pipe and the bag). The concentration of oxygen gas contained in the carrier gas having passed through the metal pipes was measured by the oxygen gas sensor of the oxygen transmission testing system. The gas and the carrier gas were continuously fed into the bag and spout until the oxygen concentration reached a constant value. The constant value of the oxygen concentration was set as a zero point for the oxygen transmission rate.

Thereafter, the gas fed into the bag was changed to humidity-conditioned oxygen gas. That is, nitrogen gas was allowed to flow inside the spout, while oxygen gas was allowed to flow outside the pouch. The oxygen gas having permeated to the inside of the spout from the outside of the spout was entrained by the carrier gas flowing inside the spout and passed through the metal pipe to the oxygen gas sensor, by which the oxygen concentration was measured. From the thus measured oxygen concentration, the oxygen transmission rate (in units of ml/(m²·day·atm)) of the spout subjected to retort treatment was calculated. The measurement was performed under conditions where the temperature was 20° C., the humidity was 85% RH, the oxygen pressure was 1 atm, and the carrier gas pressure was 1 atm.

Oxygen Transmission Rate of Laminated Body (Film Material)

From the oxygen transmission rates of the spouted pouch and the spout which were measured by the above procedures, the oxygen transmission rate per unit area of the laminated body (film material) subjected to retort treatment was calculated using the formula below.

[Oxygen transmission rate of spouted pouch]=([Oxygen transmission rate of film material]×[Surface area of film material]+[Oxygen transmission rate of spout]×[Surface area of spout])/([Surface area of film material]+[Surface area of spout])

(Oxygen Transmission Rate of Flat Pouch or Gusseted Pouch)

For the flat pouches and gusseted pouches, the oxygen transmission rate before retort treatment was measured by the following procedures.

Each flat pouch or gusseted pouch obtained was filled with 500 mL of distilled water, then placed in a retort treatment system (Flavor Ace RCS-60 manufactured by HISAKA WORKS, LTD.), and was subjected to retort treatment at 120° C. and 0.15 MPa for 30 minutes. After the retort treatment, heating was stopped, and at the point when the internal temperature of the retort treatment system decreased to 60° C., the pouch was taken out from the retort treatment system. Then, the pouch was left in a room at 20° C. and 65% RH for 1 hour. After that, water was discharged through the opening of the pouch. The oxygen transmission rate of the pouch thus subjected to retort treatment was measured using the procedures and conditions described below.

A metal jig to which were connected two metal pipes for a carrier gas was inserted into the opening portion of the pouch, and fixed to the opening portion by means of an epoxy adhesive so as to prevent gas leakage through a gap between the metal jig and the opening portion. Next, that end of one of the metal pipes which was opposite to the end connected to the pouch was connected to an oxygen transmission testing system ("MOCON OX-TRAN 2/20" manufactured by ModernControls, Inc.) so as to allow the carrier gas to be emitted into the pouch through one of the metal pipes, then pass through the interior of the pouch, and then flow into the oxygen gas sensor of the oxygen transmission testing system through the other of the metal pipes.

Subsequently, the pouch to which the metal pipes were attached was enclosed by a bag, with the two metal pipes extending out of the bag, and the bag was fixed to the metal pipes with a string. The bag was one fabricated through heat sealing of a laminated film having a multilayer configuration of polyester/adhesive layer/EVOH layer/adhesive layer/PO layer. Next, the gap between the bag and the metal pipes was filled with an epoxy resin to increase the airtightness of the bag. Next, a hole was made at a portion of the bag, a pipe for feeding a gas was inserted into the hole, and the bag and the gas feeding pipe were fixed together by means of an adhesive tape so as to prevent entry of outside air through a gap between the bag and the pipe.

Subsequently, nitrogen gas containing 2 vol % of hydrogen gas was supplied both as the gas fed into the bag through the gas feeding pipe and as the carrier gas fed into the pouch through the metal pipe. A part of the gas having flowed into the bag permeated through the pouch to flow into the interior of the pouch, another part permeated through the bag to flow out of the bag, and another part flowed out of the bag through the two connection portions (the connection portion between the metal pipes and the bag and the connection portion between the gas feeding pipe and the bag). The concentration of oxygen gas contained in the carrier gas having passed through the metal pipes was measured by the oxygen gas sensor of the oxygen transmission testing system. The gas and the carrier gas were continuously fed into the bag and pouch until the oxygen concentration reached a constant value. The constant value of the oxygen concentration was set as a zero point for the oxygen transmission rate.

Thereafter, the gas fed into the bag was changed to humidity-conditioned oxygen gas. That is, nitrogen gas was allowed to flow inside the pouch, while oxygen gas was allowed to flow outside the pouch. The oxygen gas having permeated to the inside of the pouch from the outside of the pouch was entrained by the carrier gas flowing inside the pouch and passed through the metal pipe to the oxygen gas sensor, by which the oxygen concentration was measured. From the thus measured oxygen concentration, the oxygen transmission rate (in units of ml/(m$^2$·day·atm)) of the pouch subjected to retort treatment was calculated. The measurement was performed under conditions where the temperature was 20° C., the humidity was 85% RH, the oxygen pressure was 1 atm, and the carrier gas pressure was 1 atm.

Oxygen Transmission Rate of Laminated Body (Film Material)

From the measured oxygen transmission rate and surface area of the flat pouch or the gusseted pouch, the oxygen transmission rate per unit area of the multilayer structure subjected to retort treatment was calculated.

(5-4) Oxygen Transmission Rate of Spouted Pouch, Flat Pouch, and Gusseted Pouch Subjected to Retort Treatment and Bending Test (Preparation of Spouted Pouch, Flat Pouch, and Gusseted Pouch for Bending Test)

In the same manner as in (5-3) described above, each of the spouted pouches, flat pouches, and gusseted pouches was subjected to retort treatment. After the retort treatment, heating was stopped, and at the point when the internal temperature of the retort treatment system decreased to 60° C., the pouch was taken out from the retort treatment system. Then, the pouch was left in a room at 20° C. and 65% RH for 1 hour. After that, water was discharged through the opening of the pouch. Thereafter, the pouch was filled with distilled water, whose amount was 400 mL when the pouch was a spouted pouch or flat pouch and 500 mL when the pouch was a gusseted pouch. The headspace of the pouch was narrowed as much as possible, after which, in order to prevent leakage of the packed distilled water, the pouch was hermetically closed by, when the pouch was a spouted pouch, covering the opening of the spout with a cap or by, when the pouch was a flat pouch or a spouted pouch, heat sealing the opening of the pouch.

(Bending Test)

Each of the hermetically-closed pouches was dropped on its side surface, i.e., on its heat-sealed side, from a height of 1.5 m five times. The bending test for bending the pouch was thus performed. Subsequently, water was discharged from the pouch subjected to the bending test by removing the cap when the pouch was a spouted pouch or by cutting a part of the heat-sealed portion of the opening when the pouch was a flat pouch or a gusseted pouch. The oxygen transmission rate of the thus-treated pouch was measured using the same procedures and conditions as those for the oxygen transmission rate of the corresponding type of pouch subjected to retort treatment.

(6) Evaluation on Infusion Bag (6-1) Oxygen Transmission Rate before Retort Treatment For each infusion bag obtained, the oxygen transmission rate before retort treatment was measured by the following procedures.

First, a metal jig to which were connected two metal pipes for a carrier gas was set to the spout opening of the infusion bag, and fixed to the spout opening by means of an epoxy adhesive so as to prevent gas leakage through a gap between the metal jig and the spout. Next, that end of one of the metal pipes which was opposite to the end connected to the infusion bag was connected to an oxygen transmission testing system ("MOCON OX-TRAN 2/20" manufactured by ModernControls, Inc.). That is, setting was made so as to allow the carrier gas to be emitted into the infusion bag through one of the metal pipes, then pass through the interior of the infusion bag, and then flow into the oxygen gas sensor of the oxygen transmission testing system through the other of the metal pipes.

Subsequently, the infusion bag to which the metal pipes were attached was enclosed by a bag, and the bag was fixed to the two metal pipes with a string. The bag was one fabricated through heat sealing of a laminated film having a multilayer configuration of polyester/adhesive layer/EVOH layer/adhesive layer/PO layer. Next, the gap between the bag and the metal pipes was filled with an epoxy resin to increase the airtightness. Next, a hole was made at a portion of the bag, a pipe for feeding a gas was inserted into the hole, and the bag and the pipe were fixed together by means of an adhesive tape so as to prevent entry of outside air through a gap between the bag and the pipe.

Subsequently, nitrogen gas containing 2 vol % of hydrogen gas was fed as the carrier gas into the enclosing bag through the gas feeding pipe and into the infusion bag through the metal pipe. A part of the gas having flowed into the enclosing bag permeated through the infusion bag to flow into the interior of the infusion bag, another part permeated through the enclosing bag to flow out of the enclosing bag, and another part flowed out of the enclosing bag through the two connection portions. Oxygen gas contained in the carrier gas was entrained by the carrier gas to the sensor section, by which the oxygen concentration was measured. The carrier gas was continuously fed into the enclosing bag and infusion bag until the oxygen concentration reached a constant value. The constant value of the oxygen concentration was set as a zero point for the oxygen transmission rate.

Thereafter, the carrier gas fed into the enclosing bag was changed to humidity-conditioned oxygen gas. That is, nitrogen gas was allowed to flow inside the infusion bag, while oxygen gas was allowed to flow outside the infusion bag. The oxygen gas having permeated to the inside of the infusion bag from the outside of the infusion bag was entrained by the carrier gas flowing inside the infusion bag to the oxygen gas sensor, by which the oxygen concentration was measured. From the thus measured oxygen concentration, the oxygen transmission rate (in units of ml/(m$^2$·day·atm)) of the infusion bag that had yet to be subjected to retort treatment was calculated. The measurement was performed under conditions where the temperature was 20° C., the humidity was 85% RH, the oxygen pressure was 1 atm, and the carrier gas pressure was 1 atm. Nitrogen gas containing 2 vol % of hydrogen gas was used as the carrier gas.

Subsequently, the oxygen transmission rate of the spout alone was measured by the following procedures. First, the spout portion on the exterior of the infusion bag was cut off from the infusion bag. Subsequently, one opening of the spout was sealed with an aluminum foil. Thereafter, a metal jig to which were connected two metal pipes for a carrier gas was set to the other opening of the spout which was not sealed, and the metal jig was fixed to the spout by means of an epoxy adhesive so as to prevent gas leakage through a gap between the metal jig and the spout. Next, that end of one of the metal pipes which was opposite to the end connected to the spout was connected to an oxygen transmission testing system ("MOCON OX-TRAN 2/20" manufactured by ModernControls, Inc.). That is, setting was made so as to allow the carrier gas to flow into the spout through one of the metal pipes, then pass through the interior of the spout, and then flow into the oxygen gas sensor through the other of the metal pipes.

Subsequently, the spout to which the metal pipes were attached was enclosed by a bag. The bag was one fabricated through heat sealing of a laminated film having a multilayer configuration of polyester/adhesive layer/EVOH layer/adhesive layer/PO layer. Next, the bag was fixed to the two metal pipes with a string. The gap between the bag and the metal pipes was filled with an epoxy resin to increase the airtightness. A hole was made at a portion of the bag, a pipe for feeding a gas was inserted into the hole, and the bag and the pipe were fixed together by means of an adhesive tape so as to prevent entry of outside air through a gap between the bag and the pipe.

Subsequently, nitrogen gas containing 2 vol % of hydrogen gas was fed as the carrier gas into the bag through the gas feeding pipe and into the spout through the metal pipe. A part of the gas fed into the bag permeated through the pouch to flow into the interior of the spout, another part permeated through the bag to flow out of the bag, and another part flowed out of the bag through the two connection portions. Oxygen gas contained in the carrier gas was entrained by the carrier gas to the sensor section, by which the oxygen concentration was measured. The carrier gas was continuously fed into the bag and spout until the oxygen concentration reached a constant value. The constant value of the oxygen concentration was set as a zero point for the oxygen transmission rate.

Thereafter, the carrier gas fed into the bag was changed to humidity-conditioned oxygen gas. That is, nitrogen gas was allowed to flow inside the spout, while oxygen gas was allowed to flow outside the spout. The oxygen gas having permeated to the inside of the spout from the outside of the spout was entrained by the carrier gas flowing inside the spout to the oxygen gas sensor, by which the oxygen concentration was measured. From the thus measured oxygen concentration, the oxygen transmission rate (in units of ml/(m$^2$·day·atm)) of the spout that had yet to be subjected to retort treatment was calculated. The measurement was performed under conditions where the temperature was 20° C., the humidity was 85% RH, the oxygen pressure was 1 atm, and the carrier gas pressure was 1 atm. Nitrogen gas containing 2 vol % of hydrogen gas was used as the carrier gas. The spout portion on the exterior of the infusion bag had a surface area of 9 cm$^2$ and showed an oxygen transmission rate of 28 ml/(m$^2$·day·atm).

Subsequently, the oxygen transmission rate of the film material was calculated. The film material of the infusion bag fabricated had a size of 10 cm×12 cm, and its outer periphery was heat-sealed in such a manner that the seal width was 0.5 cm. That is, the film material had a surface area of 9 cm×11 cm=99 cm².

From the oxygen transmission rates of the infusion bag and the spout which were measured by the above procedures, the oxygen transmission rate per unit area of the film material that had yet to be subjected to retort treatment was calculated using the formula below.

[Oxygen transmission rate of infusion bag]=([Oxygen transmission rate of film material]×[Surface area of film material]+[Oxygen transmission rate of spout]×[Surface area of spout])/([Surface area of film material]+[Surface area of spout])

Specifically, for example, assuming that the oxygen transmission rate of the infusion bag is 3.00 ml/(m²·day·atm), the oxygen transmission rate of the film material can be calculated as follows.

3.00=([Oxygen transmission rate of film material]×99+28×9)/(99+9)

[Oxygen transmission rate of multilayer structure]=(3×108−28×9)/99=0.73 ml/(m²·day·atm)

(6-2) Oxygen Transmission Rate after Retort Treatment

Each infusion bag obtained was filled with 100 mL of distilled water, then placed in a retort treatment system (Flavor Ace RCS-60 manufactured by HISAKA WORKS, LTD.), and was subjected to retort treatment at 120° C. and 0.15 MPa for 30 minutes. After the retort treatment, heating was stopped, and at the point when the internal temperature of the retort treatment system decreased to 60° C., the infusion bag was taken out from the retort treatment system. Then, the infusion bag was left in a room at 20° C. and 65% RH for 1 hour. After that, water was discharged through the spout of the infusion bag. The oxygen transmission rate of the infusion bag thus subjected to retort treatment was measured using the same procedures and conditions as those for the oxygen transmission rate before retort treatment.

Also, the oxygen transmission rate of the spout was measured using the same procedures and conditions as those for the oxygen transmission rate before retort treatment. The oxygen transmission rate of the spout did not change before and after the retort treatment, and was 28 ml/(m²·day·atm). Subsequently, the oxygen transmission rate of the gas barrier laminate subjected to retort treatment was calculated based on the above formula.

(6-3) Oxygen Transmission Rate after Retort Treatment and Bending Test

Each infusion bag obtained was filled with 100 mL of distilled water, then placed in a retort treatment system (Flavor Ace RCS-60 manufactured by HISAKA WORKS, LTD.), and was subjected to retort treatment at 120° C. and 0.15 MPa for 30 minutes. After the retort treatment, heating was stopped, and at the point when the internal temperature of the retort treatment system decreased to 60° C., the infusion bag was taken out from the retort treatment system. Then, the infusion bag was left in a room at 20° C. and 65% RH for 1 hour.

Thereafter, the infusion bag subjected to retort treatment was dropped on its side surface, i.e., on its heat-sealed side, from a height of 1.5 m ten times. The bending test for bending the infusion bag was thus performed. Subsequently, water was discharged through the spout of the infusion bag subjected to the bending test. The oxygen transmission rate of the multilayer structure of the thus-treated infusion bag was measured using the same procedures and conditions as those for the oxygen transmission rate before retort treatment.

(6-4) Oxygen Transmission Rate (Of) of Film Material Kept Stretched by 5%

A sample having a size of 9 cm×11 cm was cut out from a laminated body constituting each infusion bag that had yet to be subjected to retort treatment. The sample was left at 23° C. and 50% RH for over 24 hours, then, under these same conditions, was stretched by 5% in a direction corresponding to the longitudinal direction of the infusion bag, and allowed to keep the stretched state for 5 minutes. Thus, a film material subjected to stretching was obtained. The oxygen transmission rate was measured using an oxygen transmission testing system ("MOCON OX-TRAN 2/20" manufactured by ModernControls, Inc.). Specifically, the film material subjected to stretching was set in such a manner that the layer (YZ) faced the oxygen feed-side and the base (X) faced the carrier gas-side, and the oxygen transmission rate (in units of ml/(m²·day·atm)) was measured under conditions where the temperature was 20° C., the humidity on the oxygen feed-side was 85% RH, the humidity on the carrier gas-side was 85% RH, the oxygen pressure was 1 atm, and the carrier gas pressure was 1 atm. Nitrogen gas containing 2 vol % of hydrogen gas was used as the carrier gas.

(7) Evaluation on Paper Container (7-1) Oxygen Transmission Rate (Os) of Separation Barrier (Flat Surface) of Paper Container 1

The oxygen transmission rate was measured using an oxygen transmission testing system ("MOCON OX-TRAN 2/20" manufactured by ModernControls, Inc.). Specifically, a circular sample (with a diameter of 6.5 cm) including no folded portion was cut out from the flat separation barrier constituting the side surfaces of the brick-type paper container 1. Next, the circular sample was placed in a circular hole of 4.5 cm diameter made in a 10-cm-square aluminum foil (with a thickness of 30 μm), and the gap between the sample and the aluminum foil was closed with a two-component curable epoxy adhesive. The measurement sample thus obtained was set to the testing system, and the oxygen transmission rate (in units of ml/(m²·day·atm)) was measured under conditions where the temperature was 20° C., the humidity on the oxygen feed-side was 85% RH, the humidity on the carrier gas-side was 85% RH, the oxygen pressure was 1 atm, and the carrier gas pressure was 1 atm. Nitrogen gas containing 2 vol % of hydrogen gas was used as the carrier gas. The setting of the separation barrier to the testing system was done in such a manner that the layer (YZ) of the multilayer structure faced the oxygen feed-side and the base (X) of the multilayer structure faced the carrier gas-side.

(7-2) Oxygen Transmission Rate (Of) of Paper Container 1's Separation Barrier (Flat Surface) Kept Stretched by 5%

A sample having a size of 6.5 cm×9 cm and including no folded portion was cut out from the flat separation barrier constituting the side surfaces of the brick-type paper container 1. The sample was left at 23° C. and 50% RH for over 24 hours, then, under these same conditions, was stretched by 5% in a direction corresponding to the longitudinal direction, and allowed to keep the stretched state for 5 minutes. Thus, a separation barrier (a laminate constituting the separation barrier) subjected to stretching was obtained. The oxygen transmission rate (in units of ml/(m²·day·atm)) of this separation barrier was measured using the same conditions as those in "(7-1) Oxygen Transmission Rate (Os) of Separation Barrier (Flat Surface) of Paper Container 1" described above. The setting of the separation barrier subjected to stretching to the testing system was done in such a manner that the layer (YZ) of the multilayer structure faced the oxygen feed-side and the base (X) of the multilayer structure faced the carrier gas-side.

(7-3) Oxygen Transmission Rate of Flat Portion of Paper Container 1 Subjected to Retort Treatment The brick-type paper container 1 (with an inner volume of 500 ml) was injected with 500 g of distilled water, and then was subjected to retort treatment at 120° C. and 0.15 MPa for 30 minutes. After the retort treatment, the paper container 1 was taken out, and left in a room kept at 20° C. and 85% RH for 1 week. Thereafter, water was discharged from the paper container 1, from which was cut out a sample with which the oxygen barrier properties of the paper container subjected to retort treatment were evaluated. Specifically, first, a circular sample (with a diameter of 6.5 cm) including no folded portion was cut out from a side surface of the paper container 1. Next, the circular sample was placed in a circular hole of 4.5 cm diameter made in a 10-cm-square aluminum foil (with a thickness of 30 µm), and the gap between the sample and the aluminum foil was closed with a two-component curable epoxy adhesive. For the measurement sample thus obtained, the oxygen transmission rate (in units of ml/($m^2$·day·atm)) was measured in the same manner as in "(7-1) Oxygen Transmission Rate (Os) of Separation Barrier (Flat Surface) of Paper Container 1" described above.

(7-4) Oxygen Transmission Rate of Folded Portion of Paper Container 1 Subjected to Retort Treatment The oxygen transmission rate of a folded portion of the paper container 1 subjected to retort treatment was measured using the procedures and conditions which are the same as those in "(7-3) Oxygen Transmission Rate of Flat Portion of Paper Container 1 Subjected to Retort Treatment", except that the circular sample (with a diameter of 6.5 cm) cut out from the paper container 1 subjected to retort treatment included a folded portion.

(7-5) Oxygen Transmission Rates of Bonding portions of Paper Containers 1 and 2 Subjected to Retort Treatment The oxygen transmission rate of a bonding portion of each of the paper containers 1 and 2 subjected to retort treatment was measured using the procedures and conditions which are the same as those in "(7-3) Oxygen Transmission Rate of Flat Portion of Paper Container 1 Subjected to Retort Treatment", except that the circular sample (with a diameter of 6.5 cm) cut out from the paper container 1 or 2 subjected to retort treatment included a bonding portion.

(7-6) Appearance of Window Portion of Paper Container 3 Subjected to Retort Treatment The gable top-type paper container 3 with a window was injected with 500 g of distilled water, hermetically closed, and then subjected to retort treatment at 120° C. and 0.15 MPa for 30 minutes. After the retort treatment, the paper container was taken out, and left in a room at 20° C. and 65% RH for 1 hour. The appearance of the window portion after the retort treatment was evaluated by visual inspection according to the following ratings.

A: Very good appearance that was colorless, transparent, and uniform.

B: Good appearance, albeit slightly opaque or uneven.

C: The window portion suffered from delamination between the layers of the multilayer structure and was of no practical use, in addition to which the subsequent measurements were impossible.

[Production Examples of Coating Liquids (U) and (V)]

Coating liquids (U1) to (U4) and coating liquids (V1) to (V8) were obtained in the same manner as in Example Set A.

Example B1

An oriented polyethylene terephthalate film ("Lumirror P60" (trade name) manufactured by TORAY INDUSTRIES, INC. and having a thickness of 12 µm; this film may be abbreviated as "PET" hereinafter) was prepared as a base. The coating liquid (U1) was applied onto the base (PET) with a bar coater in such a manner that the dry thickness was 0.5 µm. Drying was performed at 110° C. for 5 minutes. Subsequently, heat treatment was performed at 180° C. for 1 minute, and thus a structure (B) having a configuration of layer (Y1) (0.5 µm)/PET (12 µm) was obtained. Next, the coating liquid (V1) was applied onto the layer (Y1) of the structure (B) with a bar coater in such a manner that the dry thickness was 0.3 µm. Drying was performed at 110° C. for 5 minutes, so that a multilayer structure (B1) having a configuration of layer (Z1) (0.3 µm)/layer (Y1) (0.5 µm)/PET (12 µm) was obtained.

The moisture permeability (water vapor transmission rate: WVTR) of the obtained multilayer structure (B1) was measured using a water vapor transmission testing system ("MOCON PERMATRAN 3/33" manufactured by Modern-Controls, Inc.). Specifically, the multilayer structure was set in such a manner that the layer (Z1) faced the water vapor feed-side and the layer of PET faced the carrier gas-side, and the moisture permeability (in units of g/($m^2$·day)) was measured under conditions where the temperature was 40° C., the humidity on the water vapor feed-side was 90% RH, and the humidity on the carrier gas-side was 0% RH. The moisture permeability of the multilayer structure (B1) was 0.2 g/($m^2$·day).

From the obtained multilayer structure (B1) was cut out a measurement sample having a size of 15 cm×10 cm. The sample was left at 23° C. and 50% RH for over 24 hours, then, under these same conditions, was longitudinally stretched by 5%, and allowed to keep the stretched state for 5 minutes. Thus, a multilayer structure (B1) subjected to stretching was obtained. The moisture permeability of the multilayer structure (B1) subjected to stretching, as measured by the above method, was 0.2 g/($m^2$·day).

Various types of joined containers (vertical form fill seal bags, vacuum packaging bags, pouches, laminated tube containers, infusion bags, and paper containers) including the obtained multilayer structure (B1) were fabricated and evaluated by the procedures previously described.

Example B2

A multilayer structure and the various types of joined containers were obtained in the same manner as in Example B1, except that the coating liquid (V) was changed to V5.

The moisture permeability of the multilayer structure (B1) obtained in Example B2 was measured in the same manner as in Example B1. The result was that the moisture permeability of the multilayer structure (B1) was 0.2 g/($m^2$·day). Also, the moisture permeability of the multilayer structure (B1) subjected to 5% stretching was measured in the same manner as in Example B1. The result was that the moisture permeability of the multilayer structure (B1) subjected to stretching was 0.2 g/($m^2$·day).

Examples B3 to B6, B39, and B40

Multilayer structures and the various types of joined containers were obtained in the same manner as in Example B1, except that the thickness of the layer (Z) and the coating liquid (V) were changed according to Table B1.

Examples B7 to B12

Multilayer structures and the various types of joined containers were obtained in the same manner as in Example B1, except that the coating liquid (V) used was changed according to Table B1.

Examples B13 to B18

Multilayer structures and the various types of joined containers were obtained in the same manner as in Example B1, except that the conditions of the heat treatment and the coating liquid (V) were changed according to Table B1.

Examples B19 to B24

Multilayer structures and the various types of joined containers were obtained in the same manner as in Example B1, except that the coating liquid (U) and the coating liquid (V) used were changed according to Table B1.

Examples B25 and B26

Multilayer structures and the various types of joined containers were obtained in the same manner as in Example B1, except that the heat treatment step was carried out after formation of the layer (Z).

Examples B27 and B28

Multilayer structures and the various types of joined containers were obtained in the same manner as in Example B1, except that the layer (Y) and the layer (Z) were stacked on both surfaces of the base, and that the coating liquid (V) was changed according to Table B1. The moisture permeability of each multilayer structure (B1) obtained, as measured in the same manner as in Example B1, was not more than 0.1 $g/(m^2 \cdot day)$.

Examples B29 and B30

Multilayer structures and the various types of joined containers were obtained in the same manner as in Example B1, except that the base was an oriented nylon film ("EMBLEM ONBC" (trade name) manufactured by UNITIKA LTD. and having a thickness of 15 μm; this film may be abbreviated as "ONY"), and that the coating liquid (V) was changed according to Table B1.

Examples B31 and B32

Multilayer structures and the various types of joined containers were obtained in the same manner as in Example B1, except that the base was a layer of aluminum oxide deposited on the surface of PET, and that the coating liquid (V) was changed according to Table B1.

Examples B33 and B34

Multilayer structures and the various types of joined containers were obtained in the same manner as in Example B1, except that the base was a layer of silicon oxide deposited on the surface of PET, and that the coating liquid (V) was changed according to Table B1.

Examples B35 and B36

Multilayer structures and the various types of joined containers were obtained in the same manner as in Example B1, except that the layer (Y) was a deposited layer of aluminum having a thickness of 0.03 μm, and that the coating liquid (V) was changed according to Table B1. The aluminum layer was formed by vacuum deposition.

Examples B37 and B38

Multilayer structures and the various types of joined containers were obtained in the same manner as in Example B1, except that the layer (Y) was a deposited layer of aluminum oxide having a thickness of 0.03 μm, and that the coating liquid (V) was changed according to Table B1. The aluminum oxide layer was formed by vacuum deposition.

Examples B41 and B42

Multilayer structures and the various types of joined containers were obtained in the same manner as in Example B1, except that the layer (Y) was formed after formation of the layer (Z), and that the coating liquid (V) was changed according to Table B1.

Comparative Example B1

A multilayer structure and joined containers prepared according to Example B1 but without formation of the layer (Z) were used as those of Comparative Example B1.

The moisture permeability of the multilayer structure (B1) obtained in Comparative Example B1 was measured in the same manner as in Example B1. The result was that the moisture permeability of the multilayer structure was 0.3 $g/(m^2 \cdot day)$. Also, the moisture permeability of the multilayer structure of Comparative Example B1 subjected to 5% stretching was measured in the same manner as in Example B1. The result was that the moisture permeability of the multilayer structure subjected to stretching was 5.7 $g/(m^2 \cdot day)$.

Comparative Example B2

A multilayer structure and joined containers prepared according to Example B13 but without formation of the layer (Z) were used as those of Comparative Example B2.

Comparative Example B3

A multilayer structure and joined containers prepared according to Example B15 but without formation of the layer (Z) were used as those of Comparative Example B3.

Comparative Example B4

A multilayer structure and joined containers prepared according to Example B17 but without formation of the layer (Z) were used as those of Comparative Example B4.

Comparative Example B5

A multilayer structure and joined containers prepared according to Example B19 but without formation of the layer (Z) were used as those of Comparative Example B5.

Comparative Example B6

A multilayer structure and joined containers prepared according to Example B21 but without formation of the layer (Z) were used as those of Comparative Example B6.

Comparative Example B7

A multilayer structure and joined containers prepared according to Example B23 but without formation of the layer (Z) were used as those of Comparative Example B7.

Comparative Example B8

A multilayer structure and joined containers prepared according to Example B27 but without formation of the layer (Z) were used as those of Comparative Example B8.

Comparative Example B9

A multilayer structure and joined containers prepared according to Example B29 without formation of the layer (Z) were used as those of Comparative Example B9.

Comparative Example B10

A multilayer structure and joined containers prepared according to Example B31 but without formation of the layer (Z) were used as those of Comparative Example B10.

Comparative Example B11

A multilayer structure and joined containers prepared according to Example B33 but without formation of the layer (Z) were used as those of Comparative Example B11.

Comparative Example B12

A multilayer structure and joined containers prepared according to Example B35 but without formation of the layer (Z) were used as those of Comparative Example B12.

Comparative Example B13

A multilayer structure and joined containers prepared according to Example B37 but without formation of the layer (Z) were used as those of Comparative Example B13.

Comparative Examples B14 and B15

Multilayer structures and the various types of joined containers were obtained in the same manner as in Example B1, except that the layer (Y) was a layer (Y') which was a deposited layer of silicon oxide having a thickness of 0.03 µm, and that the coating liquid (V) was changed according to Table B1. The silicon oxide layer was formed by vacuum deposition.

Comparative Examples B16 and B17

Multilayer structures and the various types of joined containers were obtained in the same manner as in Example B1, except that the layer (Y) was not formed, and that the coating liquid (V) was changed according to Table B1.

Comparative Examples B18 and B19

Multilayer structures and the various types of joined containers were obtained in the same manner as in Example B1, except that the layer (Z) was formed on PET, and that the coating liquid (V) was changed according to Table B1. That is, in Comparative Example B18, a multilayer structure having a configuration of layer (Y1) (0.5 µm)/PET (12 µm)/layer (Z1) (0.3 µm), and the various types of joined containers including the multilayer structure, were fabricated.

Comparative Example B20

A multilayer structure and joined containers prepared according to Comparative Example B14 but without formation of the layer (Z) were used as those of Comparative Example B20.

Comparative Example B21

A material prepared according to Comparative Example B16 but without formation of the layer (Z), that is, the base (PET) alone, was used as Comparative Example B21.

The production conditions and evaluation results for Examples and Comparative Examples are shown in Tables B1 to B11 below. In the tables, "-" means "not used", "not calculable", "not carried out", "not measurable", or the like.

As is apparent from the tables, each of the joined containers of Examples maintained good gas barrier properties even when subjected, after bag making, to a higher physical stress (5% stretching). By contrast, all of the containers of Comparative Examples showed marked deterioration in gas barrier properties after subjected to a high physical stress (5% stretching), although some of them maintained good gas barrier properties when merely subjected to a physical stress caused during bag making. Some of the joined containers of Examples were confirmed to maintain good gas barrier properties even when subjected to a physical stress applied during the transportation test or squeeze test performed after retort treatment.

TABLE B1

| | | Layer Configuration | | | | | | | | |
| --- | --- | --- | --- | --- | --- | --- | --- | --- | --- | --- |
| | | Layer (Y) | | | | | | Layer (Z) | | |
| | | | | | | Heat treatment step | | | | |
| | Base (X) | Type | Thickness (µm) | Coating liquid | $N_M/N_P$ | Temperature (°C.) | Time (min) | Thickness (µm) | Coating liquid | Polymer (E) |
| Example B1 | PET | YA | 0.5 | U1 | 1.15 | 180 | 1 | 0.3 | V1 | PHM |
| Example B2 | | | | | | | | | V5 | VPA |

TABLE B1-continued

| | Layer Configuration | | | | | | | | |
|---|---|---|---|---|---|---|---|---|---|
| | Layer (Y) | | | | | | Layer (Z) | | |
| | | | | | Heat treatment step | | | | |
| | Base (X) | Type | Thickness (μm) | Coating liquid | $N_M/N_P$ | Temperature (° C.) | Time (min) | Thickness (μm) | Coating liquid | Polymer (E) |
| Example B3 | PET | YA | 0.5 | U1 | 1.15 | 180 | 1 | 0.1 | V1 | PHM |
| Example B4 | | | | | | | | | V5 | VPA |
| Example B5 | PET | YA | 0.5 | U1 | 1.15 | 180 | 1 | 0.05 | V1 | PHM |
| Example B6 | | | | | | | | | V5 | VPA |
| Example B7 | PET | YA | 0.5 | U1 | 1.15 | 180 | 1 | 0.3 | V2 | PHP |
| Example B8 | | | | | | | | | V6 | VBPA |
| Example B9 | PET | YA | 0.5 | U1 | 1.15 | 180 | 1 | 0.3 | V3 | PHM/AN (2/1) |
| Example B10 | | | | | | | | | V4 | PHM/AN (1/1) |
| Example B11 | | | | | | | | | V7 | VPA/MA (2/1) |
| Example B12 | | | | | | | | | V8 | VPA/MA (1/1) |
| Example B13 | PET | YA | 0.5 | U1 | 1.15 | 120 | 5 | 0.3 | V1 | PHM |
| Example B14 | | | | | | | | | V5 | VPA |
| Example B15 | PET | YA | 0.5 | U1 | 1.15 | 150 | 3 | 0.3 | V1 | PHM |
| Example B16 | | | | | | | | | V5 | VPA |
| Example B17 | PET | YA | 0.5 | U1 | 1.15 | 200 | 1 | 0.3 | V1 | PHM |
| Example B18 | | | | | | | | | V5 | VPA |
| Example B19 | PET | YA | 0.5 | U2 | 4.48 | 180 | 1 | 0.3 | V1 | PHM |
| Example B20 | | | | | | | | | V5 | VPA |
| Example B21 | PET | YA | 0.5 | U3 | 1.92 | 180 | 1 | 0.3 | V1 | PHM |
| Example B22 | | | | | | | | | V5 | VPA |
| Example B23 | PET | YA | 0.5 | U4 | 0.82 | 180 | 1 | 0.3 | V1 | PHM |
| Example B24 | | | | | | | | | V5 | VPA |
| Example B25 | PET | YA | 0.5 | U1 | 1.15 | 180 | $1^{(1*)}$ | 0.3 | V1 | PHM |
| Example B26 | | | | | | | | | V5 | VPA |
| Example B27 | PET | YA | 0.5 | U1 | 1.15 | 180 | 1 | 0.3 | V1 | PHM |
| Example B28 | | | | | | | | | V5 | VPA |
| Example B29 | ONY | YA | 0.5 | U1 | 1.15 | 180 | 1 | 0.3 | V1 | PHM |
| Example B30 | | | | | | | | | V5 | VPA |
| Example B31 | $AlO_x$ | YA | 0.5 | U1 | 1.15 | 180 | 1 | 0.3 | V1 | PHM |
| Example B32 | | | | | | | | | V5 | VPA |
| Example B33 | $SiO_x$ | YA | 0.5 | U1 | 1.15 | 180 | 1 | 0.3 | V1 | PHM |
| Example B34 | | | | | | | | | V5 | VPA |
| Example B35 | PET | YB | Deposited layer of aluminum | | | | | 0.3 | V1 | PHM |
| Example B36 | | | | | | | | 0.3 | V5 | VPA |
| Example B37 | PET | YC | Deposited layer of aluminum oxide | | | | | 0.3 | V1 | PHM |
| Example B38 | | | | | | | | 0.3 | V5 | VPA |
| Example B39 | PET | YA | 0.5 | U1 | 1.15 | 180 | 1 | 0.5 | V1 | PHM |
| Example B40 | | | | | | | | | V5 | VPA |
| Example B41 | PET | YA | 0.5 | U1 | 1.15 | 180 | 1 | 0.3 | V1 | PHM |
| Example B42 | | | | | | | | | V5 | VPA |
| Comp. Example B1 | PET | YA | 0.5 | U1 | 1.15 | 180 | 1 | — | — | — |
| Comp. Example B2 | PET | YA | 0.5 | U1 | 1.15 | 120 | 5 | — | — | — |
| Comp. Example B3 | PET | YA | 0.5 | U1 | 1.15 | 150 | 3 | — | — | — |
| Comp. Example B4 | PET | YA | 0.5 | U1 | 1.15 | 200 | 1 | — | — | — |
| Comp. Example B5 | PET | YA | 0.5 | U2 | 4.48 | 180 | 1 | — | — | — |
| Comp. Example B6 | PET | YA | 0.5 | U3 | 1.92 | 180 | 1 | — | — | — |
| Comp. Example B7 | PET | YA | 0.5 | U4 | 0.82 | 180 | 1 | — | — | — |
| Comp. Example B8 | PET | YA | 0.5 | U1 | 1.15 | 180 | 1 | — | — | — |
| Comp. Example B9 | ONY | YA | 0.5 | U1 | 1.15 | 180 | 1 | — | — | — |
| Comp. Example B10 | $AlO_x$ | YA | 0.5 | U1 | 1.15 | 180 | 1 | — | — | — |
| Comp. Example B11 | $SiO_x$ | YA | 0.5 | U1 | 1.15 | 180 | 1 | — | — | — |
| Comp. Example B12 | PET | YB | Deposited layer of aluminum | | | | | — | — | — |
| Comp. Example B13 | PET | YC | Deposited layer of aluminum oxide | | | | | — | — | — |
| Comp. Example B14 | PET | — | Deposited layer of silicon oxide | | | | | 0.3 | V1 | PHM |
| Comp. Example B15 | | | | | | | | 0.3 | V5 | VPA |
| Comp. Example B16 | PET | — | — | | | | | 0.3 | V1 | PHM |
| Comp. Example B17 | | | | | | | | 0.3 | V5 | VPA |
| Comp. Example B18 | PET | YA | 0.5 | U1 | 1.15 | 180 | 1 | 0.3 | V1 | PHM |
| Comp. Example B19 | | | | | | | | | V5 | VPA |
| Comp. Example B20 | PET | — | Deposited layer of silicon oxide | | | | | — | — | — |
| Comp. Example B21 | PET | — | — | | | | | — | — | — |

$^{(1*)}$The heat treatment was carried out not after formation of the layer (Y) but after formation of the layer (Z).

TABLE B2

Multilayer Structure

| | Layer configuration | Appearance | Infrared absorption spectrum of layer (Y) | | |
|---|---|---|---|---|---|
| | | | $n^1$ (cm$^{-1}$) | Half width (cm$^{-1}$) | $\alpha^2/\alpha^1$ |
| Example B1 | (Z)/(Y)/PET | A | 1108 | 37 | <0.1 |
| Example B2 | (Z)/(Y)/PET | A | 1108 | 37 | <0.1 |
| Example B3 | (Z)/(Y)/PET | A | 1108 | 37 | <0.1 |
| Example B4 | (Z)/(Y)/PET | A | 1108 | 37 | <0.1 |
| Example B5 | (Z)/(Y)/PET | A | 1108 | 37 | <0.1 |
| Example B6 | (Z)/(Y)/PET | A | 1108 | 37 | <0.1 |
| Example B7 | (Z)/(Y)/PET | A | 1108 | 37 | <0.1 |
| Example B8 | (Z)/(Y)/PET | A | 1108 | 37 | <0.1 |
| Example B9 | (Z)/(Y)/PET | A | 1108 | 37 | <0.1 |
| Example B10 | (Z)/(Y)/PET | A | 1108 | 37 | <0.1 |
| Example B11 | (Z)/(Y)/PET | A | 1108 | 37 | <0.1 |
| Example B12 | (Z)/(Y)/PET | A | 1108 | 37 | <0.1 |
| Example B13 | (Z)/(Y)/PET | A | 1111 | 60 | <0.1 |
| Example B14 | (Z)/(Y)/PET | A | 1111 | 61 | <0.1 |
| Example B15 | (Z)/(Y)/PET | A | 1108 | 44 | <0.1 |
| Example B16 | (Z)/(Y)/PET | A | 1108 | 46 | <0.1 |
| Example B17 | (Z)/(Y)/PET | A | 1107 | 35 | <0.1 |
| Example B18 | (Z)/(Y)/PET | A | 1107 | 35 | <0.1 |
| Example B19 | (Z)/(Y)/PET | A | 1122 | 140 | 0.29 |
| Example B20 | (Z)/(Y)/PET | A | 1122 | 140 | 0.29 |
| Example B21 | (Z)/(Y)/PET | A | 1102 | 43 | <0.1 |
| Example B22 | (Z)/(Y)/PET | A | 1102 | 43 | <0.1 |
| Example B23 | (Z)/(Y)/PET | A | 1113 | 30 | <0.1 |
| Example B24 | (Z)/(Y)/PET | A | 1113 | 31 | <0.1 |
| Example B25 | (Z)/(Y)/PET | B | 1113 | 43 | <0.1 |
| Example B26 | (Z)/(Y)/PET | B | 1113 | 43 | <0.1 |
| Example B27 | (Z)/(Y)/PET/(Y)/(Z) | A | 1108 | 37 | <0.1 |
| Example B28 | (Z)/(Y)/PET/(Y)/(Z) | A | 1108 | 37 | <0.1 |
| Example B29 | (Z)/(Y)/ONY | A | 1109 | 40 | <0.1 |
| Example B30 | (Z)/(Y)/ONY | A | 1109 | 40 | <0.1 |
| Example B31 | (Z)/(Y)/AlO$_x$/PET | A | 1108 | 37 | <0.1 |
| Example B32 | (Z)/(Y)/AlO$_x$/PET | A | 1108 | 37 | <0.1 |
| Example B33 | (Z)/(Y)/SiO$_x$/PET | A | 1108 | 37 | <0.1 |
| Example B34 | (Z)/(Y)/SiO$_x$/PET | A | 1108 | 37 | <0.1 |
| Example B35 | (Z)/(Y)/PET | A | — | | |
| Example B36 | (Z)/(Y)/PET | A | — | | |
| Example B37 | (Z)/(Y)/PET | A | — | | |
| Example B38 | (Z)/(Y)/PET | A | — | | |
| Example B39 | (Z)/(Y)/PET | A | 1108 | 37 | <0.1 |
| Example B40 | (Z)/(Y)/PET | A | 1108 | 37 | <0.1 |
| Example B41 | (Y)/(Z)/PET | A | 1114 | 48 | <0.1 |
| Example B42 | (Y)/(Z)/PET | A | 1114 | 48 | <0.1 |
| Comp. Example B1 | (Y)/PET | A | 1108 | 37 | <0.1 |
| Comp. Example B2 | (Y)/PET | A | 1111 | 60 | <0.1 |
| Comp. Example B3 | (Y)/PET | A | 1108 | 44 | <0.1 |
| Comp. Example B4 | (Y)/PET | A | 1107 | 35 | <0.1 |
| Comp. Example B5 | (Y)/PET | A | 1122 | 140 | 0.29 |
| Comp. Example B6 | (Y)/PET | A | 1102 | 43 | <0.1 |
| Comp. Example B7 | (Y)/PET | A | 1113 | 30 | <0.1 |
| Comp. Example B8 | (Y)/PET/(Y) | A | 1114 | 48 | <0.1 |
| Comp. Example B9 | (Y)/ONY | A | 1109 | 40 | <0.1 |
| Comp. Example B10 | (Y)/AlO$_x$/PET | A | 1108 | 37 | <0.1 |
| Comp. Example B11 | (Y)/SiO$_x$/PET | A | 1108 | 37 | <0.1 |
| Comp. Example B12 | (Y)/PET | A | — | | |
| Comp. Example B13 | (Y)/PET | A | — | | |
| Comp. Example B14 | (Z)/(Y')/PET | A | — | | |
| Comp. Example B15 | (Z)/(Y')/PET | A | — | | |
| Comp. Example B16 | (Z)/PET | A | — | | |
| Comp. Example B17 | (Z)/PET | A | — | | |
| Comp. Example B18 | (Y)/PET/(Z) | A | 1108 | 37 | <0.1 |
| Comp. Example B19 | (Y)/PET/(Z) | A | 1108 | 37 | <0.1 |
| Comp. Example B20 | (Y')/PET | A | — | | |
| Comp. Example B21 | PET | A | — | | |

TABLE B3

Vertical Form Fill Seal Bag

| | Oxygen transmission rate (ml/m$^2$ · day · atm) | | | | Appearance after retort treatment |
|---|---|---|---|---|---|
| | After bag making (Before retort treatment) | | After retort treatment | After retort treatment + transportation test | |
| | Before stretching | After stretching | 120° C., 30 minutes | | |
| Example B1 | 0.21 | 0.25 | 0.27 | 0.32 | A |
| Example B2 | 0.20 | 0.24 | 0.25 | 0.34 | A |
| Example B3 | 0.22 | 0.54 | 0.23 | 0.27 | A |
| Example B4 | 0.21 | 0.45 | 0.20 | 0.23 | A |
| Example B5 | 0.23 | 0.91 | 0.21 | 0.24 | A |
| Example B6 | 0.22 | 0.78 | 0.20 | 0.26 | A |
| Example B7 | 0.31 | 1.2 | 0.36 | 0.42 | A |
| Example B8 | 0.28 | 1.2 | 0.31 | 0.39 | A |
| Example B9 | 0.32 | 1.8 | 0.34 | 0.40 | A |
| Example B10 | 0.38 | 2.5 | — | — | — |
| Example B11 | 0.28 | 1.9 | 0.29 | 0.36 | A |
| Example B12 | 0.35 | 2.4 | — | — | — |
| Example B13 | 0.67 | 0.85 | — | — | — |
| Example B14 | 0.63 | 0.82 | — | — | — |
| Example B15 | 0.33 | 0.56 | 0.38 | 0.54 | A |
| Example B16 | 0.32 | 0.57 | 0.33 | 0.45 | A |
| Example B17 | 0.20 | 0.24 | 0.22 | 0.25 | A |
| Example B18 | 0.19 | 0.23 | 0.20 | 0.22 | A |
| Example B19 | 1.2 | 1.5 | — | — | — |
| Example B20 | 1.2 | 1.5 | — | — | — |
| Example B21 | 0.22 | 0.36 | 0.28 | 0.35 | A |
| Example B22 | 0.23 | 0.34 | 0.30 | 0.34 | A |
| Example B23 | 0.81 | 1.4 | — | — | — |
| Example B24 | 0.83 | 1.4 | — | — | — |
| Example B25 | 0.28 | 0.29 | 0.31 | 0.36 | B |
| Example B26 | 0.27 | 0.30 | 0.30 | 0.35 | B |
| Example B27 | 0.08 | 0.12 | 0.10 | 0.15 | A |
| Example B28 | 0.07 | 0.11 | 0.08 | 0.11 | A |
| Example B29 | 0.28 | 0.56 | 0.34 | 0.35 | A |
| Example B30 | 0.26 | 0.53 | 0.30 | 0.32 | A |
| Example B31 | 0.12 | 0.17 | 0.16 | 0.19 | A |
| Example B32 | 0.12 | 0.15 | 0.15 | 0.20 | A |
| Example B33 | 0.15 | 0.20 | 0.18 | 0.22 | A |
| Example B34 | 0.11 | 0.14 | 0.13 | 0.15 | A |
| Example B35 | 2.0 | 3.8 | — | — | — |
| Example B36 | 1.9 | 3.6 | — | — | — |
| Example B37 | 0.92 | 2.3 | — | — | — |
| Example B38 | 0.88 | 2.4 | — | — | — |
| Example B39 | 0.21 | 0.25 | — | — | — |

TABLE B3-continued

Vertical Form Fill Seal Bag

| | Oxygen transmission rate (ml/m² · day · atm) | | | | |
|---|---|---|---|---|---|
| | After bag making (Before retort treatment) | | After retort treatment | After retort treatment + transportation test | Appearance after retort treatment |
| | Before stretching | After stretching | 120° C., 30 minutes | | |
| Example B40 | 0.22 | 0.27 | — | — | — |
| Example B41 | 0.33 | 0.99 | — | — | — |
| Example B42 | 0.34 | 0.98 | — | — | — |
| Comp. Example B1 | 0.26 | 6.1 | 0.34 | 1.1 | A |
| Comp. Example B2 | 0.69 | 7.3 | — | — | — |
| Comp. Example B3 | 0.36 | 6.8 | 0.42 | 1.3 | A |
| Comp. Example B4 | 0.22 | 5.5 | 0.27 | 0.83 | A |
| Comp. Example B5 | 1.3 | 8.9 | — | — | — |
| Comp. Example B6 | 0.27 | 6.3 | 0.32 | 1.2 | A |
| Comp. Example B7 | 0.88 | 8.0 | — | — | — |
| Comp. Example B8 | 0.12 | 4.4 | 0.16 | 0.85 | A |
| Comp. Example B9 | 0.31 | 7.8 | 0.39 | 1.7 | A |
| Comp. Example B10 | 0.14 | 4.8 | 0.21 | 0.81 | A |
| Comp. Example B11 | 0.17 | 5.0 | 0.24 | 0.75 | A |
| Comp. Example B12 | 2.0 | 13.8 | — | — | — |
| Comp. Example B13 | 1.0 | 9.7 | — | — | — |
| Comp. Example B14 | 1.2 | 6.8 | — | — | — |
| Comp. Example B15 | 1.2 | 6.6 | — | — | — |
| Comp. Example B16 | >50 | >50 | — | — | — |
| Comp. Example B17 | >50 | >50 | — | — | — |
| Comp. Example B18 | 0.25 | 6.1 | 0.34 | 1.2 | A |
| Comp. Example B19 | 0.27 | 6.1 | 0.34 | 1.1 | A |
| Comp. Example B20 | 1.3 | 6.9 | 2.0 | 3.8 | A |
| Comp. Example B21 | >50 | >50 | >50 | >50 | A |

TABLE B4

Vacuum Packaging Bag

| | Oxygen transmission rate (ml/m² · day · atm) | | | | |
|---|---|---|---|---|---|
| | After bag making (Before retort treatment) | | After retort treatment | After retort treatment + transportation test | Appearance after retort treatment |
| | Before stretching | After stretching | 120° C., 30 minutes | | |
| Example B1 | 0.25 | 0.27 | 0.29 | 0.35 | A |
| Example B2 | 0.24 | 0.27 | 0.28 | 0.37 | A |
| Example B3 | 0.26 | 0.54 | 0.26 | 0.30 | A |
| Example B4 | 0.24 | 0.45 | 0.24 | 0.25 | A |
| Example B5 | 0.27 | 0.91 | 0.28 | 0.29 | A |
| Example B6 | 0.26 | 0.78 | 0.27 | 0.29 | A |
| Example B7 | 0.37 | 1.2 | 0.43 | 0.46 | A |
| Example B8 | 0.34 | 1.2 | 0.34 | 0.43 | A |
| Example B9 | 0.38 | 1.8 | 0.38 | 0.44 | A |
| Example B10 | 0.44 | 2.5 | 0.44 | 0.53 | A |
| Example B11 | 0.33 | 1.9 | 0.33 | 0.40 | A |
| Example B12 | 0.41 | 2.4 | 0.45 | 0.54 | A |
| Example B13 | 0.79 | 0.85 | — | — | — |
| Example B14 | 0.75 | 0.82 | — | — | — |
| Example B15 | 0.39 | 0.56 | 0.42 | 0.59 | A |
| Example B16 | 0.37 | 0.57 | 0.38 | 0.50 | A |
| Example B17 | 0.23 | 0.24 | 0.24 | 0.28 | A |
| Example B18 | 0.22 | 0.23 | 0.22 | 0.24 | A |
| Example B19 | 1.4 | 1.5 | — | — | — |
| Example B20 | 1.4 | 1.5 | — | — | — |
| Example B21 | 0.26 | 0.36 | 0.31 | 0.39 | A |
| Example B22 | 0.25 | 0.34 | 0.33 | 0.37 | A |
| Example B23 | 0.97 | 1.4 | — | — | — |
| Example B24 | 1.0 | 1.4 | — | — | — |
| Example B25 | 0.34 | 0.29 | 0.37 | 0.40 | B |
| Example B26 | 0.32 | 0.30 | 0.33 | 0.39 | B |
| Example B27 | 0.10 | 0.12 | 0.11 | 0.17 | A |
| Example B28 | 0.09 | 0.11 | 0.10 | 0.12 | A |
| Example B29 | 0.33 | 0.56 | 0.37 | 0.39 | A |
| Example B30 | 0.31 | 0.53 | 0.33 | 0.35 | A |
| Example B31 | 0.14 | 0.17 | 0.19 | 0.21 | A |
| Example B32 | 0.13 | 0.15 | 0.17 | 0.22 | A |
| Example B33 | 0.18 | 0.20 | 0.20 | 0.24 | A |
| Example B34 | 0.12 | 0.14 | 0.14 | 0.17 | A |
| Example B35 | 2.4 | 3.8 | — | — | — |
| Example B36 | 2.3 | 3.6 | — | — | — |
| Example B37 | 1.1 | 2.3 | — | — | — |
| Example B38 | 1.1 | 2.4 | — | — | — |
| Example B39 | 0.25 | 0.25 | — | — | — |
| Example B40 | 0.26 | 0.27 | — | — | — |
| Example B41 | 0.40 | 0.99 | — | — | — |
| Example B42 | 0.41 | 0.98 | — | — | — |
| Comp. Example B1 | 0.21 | 6.1 | 0.84 | 1.4 | A |
| Comp. Example B2 | 0.65 | 7.3 | — | — | — |
| Comp. Example B3 | 0.32 | 6.8 | 1.0 | 1.7 | A |
| Comp. Example B4 | 0.20 | 5.5 | 0.66 | 1.1 | A |
| Comp. Example B5 | 1.2 | 8.9 | — | — | — |
| Comp. Example B6 | 0.23 | 6.3 | 0.92 | 1.6 | A |
| Comp. Example B7 | 0.83 | 8.0 | — | — | — |
| Comp. Example B8 | 0.10 | 4.4 | 0.48 | 1.1 | A |
| Comp. Example B9 | 0.28 | 7.8 | 1.6 | 2.2 | A |
| Comp. Example B10 | 0.12 | 4.8 | 0.50 | 1.1 | A |
| Comp. Example B11 | 0.15 | 5.0 | 0.55 | 1.0 | A |
| Comp. Example B12 | 1.9 | 13.8 | — | — | — |
| Comp. Example B13 | 0.9 | 9.7 | — | — | — |
| Comp. Example B14 | 1.2 | 6.8 | — | — | — |
| Comp. Example B15 | 1.1 | 6.6 | — | — | — |
| Comp. Example B16 | >50 | >50 | — | — | — |
| Comp. Example B17 | >50 | >50 | — | — | — |

TABLE B4-continued

Vacuum Packaging Bag

Oxygen transmission rate (ml/m$^2$ · day · atm)

| | After bag making (Before retort treatment) | | After retort treatment | After retort treatment + transportation test | Appearance after retort treatment |
|---|---|---|---|---|---|
| | Before stretching | After stretching | 120° C., 30 minutes | | |
| Comp. Example B18 | 0.22 | 6.1 | 0.88 | 1.6 | A |
| Comp. Example B19 | 0.23 | 6.1 | 0.85 | 1.4 | A |
| Comp. Example B20 | 1.7 | 6.9 | 2.5 | 4.9 | A |
| Comp. Example B21 | >50 | >50 | >50 | >50 | A |

TABLE B5

Laminated Tube Container

Oxygen transmission rate (ml/m$^2$ · day · atm)

| | After tube formation (Before retort treatment) | | After retort treatment | After retort treatment + squeeze test | Appearance after retort treatment |
|---|---|---|---|---|---|
| | Before stretching | After stretching | 120° C., 30 minutes | | |
| Example B1 | 0.18 | 0.25 | 0.22 | 0.34 | A |
| Example B2 | 0.17 | 0.24 | 0.20 | 0.36 | A |
| Example B3 | 0.19 | 0.54 | 0.19 | 0.28 | A |
| Example B4 | 0.18 | 0.45 | 0.18 | 0.24 | A |
| Example B5 | 0.20 | 0.91 | 0.19 | 0.25 | A |
| Example B6 | 0.19 | 0.78 | 0.18 | 0.27 | A |
| Example B7 | 0.26 | 1.2 | 0.29 | 0.44 | A |
| Example B8 | 0.24 | 1.2 | 0.25 | 0.41 | A |
| Example B9 | 0.27 | 1.8 | 0.27 | 0.42 | A |
| Example B10 | 0.32 | 2.5 | 0.32 | 0.50 | A |
| Example B11 | 0.24 | 1.9 | 0.24 | 0.38 | A |
| Example B12 | 0.30 | 2.4 | 0.33 | 0.51 | A |
| Example B13 | 0.57 | 0.85 | — | — | — |
| Example B14 | 0.54 | 0.82 | — | — | — |
| Example B15 | 0.28 | 0.56 | 0.30 | 0.57 | A |
| Example B16 | 0.27 | 0.57 | 0.27 | 0.47 | A |
| Example B17 | 0.17 | 0.24 | 0.18 | 0.26 | A |
| Example B18 | 0.16 | 0.23 | 0.16 | 0.23 | A |
| Example B19 | 1.0 | 1.5 | — | — | — |
| Example B20 | 1.0 | 1.5 | — | — | — |
| Example B21 | 0.19 | 0.36 | 0.22 | 0.37 | A |
| Example B22 | 0.20 | 0.34 | 0.24 | 0.36 | A |
| Example B23 | 0.69 | 1.4 | — | — | — |
| Example B24 | 0.71 | 1.4 | — | — | — |
| Example B25 | 0.24 | 0.29 | 0.25 | 0.38 | B |
| Example B26 | 0.23 | 0.30 | 0.24 | 0.37 | B |
| Example B27 | 0.07 | 0.12 | 0.08 | 0.16 | A |
| Example B28 | 0.06 | 0.11 | 0.06 | 0.12 | A |
| Example B29 | 0.24 | 0.56 | 0.27 | 0.37 | A |
| Example B30 | 0.22 | 0.53 | 0.24 | 0.34 | A |
| Example B31 | 0.10 | 0.17 | 0.13 | 0.20 | A |
| Example B32 | 0.11 | 0.15 | 0.12 | 0.21 | A |
| Example B33 | 0.13 | 0.20 | 0.14 | 0.23 | A |
| Example B34 | 0.09 | 0.14 | 0.10 | 0.16 | A |
| Example B35 | 1.7 | 3.8 | — | — | — |
| Example B36 | 1.6 | 3.6 | — | — | — |
| Example B37 | 0.78 | 2.3 | — | — | — |
| Example B38 | 0.75 | 2.4 | — | — | — |
| Example B39 | 0.18 | 0.25 | — | — | — |
| Example B40 | 0.19 | 0.27 | — | — | — |
| Example B41 | 0.28 | 0.99 | — | — | — |
| Example B42 | 0.29 | 0.98 | — | — | — |
| Comp. Example B1 | 0.21 | 6.1 | 0.30 | 1.2 | A |
| Comp. Example B2 | 0.65 | 7.3 | — | — | — |
| Comp. Example B3 | 0.32 | 6.8 | 0.35 | 1.4 | A |
| Comp. Example B4 | 0.20 | 5.5 | 0.24 | 0.87 | A |
| Comp. Example B5 | 1.2 | 8.9 | — | — | — |
| Comp. Example B6 | 0.23 | 6.3 | 0.27 | 1.3 | A |
| Comp. Example B7 | 0.83 | 8.0 | — | — | — |
| Comp. Example B8 | 0.10 | 4.4 | 0.13 | 0.89 | A |
| Comp. Example B9 | 0.28 | 7.8 | 0.35 | 1.8 | A |
| Comp. Example B10 | 0.12 | 4.8 | 0.17 | 0.85 | A |
| Comp. Example B11 | 0.15 | 5.0 | 0.20 | 0.79 | A |
| Comp. Example B12 | 1.9 | 13.8 | — | — | — |
| Comp. Example B13 | 0.9 | 9.7 | — | — | — |
| Comp. Example B14 | 1.2 | 6.8 | — | — | — |
| Comp. Example B15 | 1.1 | 6.6 | — | — | — |
| Comp. Example B16 | >50 | >50 | — | — | — |
| Comp. Example B17 | >50 | >50 | — | — | — |
| Comp. Example B18 | 0.22 | 6.1 | 0.32 | 1.3 | A |
| Comp. Example B19 | 0.23 | 6.1 | 0.30 | 1.2 | A |
| Comp. Example B20 | 1.3 | 6.9 | 1.9 | 4.0 | A |
| Comp. Example B21 | >50 | >50 | >50 | >50 | A |

TABLE B6

Spouted Pouch

Oxygen transmission rate (ml/m$^2$ · day · atm)

| | Before retort treatment (Before stretching) | Before retort treatment (After stretching) | After retort treatment 120° C., 30 minutes | After retort treatment + bending test | Appearance after retort treatment |
|---|---|---|---|---|---|
| Example B1 | 0.19 | 0.25 | 0.24 | 0.29 | A |
| Example B2 | 0.18 | 0.24 | 0.23 | 0.31 | A |
| Example B3 | 0.20 | 0.54 | 0.21 | 0.24 | A |
| Example B4 | 0.19 | 0.45 | 0.18 | 0.21 | A |
| Example B5 | 0.21 | 0.91 | 0.21 | 0.22 | A |
| Example B6 | 0.20 | 0.78 | 0.19 | 0.23 | A |
| Example B7 | 0.28 | 1.2 | 0.32 | 0.38 | A |
| Example B8 | 0.25 | 1.2 | 0.28 | 0.31 | A |
| Example B9 | 0.29 | 1.8 | 0.31 | 0.36 | A |

TABLE B6-continued

Spouted Pouch

| | Oxygen transmission rate (ml/m² · day · atm) | | | | Appearance after retort treatment |
|---|---|---|---|---|---|
| | Before retort treatment (Before stretching) | Before retort treatment (After stretching) | After retort treatment 120° C., 30 minutes | After retort treatment + bending test | |
| Example B10 | 0.34 | 2.5 | — | — | — |
| Example B11 | 0.25 | 1.9 | 0.26 | 0.32 | A |
| Example B12 | 0.32 | 2.4 | — | — | — |
| Example B13 | 0.60 | 0.85 | — | — | — |
| Example B14 | 0.57 | 0.82 | — | — | — |
| Example B15 | 0.30 | 0.56 | 0.34 | 0.49 | A |
| Example B16 | 0.29 | 0.57 | 0.30 | 0.41 | A |
| Example B17 | 0.18 | 0.24 | 0.20 | 0.23 | A |
| Example B18 | 0.17 | 0.23 | 0.18 | 0.20 | A |
| Example B19 | 1.1 | 1.5 | — | — | — |
| Example B20 | 1.1 | 1.5 | — | — | — |
| Example B21 | 0.20 | 0.36 | 0.25 | 0.32 | A |
| Example B22 | 0.21 | 0.34 | 0.27 | 0.31 | A |
| Example B23 | 0.73 | 1.4 | — | — | — |
| Example B24 | 0.75 | 1.4 | — | — | — |
| Example B25 | 0.25 | 0.29 | 0.28 | 0.32 | B |
| Example B26 | 0.24 | 0.30 | 0.27 | 0.32 | B |
| Example B27 | 0.07 | 0.12 | 0.09 | 0.14 | A |
| Example B28 | 0.06 | 0.11 | 0.07 | 0.10 | A |
| Example B29 | 0.25 | 0.56 | 0.31 | 0.32 | A |
| Example B30 | 0.23 | 0.53 | 0.27 | 0.29 | A |
| Example B31 | 0.11 | 0.17 | 0.14 | 0.17 | A |
| Example B32 | 0.11 | 0.15 | 0.14 | 0.18 | A |
| Example B33 | 0.14 | 0.20 | 0.16 | 0.20 | A |
| Example B34 | 0.10 | 0.14 | 0.12 | 0.14 | A |
| Example B35 | 1.8 | 3.8 | — | — | — |
| Example B36 | 1.7 | 3.6 | — | — | — |
| Example B37 | 0.83 | 2.3 | — | — | — |
| Example B38 | 0.79 | 2.4 | — | — | — |
| Example B39 | 0.19 | 0.25 | — | — | — |
| Example B40 | 0.20 | 0.27 | — | — | — |
| Example B41 | 0.30 | 0.99 | — | — | — |
| Example B42 | 0.31 | 0.98 | — | — | — |
| Comp. Example B1 | 0.21 | 6.1 | 0.30 | 1.0 | A |
| Comp. Example B2 | 0.65 | 7.3 | — | — | — |
| Comp. Example B3 | 0.32 | 6.8 | 0.35 | 1.2 | A |
| Comp. Example B4 | 0.20 | 5.5 | 0.24 | 0.79 | A |
| Comp. Example B5 | 1.2 | 8.9 | — | — | — |
| Comp. Example B6 | 0.23 | 6.3 | 0.27 | 1.1 | A |
| Comp. Example B7 | 0.83 | 8.0 | — | — | — |
| Comp. Example B8 | 0.10 | 4.4 | 0.13 | 0.81 | A |
| Comp. Example B9 | 0.28 | 7.8 | 0.35 | 1.6 | A |
| Comp. Example B10 | 0.12 | 4.8 | 0.17 | 0.77 | A |
| Comp. Example B11 | 0.15 | 5.0 | 0.20 | 0.71 | A |
| Comp. Example B12 | 1.9 | 13.8 | — | — | — |
| Comp. Example B13 | 0.9 | 9.7 | — | — | — |
| Comp. Example B14 | 1.2 | 6.8 | — | — | — |
| Comp. Example B15 | 1.1 | 6.6 | — | — | — |
| Comp. Example B16 | >50 | >50 | — | — | — |
| Comp. Example B17 | >50 | >50 | — | — | — |
| Comp. Example B18 | 0.22 | 6.1 | 0.32 | 1.1 | A |
| Comp. Example B19 | 0.23 | 6.1 | 0.30 | 1.0 | A |
| Comp. Example B20 | 1.3 | 6.9 | 1.9 | 3.6 | A |
| Comp. Example B21 | >50 | >50 | >50 | >50 | A |

TABLE B7

Flat Pouch

| | Oxygen transmission rate (ml/m² · day · atm) | | | Appearance after retort treatment |
|---|---|---|---|---|
| | Before retort treatment (Before stretching) | After retort treatment 120° C., 30 minutes | After retort treatment + bending test | |
| Example B1 | 0.19 | 0.23 | 0.26 | A |
| Example B2 | 0.18 | 0.21 | 0.27 | A |
| Example B3 | 0.20 | 0.19 | 0.22 | A |
| Example B4 | 0.19 | 0.20 | 0.21 | A |
| Example B5 | 0.21 | 0.18 | 0.19 | A |
| Example B6 | 0.20 | 0.17 | 0.21 | A |
| Example B7 | 0.28 | 0.31 | 0.34 | A |
| Example B8 | 0.25 | 0.26 | 0.31 | A |
| Example B9 | 0.29 | 0.29 | 0.32 | A |
| Example B10 | 0.34 | — | — | — |
| Example B11 | 0.25 | 0.25 | 0.29 | A |
| Example B12 | 0.32 | — | — | — |
| Example B13 | 0.60 | — | — | — |
| Example B14 | 0.57 | — | — | — |
| Example B15 | 0.30 | 0.32 | 0.43 | A |
| Example B16 | 0.29 | 0.28 | 0.36 | A |
| Example B17 | 0.18 | 0.19 | 0.20 | A |
| Example B18 | 0.17 | 0.17 | 0.18 | A |
| Example B19 | 1.1 | — | — | — |
| Example B20 | 1.1 | — | — | — |
| Example B21 | 0.20 | 0.24 | 0.28 | A |
| Example B22 | 0.21 | 0.26 | 0.27 | A |
| Example B23 | 0.73 | — | — | — |
| Example B24 | 0.75 | — | — | — |
| Example B25 | 0.25 | 0.26 | 0.29 | B |
| Example B26 | 0.24 | 0.26 | 0.28 | B |
| Example B27 | 0.07 | 0.09 | 0.12 | A |
| Example B28 | 0.06 | 0.07 | 0.09 | A |
| Example B29 | 0.25 | 0.29 | 0.30 | A |
| Example B30 | 0.23 | 0.26 | 0.28 | A |
| Example B31 | 0.11 | 0.14 | 0.15 | A |
| Example B32 | 0.11 | 0.13 | 0.16 | A |
| Example B33 | 0.14 | 0.15 | 0.18 | A |
| Example B34 | 0.10 | 0.11 | 0.12 | A |
| Example B35 | 1.8 | — | — | — |
| Example B36 | 1.7 | — | — | — |
| Example B37 | 0.83 | — | — | — |
| Example B38 | 0.79 | — | — | — |
| Example B39 | 0.19 | — | — | — |
| Example B40 | 0.20 | — | — | — |
| Example B41 | 0.30 | — | — | — |
| Example B42 | 0.31 | — | — | — |

TABLE B7-continued

Flat Pouch

| | Oxygen transmission rate (ml/m$^2$ · day · atm) | | | Appearance after retort treatment |
|---|---|---|---|---|
| | Before retort treatment (Before stretching) | After retort treatment 120° C., 30 minutes | After retort treatment + bending test | |
| Comp. Example B1 | 0.21 | 0.30 | 0.99 | A |
| Comp. Example B2 | 0.65 | — | — | — |
| Comp. Example B3 | 0.32 | 0.35 | 1.2 | A |
| Comp. Example B4 | 0.20 | 0.24 | 0.75 | A |
| Comp. Example B5 | 1.2 | — | — | — |
| Comp. Example B6 | 0.23 | 0.27 | 1.1 | A |
| Comp. Example B7 | 0.83 | — | — | — |
| Comp. Example B8 | 0.10 | 0.13 | 0.77 | A |
| Comp. Example B9 | 0.28 | 0.35 | 1.5 | A |
| Comp. Example B10 | 0.12 | 0.17 | 0.73 | A |
| Comp. Example B11 | 0.15 | 0.20 | 0.68 | A |
| Comp. Example B12 | 1.9 | — | — | — |
| Comp. Example B13 | 0.9 | — | — | — |
| Comp. Example B14 | 1.2 | — | — | — |
| Comp. Example B15 | 1.1 | — | — | — |
| Comp. Example B16 | >50 | — | — | — |
| Comp. Example B17 | >50 | — | — | — |
| Comp. Example B18 | 0.22 | 0.32 | 1.1 | A |
| Comp. Example B19 | 0.23 | 0.30 | 1.0 | A |
| Comp. Example B20 | 1.3 | 1.9 | 3.4 | A |
| Comp. Example B21 | >50 | >50 | >50 | A |

TABLE B8

Gusseted Pouch

| | Oxygen transmission rate (ml/m$^2$ · day · atm) | | | Appearance after retort treatment |
|---|---|---|---|---|
| | Before retort treatment (Before stretching) | After retort treatment 120° C., 30 minutes | After retort treatment + bending test | |
| Example B1 | 0.20 | 0.26 | 0.30 | A |
| Example B2 | 0.18 | 0.24 | 0.32 | A |
| Example B3 | 0.21 | 0.22 | 0.26 | A |
| Example B4 | 0.20 | 0.21 | 0.22 | A |
| Example B5 | 0.22 | 0.21 | 0.23 | A |
| Example B6 | 0.21 | 0.20 | 0.25 | A |
| Example B7 | 0.29 | 0.34 | 0.40 | A |
| Example B8 | 0.27 | 0.29 | 0.37 | A |
| Example B9 | 0.30 | 0.32 | 0.38 | A |
| Example B10 | 0.36 | — | — | — |
| Example B11 | 0.27 | 0.28 | 0.34 | A |
| Example B12 | 0.33 | — | — | — |
| Example B13 | 0.64 | — | — | — |
| Example B14 | 0.60 | — | — | — |
| Example B15 | 0.31 | 0.36 | 0.51 | A |
| Example B16 | 0.30 | 0.31 | 0.43 | A |
| Example B17 | 0.19 | 0.21 | 0.24 | A |
| Example B18 | 0.18 | 0.19 | 0.21 | A |
| Example B19 | 1.1 | — | — | — |
| Example B20 | 1.1 | — | — | — |
| Example B21 | 0.21 | 0.27 | 0.33 | A |
| Example B22 | 0.22 | 0.29 | 0.32 | A |
| Example B23 | 0.77 | — | — | — |
| Example B24 | 0.79 | — | — | — |
| Example B25 | 0.27 | 0.29 | 0.34 | B |
| Example B26 | 0.26 | 0.29 | 0.33 | B |
| Example B27 | 0.08 | 0.10 | 0.14 | A |
| Example B28 | 0.07 | 0.08 | 0.10 | A |
| Example B29 | 0.27 | 0.32 | 0.33 | A |
| Example B30 | 0.25 | 0.29 | 0.30 | A |
| Example B31 | 0.11 | 0.15 | 0.18 | A |
| Example B32 | 0.11 | 0.14 | 0.19 | A |
| Example B33 | 0.14 | 0.17 | 0.21 | A |
| Example B34 | 0.10 | 0.12 | 0.14 | A |
| Example B35 | 1.9 | — | — | — |
| Example B36 | 1.8 | — | — | — |
| Example B37 | 0.87 | — | — | — |
| Example B38 | 0.84 | — | — | — |
| Example B39 | 0.20 | — | — | — |
| Example B40 | 0.21 | — | — | — |
| Example B41 | 0.31 | — | — | — |
| Example B42 | 0.32 | — | — | — |
| Comp. Example B1 | 0.26 | 0.34 | 1.2 | A |
| Comp. Example B2 | 0.69 | — | — | — |
| Comp. Example B3 | 0.36 | 0.42 | 1.3 | A |
| Comp. Example B4 | 0.22 | 0.27 | 0.80 | A |
| Comp. Example B5 | 1.3 | — | — | — |
| Comp. Example B6 | 0.27 | 0.32 | 1.1 | A |
| Comp. Example B7 | 0.88 | — | — | — |
| Comp. Example B8 | 0.12 | 0.16 | 0.85 | A |
| Comp. Example B9 | 0.31 | 0.39 | 1.8 | A |
| Comp. Example B10 | 0.14 | 0.21 | 0.83 | A |
| Comp. Example B11 | 0.17 | 0.24 | 0.73 | A |
| Comp. Example B12 | 2.0 | — | — | — |
| Comp. Example B13 | 1.0 | — | — | — |
| Comp. Example B14 | 1.2 | — | — | — |
| Comp. Example B15 | 1.2 | — | — | — |
| Comp. Example B16 | >50 | — | — | — |
| Comp. Example B17 | >50 | — | — | — |
| Comp. Example B18 | 0.25 | 0.34 | 1.3 | A |
| Comp. Example B19 | 0.27 | 0.34 | 1.1 | A |
| Comp. Example B20 | 1.3 | 2.0 | 3.7 | A |
| Comp. Example B21 | >50 | >50 | >50 | A |

TABLE B9

Infusion Bag

| | Oxygen transmission rate (ml/m$^2$ · day · atm) | | | | Appearance after retort treatment |
|---|---|---|---|---|---|
| | After bag making (Before retort treatment) | | After retort treatment | After retort treatment + bending test | |
| | Before stretching | After stretching | 120° C., 30 minutes | | |
| Example B1 | 0.19 | 0.25 | 0.24 | 0.31 | A |
| Example B2 | 0.18 | 0.24 | 0.23 | 0.33 | A |
| Example B3 | 0.20 | 0.54 | 0.21 | 0.26 | A |
| Example B4 | 0.19 | 0.45 | 0.18 | 0.22 | A |
| Example B5 | 0.21 | 0.91 | 0.21 | 0.23 | A |
| Example B6 | 0.20 | 0.78 | 0.19 | 0.25 | A |
| Example B7 | 0.28 | 1.2 | 0.32 | 0.41 | A |
| Example B8 | 0.25 | 1.2 | 0.28 | 0.38 | A |
| Example B9 | 0.29 | 1.8 | 0.31 | 0.39 | A |
| Example B10 | 0.34 | 2.5 | — | — | — |
| Example B11 | 0.25 | 1.9 | 0.26 | 0.35 | A |
| Example B12 | 0.32 | 2.4 | — | — | — |
| Example B13 | 0.60 | 0.85 | — | — | — |
| Example B14 | 0.57 | 0.82 | — | — | — |
| Example B15 | 0.30 | 0.56 | 0.34 | 0.53 | A |
| Example B16 | 0.29 | 0.57 | 0.30 | 0.44 | A |

TABLE B9-continued

Infusion Bag

| | Oxygen transmission rate (ml/m² · day · atm) | | | | Appearance after retort treatment |
|---|---|---|---|---|---|
| | After bag making (Before retort treatment) | | After retort treatment | After retort treatment + bending test | |
| | Before stretching | After stretching | 120° C., 30 minutes | | |
| Example B17 | 0.18 | 0.24 | 0.20 | 0.24 | A |
| Example B18 | 0.17 | 0.23 | 0.18 | 0.21 | A |
| Example B19 | 1.1 | 1.5 | — | — | — |
| Example B20 | 1.1 | 1.5 | — | — | — |
| Example B21 | 0.20 | 0.36 | 0.25 | 0.34 | A |
| Example B22 | 0.21 | 0.34 | 0.27 | 0.33 | A |
| Example B23 | 0.73 | 1.4 | — | — | — |
| Example B24 | 0.75 | 1.4 | — | — | — |
| Example B25 | 0.25 | 0.29 | 0.28 | 0.35 | B |
| Example B26 | 0.24 | 0.30 | 0.27 | 0.34 | B |
| Example B27 | 0.07 | 0.12 | 0.09 | 0.15 | A |
| Example B28 | 0.06 | 0.11 | 0.07 | 0.11 | A |
| Example B29 | 0.25 | 0.56 | 0.31 | 0.34 | A |
| Example B30 | 0.23 | 0.53 | 0.27 | 0.31 | A |
| Example B31 | 0.11 | 0.17 | 0.14 | 0.19 | A |
| Example B32 | 0.11 | 0.15 | 0.14 | 0.20 | A |
| Example B33 | 0.14 | 0.20 | 0.16 | 0.21 | A |
| Example B34 | 0.10 | 0.14 | 0.12 | 0.15 | A |
| Example B35 | 1.8 | 3.8 | — | — | — |
| Example B36 | 1.7 | 3.6 | — | — | — |
| Example B37 | 0.83 | 2.3 | — | — | — |
| Example B38 | 0.79 | 2.4 | — | — | — |
| Example B39 | 0.19 | 0.25 | — | — | — |
| Example B40 | 0.20 | 0.27 | — | — | — |
| Example B41 | 0.30 | 0.99 | — | — | — |
| Example B42 | 0.31 | 0.98 | — | — | — |
| Comp. Example B1 | 0.21 | 6.1 | 0.30 | 1.1 | A |
| Comp. Example B2 | 0.65 | 7.3 | — | — | — |
| Comp. Example B3 | 0.32 | 6.8 | 0.35 | 1.3 | A |
| Comp. Example B4 | 0.20 | 5.5 | 0.24 | 0.85 | A |
| Comp. Example B5 | 1.2 | 8.9 | — | — | — |
| Comp. Example B6 | 0.23 | 6.3 | 0.27 | 1.2 | A |
| Comp. Example B7 | 0.83 | 8.0 | — | — | — |
| Comp. Example B8 | 0.10 | 4.4 | 0.13 | 0.87 | A |
| Comp. Example B9 | 0.28 | 7.8 | 0.35 | 1.7 | A |
| Comp. Example B10 | 0.12 | 4.8 | 0.17 | 0.83 | A |
| Comp. Example B11 | 0.15 | 5.0 | 0.20 | 0.77 | A |
| Comp. Example B12 | 1.9 | 13.8 | — | — | — |
| Comp. Example B13 | 0.9 | 9.7 | — | — | — |
| Comp. Example B14 | 1.2 | 6.8 | — | — | — |
| Comp. Example B15 | 1.1 | 6.6 | — | — | — |
| Comp. Example B16 | >50 | >50 | — | — | — |
| Comp. Example B17 | >50 | >50 | — | — | — |
| Comp. Example B18 | 0.22 | 6.1 | 0.32 | 1.2 | A |
| Comp. Example B19 | 0.23 | 6.1 | 0.30 | 1.1 | A |
| Comp. Example B20 | 1.3 | 6.9 | 1.9 | 3.9 | A |
| Comp. Example B21 | >50 | >50 | >50 | >50 | A |

TABLE B10

Paper Container

| | Oxygen transmission rate (ml/m² · day · atm) | | | | Paper container 3 |
|---|---|---|---|---|---|
| | After formation of container (Before retort treatment) | | After retort treatment | | Appearance after retort treatment |
| | Paper container 1 Flat portion Before stretching | Paper container 1 Flat portion After stretching | Paper container 1 Flat portion | Paper container 1 Folded portion | |
| Example B1 | 0.20 | 0.25 | 0.23 | 0.25 | A |
| Example B2 | 0.20 | 0.24 | 0.21 | 0.23 | A |
| Example B3 | 0.20 | 0.54 | 0.20 | 0.21 | A |
| Example B4 | 0.20 | 0.45 | 0.17 | 0.19 | A |
| Example B5 | 0.21 | 0.91 | 0.18 | 0.19 | A |
| Example B6 | 0.20 | 0.78 | 0.17 | 0.19 | A |
| Example B7 | 0.20 | 1.2 | 0.31 | 0.33 | A |
| Example B8 | 0.20 | 1.2 | 0.26 | 0.29 | A |
| Example B9 | 0.20 | 1.8 | 0.29 | 0.31 | A |
| Example B10 | 0.20 | 2.5 | — | — | — |
| Example B11 | 0.20 | 1.9 | 0.25 | 0.27 | A |
| Example B12 | 0.20 | 2.4 | — | — | — |
| Example B13 | 0.58 | 0.85 | — | — | — |
| Example B14 | 0.58 | 0.82 | — | — | — |
| Example B15 | 0.28 | 0.56 | 0.32 | 0.35 | A |
| Example B16 | 0.28 | 0.57 | 0.28 | 0.31 | A |
| Example B17 | 0.19 | 0.24 | 0.19 | 0.20 | A |
| Example B18 | 0.19 | 0.23 | 0.17 | 0.19 | A |
| Example B19 | 0.96 | 1.5 | — | — | — |
| Example B20 | 0.96 | 1.5 | — | — | — |
| Example B21 | 0.22 | 0.36 | 0.24 | 0.26 | A |
| Example B22 | 0.22 | 0.34 | 0.26 | 0.28 | A |
| Example B23 | 0.77 | 1.4 | — | — | — |
| Example B24 | 0.77 | 1.4 | — | — | — |
| Example B25 | 0.25 | 0.29 | 0.26 | 0.29 | B |
| Example B26 | 0.25 | 0.30 | 0.26 | 0.28 | B |
| Example B27 | 0.06 | 0.12 | 0.09 | 0.09 | A |
| Example B28 | 0.06 | 0.11 | 0.07 | 0.07 | A |
| Example B29 | 0.24 | 0.56 | 0.29 | 0.31 | A |
| Example B30 | 0.24 | 0.53 | 0.26 | 0.28 | A |
| Example B31 | 0.11 | 0.17 | 0.14 | 0.15 | A |
| Example B32 | 0.12 | 0.15 | 0.13 | 0.14 | A |
| Example B33 | 0.14 | 0.20 | 0.15 | 0.17 | A |
| Example B34 | 0.10 | 0.14 | 0.11 | 0.12 | A |
| Example B35 | 1.8 | 3.8 | — | — | — |
| Example B36 | 1.8 | 3.6 | — | — | — |
| Example B37 | 0.81 | 2.3 | — | — | — |
| Example B38 | 0.81 | 2.4 | — | — | — |
| Example B39 | 0.21 | 0.25 | — | — | — |
| Example B40 | 0.21 | 0.27 | — | — | — |
| Example B41 | 0.31 | 0.99 | — | — | — |
| Example B42 | 0.31 | 0.98 | — | — | — |
| Comp. Example B1 | 0.22 | 6.1 | 0.30 | 0.68 | A |
| Comp. Example B2 | 0.60 | 7.3 | — | — | — |
| Comp. Example B3 | 0.30 | 6.8 | 0.35 | 0.82 | A |
| Comp. Example B4 | 0.20 | 5.5 | 0.24 | 0.54 | A |
| Comp. Example B5 | 0.99 | 8.9 | — | — | — |
| Comp. Example B6 | 0.23 | 6.3 | 0.27 | 0.75 | A |
| Comp. Example B7 | 0.80 | 8.0 | — | — | — |
| Comp. Example B8 | 0.09 | 4.4 | 0.13 | 0.39 | A |
| Comp. Example B9 | 0.27 | 7.8 | — | — | — |
| Comp. Example B10 | 0.12 | 4.8 | 0.17 | 0.41 | A |
| Comp. Example B11 | 0.17 | 5.0 | 0.20 | 0.45 | A |

TABLE B10-continued

Paper Container

Oxygen transmission rate (ml/m² · day · atm)

| | After formation of container (Before retort treatment) | | After retort treatment | | Paper container 3 Appearance after retort treatment |
|---|---|---|---|---|---|
| | Paper container 1 Flat portion Before stretching | Paper container 1 Flat portion After stretching | Paper container 1 Flat portion | Paper container 1 Folded portion | |
| Comp. Example B12 | 1.9 | 13.8 | — | — | — |
| Comp. Example B13 | 0.82 | 9.7 | — | — | — |
| Comp. Example B14 | 0.75 | 6.8 | — | — | — |
| Comp. Example B15 | 0.74 | 6.6 | — | — | — |
| Comp. Example B16 | >50 | >50 | — | — | — |
| Comp. Example B17 | >50 | >50 | — | — | — |
| Comp. Example B18 | 0.20 | 6.1 | 0.32 | 0.71 | A |
| Comp. Example B19 | 0.20 | 6.1 | 0.30 | 0.69 | A |
| Comp. Example B20 | — | 6.9 | 1.9 | 2.0 | A |
| Comp. Example B21 | — | >50 | >50 | >50 | A |

TABLE B11

Paper Container

Oxygen transmission rate (ml/m² · day · atm)
After retort treatment

| | Paper container 1 Flat portion | Paper container 1 Folded portion | Paper container 1 Bonding portion | Paper container 2 Bonding portion |
|---|---|---|---|---|
| Example B5 | 0.18 | 0.19 | 0.21 | 0.19 |
| Example B6 | 0.17 | 0.19 | 0.20 | 0.18 |

[Container Lid] (Example Set C)

Measurements and evaluations in examples and comparative examples of container lids were carried out by the methods described below.

(1) Infrared Absorption Spectrum of Layer (Y)

The measurement was performed in the same manner as in Example Set A.

(2) Appearance of Multilayer Structure and Container Lid

The appearances of the obtained multilayer structures, and the appearances after retort treatment of container lids fabricated using film materials including these multilayer structures, were evaluated by visual inspection according to the following ratings.

A: Very good appearance that was colorless, transparent, and uniform.

B: Good appearance, albeit slightly opaque or uneven.

C: The container lid suffered from delamination between the layers of the multilayer structure and was of no practical use, in addition to which the subsequent measurements were impossible.

(3) Method for Fabricating Container Lid and Lidded Container

A two-component adhesive (including A-520 (trade name) and A-50 (trade name) manufactured by Mitsui Chemicals, Inc)) was applied and dried on an obtained multilayer structure, which was laminated to a 15-μm-thick oriented polyamide film (EMBLEM ON-BC manufactured by UNITIKA LTD. and having a thickness of 15 μm; this film may be abbreviated as "OPA" hereinafter) to obtain a laminated body. Onto the OPA of the laminated body was subsequently applied the two-component adhesive, which was dried. Then, the laminated body and a non-oriented polypropylene film (RXC-21 (trade name) manufactured by Mitsui Chemicals Tohcello, Inc. and having a thickness of 70 μm; this film may be abbreviated as "CPP" hereinafter) were laminated together. Thus, a laminated body (film material) having a configuration of multilayer structure/adhesive layer/OPA layer/adhesive layer/CPP layer was obtained. The lamination of the multilayer structure was done in such a manner that the layer (Y) (the layer (Z) or layer (Y') for a multilayer structure having no layer (Y)) was located closer to the OPA than the base (X) was. A circular laminated piece of 100 mm diameter was cut out from the laminated body, and used as a container lid. Additionally, a cup (Hi-Retoflex HR 78-84 manufactured by Toyo Seikan Co., Ltd.) was prepared as a container body. The cup was one consisting of a three-layer laminate of olefin layer/steel layer/olefin layer and having the shape of a 30-mm-high flanged bottomed cylinder having an open top face with a diameter of 78 mm and having a 6.5-mm-wide flange portion formed at the periphery of the top face. This container body was almost fully filled with water, the container lid was attached to the container body in such a manner that the CPP layer was in contact with the flange portion, and the lid was heat-sealed. Thus, a container (lidded container) was obtained. It should be noted that the container body used above has been confirmed to have an oxygen transmission rate of substantially zero as measured by the method employed in the present examples.

(4) Retort Test

Each lidded container obtained was placed on a platform of a retort sterilizer (RCS-60-10 RSTXG-FAM manufactured by HISAKA WORKS, LTD.). Then, hot-water retort sterilization treatment including full immersion of the lidded container in hot water was carried out under the conditions below.

(a) Retort treatment temperature, time, and pressure: 120° C., 30 minutes, and 0.15 MPa (5) Transportation Test Ten lidded containers subjected to retort sterilization treatment under the above conditions (a) were put into a corrugated fiberboard box (15×35×45 cm). A gap between the lidded containers and the corrugated fiberboard box was filled with a buffer material. The corrugated fiberboard box holding the lidded containers was loaded onto a cargo truck, and a transportation test was carried out in which the truck was allowed to run back and forth ten times between Okayama and Tokyo.

(6) Oxygen Transmission Rate (Om) of Container Lid

Using each lidded container obtained, the oxygen transmission rate of the container lid was evaluated before and after the retort sterilization treatment and after the transportation test. The lidded containers subjected to retort treatment were left in a room temperature atmosphere (20° C. and 65% RH) for over 24 hours. First, a hole was made at the bottom of the container body (Hi-Retoflex HR78-84 manufactured by Toyo Seikan Co., Ltd.) to discharge water, and the lidded container was left in a room temperature atmosphere (20° C. and 65% RH) for over 48 hours.

Thereafter, a metal jig to which were connected two metal pipes for a carrier gas was set to the hole made in the container body, and the metal jig was fixed to the lidded container by means of an epoxy adhesive so as to prevent gas leakage through a gap between the metal jig and the container body. That end of one of the metal pipes for a carrier gas which was opposite to the end connected to the container was connected to an oxygen transmission testing system ("MOCON OX-TRAN 2/20" manufactured by ModernControls, Inc.). The lidded container to which the metal pipes were attached was enclosed by a bag fabricated through heat sealing of a laminated film having a configuration of polyester layer/adhesive layer/EVOH layer/PO layer, and the bag was fixed to the two metal pipes with a string. The gap between the bag and the metal pipes was filled with an epoxy resin to increase the airtightness. Next, a hole was made at a portion of the bag, a pipe for feeding nitrogen gas and oxygen gas was inserted into the hole. The airtightness was increased by means of an adhesive tape so as to prevent entry of outside air through the hole.

First, humidity-conditioned nitrogen gas as the carrier gas was allowed to flow into the bag through the pipe. A part of the gas having flowed into the bag permeated through the lid to move into the interior of the lidded container, another part permeated through the bag to move out of the bag, and another part leaked out of the bag through the two connection portions. Oxygen gas contained in the carrier gas was entrained by the carrier gas to the sensor section, by which the oxygen concentration was measured. The nitrogen gas was continuously fed until the oxygen concentration decreased to a constant value. The constant value of the oxygen concentration was set as a zero point for the oxygen transmission rate. After the oxygen concentration reached the constant value, the gas fed through the pipe inserted in the bag was changed from the humidity-conditioned nitrogen gas to humidity-conditioned oxygen gas, and thus oxygen was fed so as to flow outside the lidded container. The concentration of oxygen having permeated through the lid and been entrained by the carrier gas to the sensor section was measured. The oxygen transmission rate (in units of ml/(m$^2$·day·atm)) was measured under conditions where the temperature was 20° C., the humidity on the oxygen feed-side was 85% RH, the humidity on the carrier gas-side was 85% RH, the oxygen pressure was 1 atm, and the carrier gas pressure was 1 atm.

(7) Oxygen Transmission Rate (Of) of Film Material Kept Stretched by 5%

A square sample (the length of each side was 4.5 cm) was cut out from the lid of each lidded container obtained. The film material was left at 23° C. and 50% RH for over 24 hours, then, under these same conditions, was uniaxially stretched by 5%, and allowed to keep the stretched state for 5 minutes. Thus, a film material subjected to stretching was obtained. Next, the film material subjected to stretching was placed in a circular hole of 2.0 cm diameter made in a 10-cm-square aluminum foil (with a thickness of 30 μm), and the gap between the sample and the aluminum foil was closed with a two-component curable epoxy adhesive. The measurement sample thus obtained was set to an oxygen transmission testing system ("MOCON OX-TRAN 2/20" manufactured by ModernControls, Inc.)., and the oxygen transmission rate (in units of ml/(m$^2$·day·atm)) was measured under conditions where the temperature was 20° C., the oxygen pressure was 1 atm, and the carrier gas pressure was 1 atm. In this measurement, both the humidity on the oxygen feed-side and the humidity on the carrier gas-side were set to 85% RH. Nitrogen gas containing 2 vol % of hydrogen gas was used as the carrier gas.

[Production Examples of Coating Liquids (U) and (V)]

Coating liquids (U1) to (U4) and coating liquids (V1) to (V8) were obtained in the same manner as in Example Set A.

Examples and Comparative Examples

Examples C1 to C42 were carried out in the same manner as in Examples B1 to B42. Also, Comparative Examples C1 to C21 were carried out in the same manner as in Comparative Examples B1 to B21. That is, in Example Set C, the products of Examples and Comparative Examples subjected to measurements were fabricated in the same manner as in Examples and Comparative Examples of Example Set B which are denoted by the same corresponding numbers, except that the products fabricated were packaging lids and lidded containers.

The production conditions and evaluation results for Examples and Comparative Examples are shown in Tables C1 to C3 below. In the tables, "-" means "not used", "not calculable", "not carried out", "not measurable", or the like.

As is apparent from the tables, each of the container lids of Examples maintained good gas barrier properties even when subjected, after heat-sealing to the container lid, to a higher physical stress (5% stretching). By contrast, all of the container lids of Comparative Examples showed marked deterioration in gas barrier properties after subjected to a high physical stress (5% stretching). Some of the container lids of Examples were confirmed to maintain good gas barrier properties even when subjected to a physical stress applied during the transportation test performed after retort treatment.

TABLE C1

| | Layer Configuration | | | | | | | | | |
|---|---|---|---|---|---|---|---|---|---|---|
| | | Layer (Y) | | | | | | Layer (Z) | | |
| | | | | | | Heat treatment step | | | | |
| | Base (X) | Type | Thickness (μm) | Coating liquid | $N_M/N_P$ | Temperature (° C.) | Time (min) | Thickness (μm) | Coating liquid | Polymer (E) |
| Example C1 | PET | YA | 0.5 | U1 | 1.15 | 180 | 1 | 0.3 | V1 | PHM |
| Example C2 | | | | | | | | | V5 | VPA |
| Example C3 | PET | YA | 0.5 | U1 | 1.15 | 180 | 1 | 0.1 | V1 | PHM |
| Example C4 | | | | | | | | | V5 | VPA |
| Example C5 | PET | YA | 0.5 | U1 | 1.15 | 180 | 1 | 0.05 | V1 | PHM |
| Example C6 | | | | | | | | | V5 | VPA |
| Example C7 | PET | YA | 0.5 | U1 | 1.15 | 180 | 1 | 0.3 | V2 | PHP |
| Example C8 | | | | | | | | | V6 | VBPA |

TABLE C1-continued

| | | Layer (Y) | | | | Heat treatment step | | Layer (Z) | | |
|---|---|---|---|---|---|---|---|---|---|---|
| | Base (X) | Type | Thickness (μm) | Coating liquid | $N_M/N_P$ | Temperature (° C.) | Time (min) | Thickness (μm) | Coating liquid | Polymer (E) |
| Example C9 | PET | YA | 0.5 | U1 | 1.15 | 180 | 1 | 0.3 | V3 | PHM/AN (2/1) |
| Example C10 | | | | | | | | 0.3 | V4 | PHM/AN (1/1) |
| Example C11 | | | | | | | | | V7 | VPA/MA (2/1) |
| Example C12 | | | | | | | | | V8 | VPA/MA (1/1) |
| Example C13 | PET | YA | 0.5 | U1 | 1.15 | 120 | 5 | 0.3 | V1 | PHM |
| Example C14 | | | | | | | | | V5 | VPA |
| Example C15 | PET | YA | 0.5 | U1 | 1.15 | 150 | 3 | 0.3 | V1 | PHM |
| Example C16 | | | | | | | | | V5 | VPA |
| Example C17 | PET | YA | 0.5 | U1 | 1.15 | 200 | 1 | 0.3 | V1 | PHM |
| Example C18 | | | | | | | | | V5 | VPA |
| Example C19 | PET | YA | 0.5 | U2 | 4.48 | 180 | 1 | 0.3 | V1 | PHM |
| Example C20 | | | | | | | | | V5 | VPA |
| Example C21 | PET | YA | 0.5 | U3 | 1.92 | 180 | 1 | 0.3 | V1 | PHM |
| Example C22 | | | | | | | | | V5 | VPA |
| Example C23 | PET | YA | 0.5 | U4 | 0.82 | 180 | 1 | 0.3 | V1 | PHM |
| Example C24 | | | | | | | | | V5 | VPA |
| Example C25 | PET | YA | 0.5 | U1 | 1.15 | 180 | 1[*1] | 0.3 | V1 | PHM |
| Example C26 | | | | | | | | | V5 | VPA |
| Example C27 | PET | YA | 0.5 | U1 | 1.15 | 180 | 1 | 0.3 | V1 | PHM |
| Example C28 | | | | | | | | | V5 | VPA |
| Example C29 | ONY | YA | 0.5 | U1 | 1.15 | 180 | 1 | 0.3 | V1 | PHM |
| Example C30 | | | | | | | | | V5 | VPA |
| Example C31 | $AlO_x$ | YA | 0.5 | U1 | 1.15 | 180 | 1 | 0.3 | V1 | PHM |
| Example C32 | | | | | | | | | V5 | VPA |
| Example C33 | $SiO_x$ | YA | 0.5 | U1 | 1.15 | 180 | 1 | 0.3 | V1 | PHM |
| Example C34 | | | | | | | | | V5 | VPA |
| Example C35 | PET | YB | | Deposited layer of aluminum | | | | 0.3 | V1 | PHM |
| Example C36 | | | | | | | | 0.3 | V5 | VPA |
| Example C37 | PET | YC | | Deposited layer of aluminum oxide | | | | 0.3 | V1 | PHM |
| Example C38 | | | | | | | | 0.3 | V5 | VPA |
| Example C39 | PET | YA | 0.5 | U1 | 1.15 | 180 | 1 | 0.5 | V1 | PHM |
| Example C40 | | | | | | | | | V5 | VPA |
| Example C41 | PET | YA | 0.5 | U1 | 1.15 | 180 | 1 | 0.3 | V1 | PHM |
| Example C42 | | | | | | | | | V5 | VPA |
| Comp. Example C1 | PET | YA | 0.5 | U1 | 1.15 | 180 | 1 | — | — | — |
| Comp. Example C2 | PET | YA | 0.5 | U1 | 1.15 | 120 | 5 | — | — | — |
| Comp. Example C3 | PET | YA | 0.5 | U1 | 1.15 | 150 | 3 | — | — | — |
| Comp. Example C4 | PET | YA | 0.5 | U1 | 1.15 | 200 | 1 | — | — | — |
| Comp. Example C5 | PET | YA | 0.5 | U2 | 4.48 | 180 | 1 | — | — | — |
| Comp. Example C6 | PET | YA | 0.5 | U3 | 1.92 | 180 | 1 | — | — | — |
| Comp. Example C7 | PET | YA | 0.5 | U4 | 0.82 | 180 | 1 | — | — | — |
| Comp. Example C8 | PET | YA | 0.5 | U1 | 1.15 | 180 | 1 | — | — | — |
| Comp. Example C9 | ONY | YA | 0.5 | U1 | 1.15 | 180 | 1 | — | — | — |
| Comp. Example C10 | $AlO_x$ | YA | 0.5 | U1 | 1.15 | 180 | 1 | — | — | — |
| Comp. Example C11 | $SiO_x$ | YA | 0.5 | U1 | 1.15 | 180 | 1 | — | — | — |
| Comp. Example C12 | PET | YB | | Deposited layer of aluminum | | | | — | — | — |
| Comp. Example C13 | PET | YC | | Deposited layer of aluminum oxide | | | | — | — | — |
| Comp. Example C14 | PET | — | | Deposited layer of silicon oxide | | | | 0.3 | V1 | PHM |
| Comp. Example C15 | | | | | | | | 0.3 | V5 | VPA |
| Comp. Example C16 | PET | — | | — | | | | 0.3 | V1 | PHM |
| Comp. Example C17 | | | | | | | | 0.3 | V5 | VPA |
| Comp. Example C18 | PET | YA | 0.5 | U1 | 1.15 | 180 | 1 | 0.3 | V1 | PHM |
| Comp. Example C19 | | | | | | | | | V5 | VPA |
| Comp. Example C20 | PET | — | | Deposited layer of silicon oxide | | | | — | — | — |
| Comp. Example C21 | PET | — | | — | | | | — | — | — |

[*1]The heat treatment was carried out not after formation of the layer (Y) but after formation of the layer (Z).

TABLE C2

Multilayer Structure

| | Layer configuration | Appearance | n¹ (cm⁻¹) | Half width | $\alpha^2/\alpha^1$ |
|---|---|---|---|---|---|
| Example C1 | (Z)/(Y)/PET | A | 1108 | 37 | <0.1 |
| Example C2 | (Z)/(Y)/PET | A | 1108 | 37 | <0.1 |
| Example C3 | (Z)/(Y)/PET | A | 1108 | 37 | <0.1 |
| Example C4 | (Z)/(Y)/PET | A | 1108 | 37 | <0.1 |
| Example C5 | (Z)/(Y)/PET | A | 1108 | 37 | <0.1 |
| Example C6 | (Z)/(Y)/PET | A | 1108 | 37 | <0.1 |
| Example C7 | (Z)/(Y)/PET | A | 1108 | 37 | <0.1 |
| Example C8 | (Z)/(Y)/PET | A | 1108 | 37 | <0.1 |
| Example C9 | (Z)/(Y)/PET | A | 1108 | 37 | <0.1 |
| Example C10 | (Z)/(Y)/PET | A | 1108 | 37 | <0.1 |
| Example C11 | (Z)/(Y)/PET | A | 1108 | 37 | <0.1 |
| Example C12 | (Z)/(Y)/PET | A | 1108 | 37 | <0.1 |
| Example C13 | (Z)/(Y)/PET | A | 1111 | 60 | <0.1 |
| Example C14 | (Z)/(Y)/PET | A | 1111 | 61 | <0.1 |
| Example C15 | (Z)/(Y)/PET | A | 1108 | 44 | <0.1 |
| Example C16 | (Z)/(Y)/PET | A | 1108 | 46 | <0.1 |
| Example C17 | (Z)/(Y)/PET | A | 1107 | 35 | <0.1 |
| Example C18 | (Z)/(Y)/PET | A | 1107 | 35 | <0.1 |
| Example C19 | (Z)/(Y)/PET | A | 1122 | 140 | 0.29 |
| Example C20 | (Z)/(Y)/PET | A | 1122 | 140 | 0.29 |
| Example C21 | (Z)/(Y)/PET | A | 1102 | 43 | <0.1 |
| Example C22 | (Z)/(Y)/PET | A | 1102 | 43 | <0.1 |
| Example C23 | (Z)/(Y)/PET | A | 1113 | 30 | <0.1 |
| Example C24 | (Z)/(Y)/PET | A | 1113 | 31 | <0.1 |
| Example C25 | (Z)/(Y)/PET | B | 1113 | 43 | <0.1 |
| Example C26 | (Z)/(Y)/PET | B | 1113 | 43 | <0.1 |
| Example C27 | (Z)/(Y)/PET/(Y)/(Z) | A | 1108 | 37 | <0.1 |
| Example C28 | (Z)/(Y)/PET/(Y)/(Z) | A | 1108 | 37 | <0.1 |
| Example C29 | (Z)/(Y)/ONY | A | 1109 | 40 | <0.1 |
| Example C30 | (Z)/(Y)/ONY | A | 1109 | 40 | <0.1 |
| Example C31 | (Z)/(Y)/AlO$_x$/PET | A | 1108 | 37 | <0.1 |
| Example C32 | (Z)/(Y)/AlO$_x$/PET | A | 1108 | 37 | <0.1 |
| Example C33 | (Z)/(Y)/SiO$_x$/PET | A | 1108 | 37 | <0.1 |
| Example C34 | (Z)/(Y)/SiO$_x$/PET | A | 1108 | 37 | <0.1 |
| Example C35 | (Z)/(Y)/PET | A | — | | |
| Example C36 | (Z)/(Y)/PET | A | — | | |
| Example C37 | (Z)/(Y)/PET | A | — | | |
| Example C38 | (Z)/(Y)/PET | A | — | | |
| Example C39 | (Z)/(Y)/PET | A | 1108 | 37 | <0.1 |
| Example C40 | (Z)/(Y)/PET | A | 1108 | 37 | <0.1 |
| Example C41 | (Y)/(Z)/PET | A | 1114 | 48 | <0.1 |
| Example C42 | (Y)/(Z)/PET | A | 1114 | 48 | <0.1 |
| Comp. Example C1 | (Y)/PET | A | 1108 | 37 | <0.1 |
| Comp. Example C2 | (Y)/PET | A | 1111 | 60 | <0.1 |
| Comp. Example C3 | (Y)/PET | A | 1108 | 44 | <0.1 |
| Comp. Example C4 | (Y)/PET | A | 1107 | 35 | <0.1 |
| Comp. Example C5 | (Y)/PET | A | 1122 | 140 | 0.29 |
| Comp. Example C6 | (Y)/PET | A | 1102 | 43 | <0.1 |
| Comp. Example C7 | (Y)/PET | A | 1113 | 30 | <0.1 |
| Comp. Example C8 | (Y)/PET/(Y) | A | 1114 | 48 | <0.1 |
| Comp. Example C9 | (Y)/ONY | A | 1109 | 40 | <0.1 |
| Comp. Example C10 | (Y)/AlO$_x$/PET | A | 1108 | 37 | <0.1 |
| Comp. Example C11 | (Y)/SiO$_x$/PET | A | 1108 | 37 | <0.1 |
| Comp. Example C12 | (Y)/PET | A | — | | |
| Comp. Example C13 | (Y)/PET | A | — | | |
| Comp. Example C14 | (Z)/(Y')/PET | A | — | | |
| Comp. Example C15 | (Z)/(Y')/PET | A | — | | |
| Comp. Example C16 | (Z)/PET | A | — | | |
| Comp. Example C17 | (Z)/PET | A | — | | |
| Comp. Example C18 | (Y)/PET/(Z) | A | 1108 | 37 | <0.1 |
| Comp. Example C19 | (Y)/PET/(Z) | A | 1108 | 37 | <0.1 |
| Comp. Example C20 | (Y')/PET | A | — | | |
| Comp. Example C21 | PET | A | — | | |

TABLE C3

Container Lid

Oxygen transmission rate (ml/m² · day · atm)

| | After heat sealing (Before retort treatment) | | After retort treatment | After retort treatment + transportation test | Appearance after retort treatment |
|---|---|---|---|---|---|
| | Before stretching | After stretching | 120° C., 30 minutes | | |
| Example C1 | 0.21 | 0.25 | 0.25 | 0.30 | A |
| Example C2 | 0.20 | 0.24 | 0.24 | 0.32 | A |
| Example C3 | 0.21 | 0.54 | 0.23 | 0.26 | A |
| Example C4 | 0.21 | 0.45 | 0.21 | 0.23 | A |
| Example C5 | 0.22 | 0.91 | 0.23 | 0.24 | A |
| Example C6 | 0.21 | 0.78 | 0.21 | 0.26 | A |
| Example C7 | 0.31 | 1.2 | 0.33 | 0.40 | A |
| Example C8 | 0.28 | 1.2 | 0.31 | 0.38 | A |
| Example C9 | 0.31 | 1.8 | 0.34 | 0.40 | A |
| Example C10 | 0.36 | 2.5 | — | — | — |
| Example C11 | 0.28 | 1.9 | 0.28 | 0.35 | A |
| Example C12 | 0.34 | 2.4 | — | — | — |
| Example C13 | 0.65 | 0.85 | — | — | — |
| Example C14 | 0.63 | 0.82 | — | — | — |
| Example C15 | 0.33 | 0.56 | 0.35 | 0.50 | A |
| Example C16 | 0.31 | 0.57 | 0.33 | 0.42 | A |
| Example C17 | 0.20 | 0.24 | 0.21 | 0.25 | A |
| Example C18 | 0.19 | 0.23 | 0.20 | 0.22 | A |
| Example C19 | 1.2 | 1.5 | — | — | — |
| Example C20 | 1.1 | 1.5 | — | — | — |
| Example C21 | 0.22 | 0.36 | 0.27 | 0.33 | A |
| Example C22 | 0.23 | 0.34 | 0.28 | 0.34 | A |
| Example C23 | 0.81 | 1.4 | — | — | — |
| Example C24 | 0.80 | 1.4 | — | — | — |
| Example C25 | 0.28 | 0.29 | 0.31 | 0.36 | B |
| Example C26 | 0.27 | 0.30 | 0.30 | 0.35 | B |
| Example C27 | 0.06 | 0.12 | 0.08 | 0.11 | A |
| Example C28 | 0.06 | 0.11 | 0.07 | 0.10 | A |
| Example C29 | 0.27 | 0.56 | 0.32 | 0.35 | A |
| Example C30 | 0.26 | 0.53 | 0.30 | 0.32 | A |
| Example C31 | 0.12 | 0.17 | 0.15 | 0.19 | A |
| Example C32 | 0.12 | 0.15 | 0.14 | 0.18 | A |
| Example C33 | 0.15 | 0.20 | 0.16 | 0.19 | A |
| Example C34 | 0.10 | 0.14 | 0.12 | 0.14 | A |
| Example C35 | 1.9 | 3.8 | — | — | — |
| Example C36 | 1.9 | 3.6 | — | — | — |
| Example C37 | 0.90 | 2.3 | — | — | — |
| Example C38 | 0.87 | 2.4 | — | — | — |
| Example C39 | 0.21 | 0.25 | — | — | — |
| Example C40 | 0.22 | 0.27 | — | — | — |

TABLE C3-continued

Container Lid

Oxygen transmission rate (ml/m² · day · atm)

|  | After heat sealing (Before retort treatment) | | After retort treatment | After retort treatment + transportation test | Appearance after retort treatment |
| --- | --- | --- | --- | --- | --- |
|  | Before stretching | After stretching | 120° C., 30 minutes | | |
| Example C41 | 0.33 | 0.99 | — | — | — |
| Example C42 | 0.33 | 0.98 | — | — | — |
| Comp. Example C1 | 0.21 | 6.1 | 0.30 | 1.0 | A |
| Comp. Example C2 | 0.65 | 7.3 | — | — | — |
| Comp. Example C3 | 0.32 | 6.8 | 0.35 | 1.3 | A |
| Comp. Example C4 | 0.20 | 5.5 | 0.24 | 0.78 | A |
| Comp. Example C5 | 1.2 | 8.9 | — | — | — |
| Comp. Example C6 | 0.23 | 6.3 | 0.27 | 1.0 | A |
| Comp. Example C7 | 0.83 | 8.0 | — | — | — |
| Comp. Example C8 | 0.10 | 4.4 | 0.13 | 0.77 | A |
| Comp. Example C9 | 0.28 | 7.8 | 0.35 | 1.5 | A |
| Comp. Example C10 | 0.12 | 4.8 | 0.17 | 0.73 | A |
| Comp. Example C11 | 0.15 | 5.0 | 0.20 | 0.72 | A |
| Comp. Example C12 | 1.9 | 13.8 | — | — | — |
| Comp. Example C13 | 0.9 | 9.7 | — | — | — |
| Comp. Example C14 | 1.2 | 6.8 | — | — | — |
| Comp. Example C15 | 1.1 | 6.6 | — | — | — |
| Comp. Example C16 | >50 | >50 | — | — | — |
| Comp. Example C17 | >50 | >50 | — | — | — |
| Comp. Example C18 | 0.22 | 6.1 | 0.32 | 1.1 | A |
| Comp. Example C19 | 0.23 | 6.1 | 0.30 | 1.1 | A |
| Comp. Example C20 | 1.3 | 6.9 | 1.9 | 3.4 | A |
| Comp. Example C21 | >50 | >50 | >50 | >50 | A |

[Vacuum Insulator] (Example Set D)

Measurements and evaluations in examples and comparative examples of vacuum insulators were carried out by the methods described below.

(1) Infrared Absorption Spectrum of Layer (Y) The measurement was performed in the same manner as in Example Set A.

(2) Appearance of Multilayer Structure

The appearances of the multilayer structures obtained were evaluated by visual inspection according to the following ratings.

A: Very good appearance that was colorless, transparent, and uniform.

B: Good appearance, albeit slightly opaque or uneven.

(3) Method for Fabricating Vacuum Insulator

Laminated bodies having configurations as specified below were fabricated from the obtained multilayer structures, and vacuum insulators were fabricated using the laminated bodies as sheath materials.

a. Laminated Body Consisting of "OPA/Multilayer Structure/CPP"

A two-component adhesive (including A-520 (trade name) and A-50 (trade name) manufactured by Mitsui Chemicals, Inc)) was applied to one surface of a 60-μm-thick non-oriented polypropylene film (Tohcello CP RXC-18 manufactured by Mitsui Chemicals Tohcello, Inc. (CPP)) and to one surface of a 15-μm-thick oriented polyamide film (EMBLEM ON-BC manufactured by UNITIKA LTD. (OPA)). The CPP film, the OPA film, and a multilayer structure were laminated to form a configuration of OPA layer/adhesive layer/multilayer structure/adhesive layer/CPP layer. Thus, a laminated body was obtained. The lamination of the multilayer structure was done in such a manner that the layer (Y) (the layer (Z) or layer (Y') for a multilayer structure having no layer (Y)) was located on the OPA side.

b. Laminated Body Consisting of "OPA/Multilayer Structure/VM-EVOH/CPP"

The above two-component adhesive was applied to one surface of CPP, to one surface of OPA, and to one surface of a biaxially-oriented ethylene-vinyl alcohol copolymer film having a deposited layer of aluminum (VM-XL manufactured by KURARAY CO., LTD. and having a thickness of 12 μm (VM-EVOH)). The CPP film, the OPA film, the VM-EVOH film, and a multilayer structure were laminated to form a configuration of OPA layer/adhesive layer/multilayer structure/adhesive layer/VM-EVOH layer/adhesive layer/CPP layer. Thus, a laminated body was obtained. The lamination of the multilayer structure was done in such a manner that the layer (Y) (the layer (Z) or layer (Y') for a multilayer structure having no layer (Y)) was located on the VM-EVOH side. Also, the lamination of the VM-EVOH was done in such a manner that the deposited layer of aluminum was located on the multilayer structure side.

Each laminated body obtained was cut to give two sheath materials having a size of 70 cm×30 cm. The two laminated pieces were stacked together in such a manner that the CPP layers were located interiorly, and the three sides of the stack were heat-sealed in such a manner that the seal width was 10 mm. Thus, a three-side-seal bag was fabricated. Next, a heat-insulating core material was put into the three-side-seal bag through its opening, and the three-side-seal bag was hermetically closed using a vacuum packaging machine (VAC-STAR 2500 manufactured by Frimark GmbH) so that the internal pressure was 10 Pa at a temperature of 20° C. Thus, a vacuum insulator was obtained. As the heat-insulating core material, a fine silica powder dried in a 120° C. atmosphere for 4 hours was used.

(4) Internal Pressure of Vacuum Insulator Left Unattended

Each vacuum insulator obtained was left at 40° C. and 15% RH for 360 days, after which the internal pressure of the vacuum insulator was measured using a Pirani gauge.

(5) Oxygen Transmission Rate (Os) of Sheath Material of Vacuum Insulator

The oxygen transmission rate was measured using an oxygen transmission testing system ("MOCON OX-TRAN 2/20" manufactured by ModernControls, Inc.). Specifically, a sheath material having a size of 21 cm×30 cm was cut out from each vacuum insulator fabricated. The sheath material was set in such a manner that the layer (YZ) faced the oxygen feed-side and the base (X) faced the carrier gas-side, and the oxygen transmission rate (in units of ml/(m²·day·atm)) was measured under conditions where the temperature was 20° C., the humidity on the oxygen feed-side was 85% RH, the humidity on the carrier gas-side was 85% RH, the oxygen pressure was 1 atm, and the carrier gas pressure was 1 atm. Nitrogen gas containing 2 vol % of hydrogen gas was used as the carrier gas.

(6) Oxygen Transmission Rate (Of) of Vacuum Insulator's Sheath Material Kept Stretched by 5%

A sheath material having a size of 21 cm×30 cm was cut out from each vacuum insulator fabricated. The sheath material was left at 23° C. and 50% RH for over 24 hours, then, under these same conditions, was stretched by 5% in a direction corresponding to the longitudinal direction, and allowed to keep the stretched state for 5 minutes. Thus, a multilayer structure subjected to stretching was obtained. The oxygen transmission rate was measured using an oxygen transmission testing system ("MOCON OX-TRAN 2/20" manufactured by ModernControls, Inc.). Specifically, the multilayer structure was set in such a manner that the layer (YZ) faced the oxygen feed-side and the base (X) faced the carrier gas-side, and the oxygen transmission rate (in units of ml/(m²·day·atm)) was measured under conditions where the temperature was 20° C., the humidity on the oxygen feed-side was 85% RH, the humidity on the carrier gas-side was 85% RH, the oxygen pressure was 1 atm, and the carrier gas pressure was 1 atm. Nitrogen gas containing 2 vol % of hydrogen gas was used as the carrier gas.

[Production Examples of Coating Liquids (U) and (V)]

Coating liquids (U1) to (U4) and coating liquids (V1) to (V8) were obtained in the same manner as in Example Set A.

Examples and Comparative Examples

Examples D1 to D34 and D37 to D44 were carried out in the same manner as in Examples B1 to B42. Also, Comparative Examples D1 to D21 were carried out in the same manner as in Comparative Examples B1 to B21. That is, in Examples D1 to D34 and Comparative Examples D1 to D21 of Example Set D, the products subjected to measurements were fabricated in the same manner as in Examples and Comparative Examples of Example Set B which are denoted by the same corresponding numbers, except that the products fabricated were vacuum insulators. In Examples D37 to D44, the products subjected to measurements were fabricated in the same manner as in Examples of Example Set B which are denoted by the numbers which are respectively two smaller than the numbers 37 to 44, except that the products fabricated were vacuum insulators. Examples D35 and D36 were carried out as described below.

Examples D35 and D36

Multilayer structures were obtained in the same manner as in Example B1, except that the base was a layer of aluminum deposited on the surface of PET, and that the coating liquid (V) was changed according to Table D1. Vacuum insulators were obtained using these multilayer structures according to (3).

The production conditions and evaluation results for Examples and Comparative Examples are shown in Tables D1 to D3 below. In the tables, "-" means "not used", "not calculable", "not carried out", "not measurable", or the like.

As is apparent from the tables, the vacuum insulators of Examples maintained good gas barrier properties even when subjected, after fabrication, to a higher physical stress (5% stretching). By contrast, all of the vacuum insulators of Comparative Examples showed marked deterioration in gas barrier properties after subjected to a high physical stress (5% stretching). The vacuum insulators of Examples did not undergo a significant increase in internal pressure even when left for a long period of time.

TABLE D1

| | Layer Configuration | | | | | | | | |
|---|---|---|---|---|---|---|---|---|---|
| | | Layer (Y) | | | | | Layer (Z) | | |
| | | | | | Heat treatment step | | | | |
| | Base (X) | Type | Thickness (μm) | Coating liquid | $N_M/N_P$ | Temperature (° C.) | Time (min) | Thickness (μm) | Coating liquid | Polymer (E) |
|---|---|---|---|---|---|---|---|---|---|---|
| Example D1 | PET | YA | 0.5 | U1 | 1.15 | 180 | 1 | 0.3 | V1 | PHM |
| Example D2 | | | | | | | | | V5 | VPA |
| Example D3 | PET | YA | 0.5 | U1 | 1.15 | 180 | 1 | 0.1 | V1 | PHM |
| Example D4 | | | | | | | | | V5 | VPA |
| Example D5 | PET | YA | 0.5 | U1 | 1.15 | 180 | 1 | 0.05 | V1 | PHM |
| Example D6 | | | | | | | | | V5 | VPA |
| Example D7 | PET | YA | 0.5 | U1 | 1.15 | 180 | 1 | 0.3 | V2 | PHP |
| Example D8 | | | | | | | | | V6 | VBPA |
| Example D9 | PET | YA | 0.5 | U1 | 1.15 | 180 | 1 | 0.3 | V3 | PHM/AN (2/1) |
| Example D10 | | | | | | | | | V4 | PHM/AN (1/1) |
| Example D11 | | | | | | | | | V7 | VPA/MA (2/1) |
| Example D12 | | | | | | | | | V8 | VPA/MA (1/1) |
| Example D13 | PET | YA | 0.5 | U1 | 1.15 | 120 | 5 | 0.3 | V1 | PHM |
| Example D14 | | | | | | | | | V5 | VPA |
| Example D15 | PET | YA | 0.5 | U1 | 1.15 | 150 | 3 | 0.3 | V1 | PHM |
| Example D16 | | | | | | | | | V5 | VPA |
| Example D17 | PET | YA | 0.5 | U1 | 1.15 | 200 | 1 | 0.3 | V1 | PHM |
| Example D18 | | | | | | | | | V5 | VPA |
| Example D19 | PET | YA | 0.5 | U2 | 4.48 | 180 | 1 | 0.3 | V1 | PHM |
| Example D20 | | | | | | | | | V5 | VPA |
| Example D21 | PET | YA | 0.5 | U3 | 1.92 | 180 | 1 | 0.3 | V1 | PHM |
| Example D22 | | | | | | | | | V5 | VPA |
| Example D23 | PET | YA | 0.5 | U4 | 0.82 | 180 | 1 | 0.3 | V1 | PHM |
| Example D24 | | | | | | | | | V5 | VPA |
| Example D25 | PET | YA | 0.5 | U1 | 1.15 | 180 | 1(*1) | 0.3 | V1 | PHM |
| Example D26 | | | | | | | | | V5 | VPA |
| Example D27 | PET | YA | 0.5 | U1 | 1.15 | 180 | 1 | 0.3 | V1 | PHM |
| Example D28 | | | | | | | | | V5 | VPA |

TABLE D1-continued

| | | Layer (Y) | | | | Heat treatment step | | Layer (Z) | | |
|---|---|---|---|---|---|---|---|---|---|---|
| | Base (X) | Type | Thickness (μm) | Coating liquid | $N_M/N_P$ | Temperature (° C.) | Time (min) | Thickness (μm) | Coating liquid | Polymer (E) |
| Example D29 | ONY | YA | 0.5 | U1 | 1.15 | 180 | 1 | 0.3 | V1 | PHM |
| Example D30 | | | | | | | | | V5 | VPA |
| Example D31 | $AlO_x$ | YA | 0.5 | U1 | 1.15 | 180 | 1 | 0.3 | V1 | PHM |
| Example D32 | | | | | | | | | V5 | VPA |
| Example D33 | $SiO_x$ | YA | 0.5 | U1 | 1.15 | 180 | 1 | 0.3 | V1 | PHM |
| Example D34 | | | | | | | | | V5 | VPA |
| Example D35 | Al | YA | 0.5 | U1 | 1.15 | 180 | 1 | 0.3 | V1 | PHM |
| Example D36 | | | | | | | | | V5 | VPA |
| Example D37 | PET | YB | | Deposited layer of aluminum | | | | 0.3 | V1 | PHM |
| Example D38 | | | | | | | | 0.3 | V5 | VPA |
| Example D39 | PET | YC | | Deposited layer of aluminum oxide | | | | 0.3 | V1 | PHM |
| Example D40 | | | | | | | | 0.3 | V5 | VPA |
| Example D41 | PET | YA | 0.5 | U1 | 1.15 | 180 | 1 | 0.5 | V1 | PHM |
| Example D42 | | | | | | | | | V5 | VPA |
| Example D43 | PET | YA | 0.5 | U1 | 1.15 | 180 | 1 | 0.3 | V1 | PHM |
| Example D44 | | | | | | | | | V5 | VPA |
| Comp. Example D1 | PET | YA | 0.5 | U1 | 1.15 | 180 | 1 | — | — | — |
| Comp. Example D2 | PET | YA | 0.5 | U1 | 1.15 | 120 | 5 | — | — | — |
| Comp. Example D3 | PET | YA | 0.5 | U1 | 1.15 | 150 | 3 | — | — | — |
| Comp. Example D4 | PET | YA | 0.5 | U1 | 1.15 | 200 | 1 | — | — | — |
| Comp. Example D5 | PET | YA | 0.5 | U2 | 4.48 | 180 | 1 | — | — | — |
| Comp. Example D6 | PET | YA | 0.5 | U3 | 1.92 | 180 | 1 | — | — | — |
| Comp. Example D7 | PET | YA | 0.5 | U4 | 0.82 | 180 | 1 | — | — | — |
| Comp. Example D8 | PET | YA | 0.5 | U1 | 1.15 | 180 | 1 | — | — | — |
| Comp. Example D9 | ONY | YA | 0.5 | U1 | 1.15 | 180 | 1 | — | — | — |
| Comp. Example D10 | $AlO_x$ | YA | 0.5 | U1 | 1.15 | 180 | 1 | — | — | — |
| Comp. Example D11 | $SiO_x$ | YA | 0.5 | U1 | 1.15 | 180 | 1 | — | — | — |
| Comp. Example D12 | PET | YB | | Deposited layer of aluminum | | | | — | — | — |
| Comp. Example D13 | PET | YC | | Deposited layer of aluminum oxide | | | | — | — | — |
| Comp. Example D14 | PET | — | | Deposited layer of silicon oxide | | | | 0.3 | V1 | PHM |
| Comp. Example D15 | | | | | | | | 0.3 | V5 | VPA |
| Comp. Example D16 | PET | — | | — | | | | 0.3 | V1 | PHM |
| Comp. Example D17 | | | | | | | | 0.3 | V5 | VPA |
| Comp. Example D18 | PET | YA | 0.5 | U1 | 1.15 | 180 | 1 | 0.3 | V1 | PHM |
| Comp. Example D19 | | | | | | | | | V5 | VPA |
| Comp. Example D20 | PET | — | | Deposited layer of silicon oxide | | | | — | — | — |
| Comp. Example D21 | PET | — | | — | | | | — | — | — |

(*¹)The heat treatment was carried out not after formation of the layer (Y) but after formation of the layer (Z).

TABLE D2

| | Multilayer Structure | | | | |
|---|---|---|---|---|---|
| | | | Infrared absorption spectrum of layer (Y) | | |
| | Layer configuration | Appearance | $n^1$ (cm$^{-1}$) | Half width (cm$^{-1}$) | $\alpha^2/\alpha^1$ |
| Example D1 | (Z)/(Y)/PET | A | 1108 | 37 | <0.1 |
| Example D2 | (Z)/(Y)/PET | A | 1108 | 37 | <0.1 |
| Example D3 | (Z)/(Y)/PET | A | 1108 | 37 | <0.1 |
| Example D4 | (Z)/(Y)/PET | A | 1108 | 37 | <0.1 |
| Example D5 | (Z)/(Y)/PET | A | 1108 | 37 | <0.1 |
| Example D6 | (Z)/(Y)/PET | A | 1108 | 37 | <0.1 |
| Example D7 | (Z)/(Y)/PET | A | 1108 | 37 | <0.1 |
| Example D8 | (Z)/(Y)/PET | A | 1108 | 37 | <0.1 |
| Example D9 | (Z)/(Y)/PET | A | 1108 | 37 | <0.1 |
| Example D10 | (Z)/(Y)/PET | A | 1108 | 37 | <0.1 |
| Example D11 | (Z)/(Y)/PET | A | 1108 | 37 | <0.1 |
| Example D12 | (Z)/(Y)/PET | A | 1108 | 37 | <0.1 |
| Example D13 | (Z)/(Y)/PET | A | 1111 | 60 | <0.1 |
| Example D14 | (Z)/(Y)/PET | A | 1111 | 61 | <0.1 |
| Example D15 | (Z)/(Y)/PET | A | 1108 | 44 | <0.1 |
| Example D16 | (Z)/(Y)/PET | A | 1108 | 46 | <0.1 |
| Example D17 | (Z)/(Y)/PET | A | 1107 | 35 | <0.1 |
| Example D18 | (Z)/(Y)/PET | A | 1107 | 35 | <0.1 |
| Example D19 | (Z)/(Y)/PET | A | 1122 | 140 | 0.29 |
| Example D20 | (Z)/(Y)/PET | A | 1122 | 140 | 0.29 |
| Example D21 | (Z)/(Y)/PET | A | 1102 | 43 | <0.1 |
| Example D22 | (Z)/(Y)/PET | A | 1102 | 43 | <0.1 |
| Example D23 | (Z)/(Y)/PET | A | 1113 | 30 | <0.1 |
| Example D24 | (Z)/(Y)/PET | A | 1113 | 31 | <0.1 |
| Example D25 | (Z)/(Y)/PET | B | 1113 | 43 | <0.1 |
| Example D26 | (Z)/(Y)/PET | B | 1113 | 43 | <0.1 |
| Example D27 | (Z)/(Y)/PET/(Y)/(Z) | A | 1108 | 37 | <0.1 |
| Example D28 | (Z)/(Y)/PET/(Y)/(Z) | A | 1108 | 37 | <0.1 |
| Example D29 | (Z)/(Y)/ONY | A | 1109 | 40 | <0.1 |
| Example D30 | (Z)/(Y)/ONY | A | 1109 | 40 | <0.1 |
| Example D31 | (Z)/(Y)/$AlO_x$/PET | A | 1108 | 37 | <0.1 |
| Example D32 | (Z)/(Y)/$AlO_x$/PET | A | 1108 | 37 | <0.1 |
| Example D33 | (Z)/(Y)/$SiO_x$/PET | A | 1108 | 37 | <0.1 |
| Example D34 | (Z)/(Y)/$SiO_x$/PET | A | 1108 | 37 | <0.1 |
| Example D35 | (Z)/(Y)/Al/PET | A | 1108 | 37 | <0.1 |
| Example D36 | (Z)/(Y)/Al/PET | A | 1108 | 37 | <0.1 |

TABLE D2-continued

Multilayer Structure

| | Layer configuration | Appearance | n¹ (cm⁻¹) | Half width (cm⁻¹) | $\alpha^2/\alpha^1$ |
|---|---|---|---|---|---|
| Example D37 | (Z)/(Y)/PET | A | — | | |
| Example D38 | (Z)/(Y)/PET | A | — | | |
| Example D39 | (Z)/(Y)/PET | A | — | | |
| Example D40 | (Z)/(Y)/PET | A | — | | |
| Example D41 | (Z)/(Y)/PET | A | 1108 | 37 | <0.1 |
| Example D42 | (Z)/(Y)/PET | A | 1108 | 37 | <0.1 |
| Example D43 | (Y)/(Z)/PET | A | 1114 | 48 | <0.1 |
| Example D44 | (Y)/(Z)/PET | A | 1114 | 48 | <0.1 |
| Comp. Example D1 | (Y)/PET | A | 1108 | 37 | <0.1 |
| Comp. Example D2 | (Y)/PET | A | 1111 | 60 | <0.1 |
| Comp. Example D3 | (Y)/PET | A | 1108 | 44 | <0.1 |
| Comp. Example D4 | (Y)/PET | A | 1107 | 35 | <0.1 |
| Comp. Example D5 | (Y)/PET | A | 1122 | 140 | 0.29 |
| Comp. Example D6 | (Y)/PET | A | 1102 | 43 | <0.1 |
| Comp. Example D7 | (Y)/PET | A | 1113 | 30 | <0.1 |
| Comp. Example D8 | (Y)/PET/(Y) | A | 1114 | 48 | <0.1 |
| Comp. Example D9 | (Y)/ONY | A | 1109 | 40 | <0.1 |
| Comp. Example D10 | (Y)/AlO$_x$/PET | A | 1108 | 37 | <0.1 |
| Comp. Example D11 | (Y)/SiO$_x$/PET | A | 1108 | 37 | <0.1 |
| Comp. Example D12 | (Y)/PET | A | — | | |
| Comp. Example D13 | (Y)/PET | A | — | | |
| Comp. Example D14 | (Z)/(Y')/PET | A | — | | |
| Comp. Example D15 | (Z)/(Y')/PET | A | — | | |
| Comp. Example D16 | (Z)/PET | A | — | | |
| Comp. Example D17 | (Z)/PET | A | — | | |
| Comp. Example D18 | (Y)/PET/(Z) | A | 1108 | 37 | <0.1 |
| Comp. Example D19 | (Y)/PET/(Z) | A | 1108 | 37 | <0.1 |
| Comp. Example D20 | Layer (Y')/PET | A | — | | |
| Comp. Example D21 | PET | A | — | | |

TABLE D3

Vacuum Insulator

| | Configuration of laminated body | Oxygen transmission rate (ml/m² · day · atm) Before stretching | Oxygen transmission rate (ml/m² · day · atm) After stretching | Internal pressure after left for a period of time (Pa) |
|---|---|---|---|---|
| Example D1-1 | OPA/(*)/CPP | 0.20 | 0.25 | 20 |
| Example D1-2 | OPA/(*)/VM-EVOH/CPP | 0.02 | 0.03 | 7 |
| Example D2-1 | OPA/(*)/CPP | 0.20 | 0.24 | 19 |
| Example D2-2 | OPA/(*)/VM-EVOH/CPP | 0.03 | 0.04 | 7 |
| Example D3 | OPA/(*)/CPP | 0.20 | 0.54 | 43 |
| Example D4 | OPA/(*)/CPP | 0.20 | 0.45 | 37 |
| Example D5 | OPA/(*)/CPP | 0.21 | 0.91 | 75 |
| Example D6 | OPA/(*)/CPP | 0.20 | 0.78 | 60 |
| Example D7 | OPA/(*)/CPP | 0.20 | 1.2 | 100 |
| Example D8 | OPA/(*)/CPP | 0.20 | 1.2 | 95 |
| Example D9 | OPA/(*)/CPP | 0.20 | 1.8 | 148 |
| Example D10 | OPA/(*)/CPP | 0.20 | 2.5 | 200 |
| Example D11 | OPA/(*)/CPP | 0.20 | 1.9 | 151 |
| Example D12 | OPA/(*)/CPP | 0.20 | 2.4 | 195 |
| Example D13 | OPA/(*)/CPP | 0.58 | 0.85 | 72 |
| Example D14 | OPA/(*)/CPP | 0.58 | 0.82 | 70 |
| Example D15 | OPA/(*)/CPP | 0.28 | 0.56 | 45 |
| Example D16 | OPA/(*)/CPP | 0.28 | 0.57 | 48 |
| Example D17 | OPA/(*)/CPP | 0.19 | 0.24 | 21 |
| Example D18 | OPA/(*)/CPP | 0.19 | 0.23 | 18 |
| Example D19 | OPA/(*)/CPP | 0.96 | 1.5 | 122 |
| Example D20 | OPA/(*)/CPP | 0.96 | 1.5 | 130 |
| Example D21 | OPA/(*)/CPP | 0.22 | 0.36 | 30 |
| Example D22 | OPA/(*)/CPP | 0.22 | 0.34 | 27 |
| Example D23 | OPA/(*)/CPP | 0.77 | 1.4 | 110 |
| Example D24 | OPA/(*)/CPP | 0.77 | 1.4 | 113 |
| Example D25 | OPA/(*)/CPP | 0.25 | 0.29 | 24 |
| Example D26 | OPA/(*)/CPP | 0.25 | 0.30 | 24 |
| Example D27 | OPA/(*)/CPP | 0.06 | 0.12 | 10 |
| Example D28 | OPA/(*)/CPP | 0.06 | 0.11 | 9 |
| Example D29 | OPA/(*)/CPP | 0.24 | 0.56 | 46 |
| Example D30 | OPA/(*)/CPP | 0.24 | 0.53 | 41 |
| Example D31 | OPA/(*)/CPP | 0.11 | 0.17 | 15 |
| Example D32 | OPA/(*)/CPP | 0.12 | 0.15 | 12 |
| Example D33 | OPA/(*)/CPP | 0.14 | 0.20 | 18 |
| Example D34 | OPA/(*)/CPP | 0.10 | 0.14 | 11 |
| Example D35-1 | OPA/(*)/CPP | 0.11 | 0.17 | 14 |
| Example D35-2 | OPA/(*)/VM-EVOH/CPP | <0.01 | 0.01 | 5 |
| Example D36-1 | OPA/(*)/CPP | 0.12 | 0.15 | 12 |
| Example D36-2 | OPA/(*)/VM-EVOH/CPP | <0.01 | 0.01 | 4 |
| Example D37 | OPA/(*)/CPP | 1.8 | 3.8 | 302 |
| Example D38 | OPA/(*)/CPP | 1.8 | 3.6 | 292 |
| Example D39 | OPA/(*)/CPP | 0.81 | 2.3 | 180 |
| Example D40 | OPA/(*)/CPP | 0.81 | 2.4 | 193 |
| Example D41 | OPA/(*)/CPP | 0.21 | 0.25 | 20 |
| Example D42 | OPA/(*)/CPP | 0.21 | 0.27 | 23 |
| Example D43 | OPA/(*)/CPP | 0.31 | 0.99 | 80 |
| Example D44 | OPA/(*)/CPP | 0.31 | 0.98 | 78 |
| Comp. Example D1 | OPA/(*)/CPP | — | 6.1 | 492 |
| Comp. Example D2 | OPA/(*)/CPP | — | 7.3 | 587 |
| Comp. Example D3 | OPA/(*)/CPP | — | 6.8 | 543 |
| Comp. Example D4 | OPA/(*)/CPP | — | 5.5 | 440 |
| Comp. Example D5 | OPA/(*)/CPP | — | 8.9 | 714 |
| Comp. Example D6 | OPA/(*)/CPP | — | 6.3 | 504 |
| Comp. Example D7 | OPA/(*)/CPP | — | 8.0 | 643 |
| Comp. Example D8 | OPA/(*)/CPP | — | 4.4 | 356 |
| Comp. Example D9 | OPA/(*)/CPP | — | 7.8 | 640 |
| Comp. Example D10 | OPA/(*)/CPP | — | 4.8 | 381 |

TABLE D3-continued

| | Vacuum Insulator | | | |
|---|---|---|---|---|
| | | Oxygen transmission rate (ml/m²·day·atm) | | Internal pressure after left for a |
| | Configuration of laminated body | Before stretching | After stretching | period of time (Pa) |
| Comp. Example D11 | OPA/(*)/CPP | — | 5.0 | 402 |
| Comp. Example D12 | OPA/(*)/CPP | — | 13.8 | >1000 |
| Comp. Example D13 | OPA/(*)/CPP | — | 9.7 | 775 |
| Comp. Example D14 | OPA/(*)/CPP | 1.2 | 6.8 | 542 |
| Comp. Example D15 | OPA/(*)/CPP | 1.1 | 6.6 | 530 |
| Comp. Example D16 | OPA/(*)/CPP | >50 | >50 | >1000 |
| Comp. Example D17 | OPA/(*)/CPP | >50 | >50 | >1000 |
| Comp. Example D18 | OPA/M/CPP | 0.22 | 6.1 | 489 |
| Comp. Example D19 | OPA/(*)/CPP | 0.23 | 6.1 | 473 |
| Comp. Example D20 | OPA/(*)/CPP | — | 6.9 | 557 |
| Comp. Example D21 | OPA/(*)/CPP | — | >50 | >1000 |

(*)represents a multilayer structure fabricated in the example or comparative example.

The invention claimed is:

1. A product, comprising a packaging material, wherein:
the packaging material comprises a multilayer structure;
the multilayer structure comprises at least one base (X), at least one layer (Y), and at least one layer (Z);
the base (X) comprises a thermoplastic resin film layer;
the layer (Y) comprises an aluminum atom;
the layer (Z) comprises a polymer (E) comprising a monomer unit having a phosphorus atom;
the polymer (E) is a homopolymer of a vinylphosphonic acid compound or a copolymer of the vinylphosphonic acid compound; and
the multilayer structure comprises at least one pair of the layer (Y) and the layer (Z) that are contiguously stacked.

2. The product according to claim 1, having a configuration comprising at least one set of the base (X), the layer (Y), and the layer (Z) that are stacked in order of the base (X)/the layer (Y)/the layer (Z).

3. The product according to claim 1, wherein the polymer (E) has a repeating unit represented by the following general formula (I):

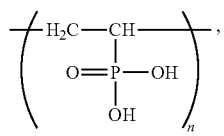

where n is a natural number.

4. The product according to claim 1, wherein:
the layer (Y) is a layer (YA) comprising a reaction product (R);
the reaction product (R) is a reaction product formed by reaction between a metal oxide (A) comprising aluminum and a phosphorus compound (B); and
in an infrared absorption spectrum of the layer (YA), a wavenumber ($n^1$) at which infrared absorption in the range of 800 to 1400 $cm^{-1}$ reaches a maximum is 1080 to 1130 $cm^{-1}$.

5. The product according to claim 1, wherein the layer (Y) is a deposited layer (YB) of aluminum or a deposited layer (YC) of aluminum oxide.

6. The product according to claim 1, wherein the multilayer structure has an oxygen transmission rate of 2 ml/(m²·day·atm) or less at 20° C. and 85% RH.

7. The product according to claim 1, wherein the multilayer structure has an oxygen transmission rate of 4 ml/(m²·day·atm) or less at 20° C. and 85% RH as measured after the multilayer structure is kept uniaxially stretched by 5% at 23° C. and 50% RH for 5 minutes.

8. The product according to claim 1, wherein:
the product is a formed container;
the packaging material separates an interior of the formed container from the outside of the container; and
the multilayer structure is obtained by forming the layer (Y) and the layer (Z) on the base (X) including a formed body formed in a shape having a containing portion, the containing portion serving as the interior and being adapted to hold contents.

9. The product according to claim 1, wherein:
the product is a joined container obtained by subjecting the packaging material in the form of a sheet to a joining process; and
the packaging material separates an interior of the joined container from the outside of the joined container.

10. The product according to claim 9, wherein the joined container corresponds to at least one selected from a vertical form fill seal bag, a vacuum packaging bag, a pouch, a laminated tube container, an infusion bag, and a paper container.

11. The product according to claim 1, wherein:
the product is a container lid; and
in a container formed by combining the container lid with a container body, the packaging material separates an interior of the container from the outside of the container.

12. The product according to claim 1, wherein:
the product is a vacuum insulator;
the product further comprises a core material placed in an interior bounded by the packaging material; and
the interior is under reduced pressure.

13. The product according to claim 1, wherein a thickness of the layer (Z) is 1.0 μm or less.

* * * * *